(12) United States Patent
Leo et al.

(10) Patent No.: US 12,529,044 B2
(45) Date of Patent: Jan. 20, 2026

(54) PROTEASE AND BINDING POLYPEPTIDE FOR O-GLYCOPROTEINS

(71) Applicant: Genovis AB, Kaevlinge (SE)

(72) Inventors: Fredrik Leo, Kaevlinge (SE); Rolf Lood-Alayón, Kaevlinge (SE); Stephan Bjork, Kaevlinge (SE); Malin Mejare, Kaevlinge (SE); Fredrik Olsson, Kävlinge (SE)

(73) Assignee: Genovis AB, Lund (SE)

( * ) Notice: Subject to any disclaimer, the term of this patent is extended or adjusted under 35 U.S.C. 154(b) by 124 days.

(21) Appl. No.: 18/145,807

(22) Filed: Dec. 22, 2022

(65) Prior Publication Data

US 2023/0212543 A1   Jul. 6, 2023

Related U.S. Application Data

(62) Division of application No. 16/616,827, filed as application No. PCT/EP2018/063832 on May 25, 2018, now Pat. No. 11,584,922.

(30) Foreign Application Priority Data

May 26, 2017 (GB) ................................. 1708471
May 26, 2017 (GB) ................................. 1708476
Apr. 24, 2018 (GB) ................................. 1806655

(51) Int. Cl.
| | |
|---|---|
| C12N 9/24 | (2006.01) |
| C12N 9/52 | (2006.01) |
| G01N 33/68 | (2006.01) |
| G01N 33/84 | (2006.01) |

(52) U.S. Cl.
CPC ............. *C12N 9/2402* (2013.01); *C12N 9/52* (2013.01); *G01N 33/68* (2013.01); *G01N 33/84* (2013.01); *C12Y 304/24057* (2013.01); *G01N 2333/924* (2013.01); *G01N 2333/952* (2013.01)

(58) Field of Classification Search
None
See application file for complete search history.

(56) References Cited

U.S. PATENT DOCUMENTS

| | | |
|---|---|---|
| 11,584,922 B2 | 2/2023 | Leo et al. |
| 2002/0193573 A1 | 12/2002 | Nock et al. |
| 2005/0112751 A1 | 5/2005 | Fang et al. |
| 2014/0308730 A1 | 10/2014 | Nikiforov |

FOREIGN PATENT DOCUMENTS

| | | |
|---|---|---|
| WO | WO 2008071418 | 6/2008 |
| WO | WO 2009129086 | 10/2009 |
| WO | WO 2010007214 | 1/2010 |
| WO | WO 2013037824 | 3/2013 |
| WO | WO 2015040125 | 3/2015 |
| WO | WO 2016003795 | 1/2016 |
| WO | WO 2017052463 | 3/2017 |
| WO | WO 2017134274 | 8/2017 |

OTHER PUBLICATIONS

Noach et al., "Recognition of protein-linked glycans as a determinant of peptidase activity", PNAS 114(5): E679-E688 Jan. 31, 2017.*
Database UniProtKB, May 10, 2017, Accession No. B5UB72 (version 22).
Hang et al. (2015) "Advance in Recent Research on Bacterial Metalloproteases" Industrial Microbiology, 45(6):53-60.
GenBank Database Accession No. KEQ49567, Jul. 2014, 2 pages.
Zhang et al. (2018) "Propagated perturbations from a peripheral mutation show interactions supporting WW domain thermostability" Structure 26:1474-1485.
Chen et al., (2016) "Properties of the Bombyx mori insulin-like peptide (BmILP) gene." Invertebrate Survival Journal, vol. 13, No. 1, pp. 76-88.
Derrien, (2007) Mucin utilisation and host interactions of the novel intestinal microbe Akkermansia muciniphila. Wageningen University and Research.
Lakshmanan et al., (2016) "Molecular Engineering of Acoustic Protein Nanostructures." ACS Nano, vol. 10, No. 8, pp. 7314-7322.
Abdullah et al. (1991) "Cloning, Nucleotide Sequence, and Expression of the *Pasteurella haemolytica* A1 Glycoprotease Gene" J. Bacteriol., 173(18):5597-5603.
Abdullah et al. (1992) "A Neutral Glycoprotease of Pasteurella haemolytica A1 Specifically Cleaves O-Sialoglycoproteins" Infect. Immun., 60:56-62.
Altschul et al. (1990) "Basic local alignment search tool" J Mol Biol 215:403-10.
Altschul (1993) "A Protein Alignment Scoring System Sensitive at All Evolutionary Distances" J Mol Evol 36:290-300.
Caputo et al. (2015) "Whole-genome assembly of *Akkermansia muciniphila* sequenced directly from human stool." Biol. Direct., 10(5):1-11.
Database EMBL [Online], May 6, 2008, "Akkermansia muciniphila ATCC BAA-835 hypothetical protein", retrieved from EBI accession No. ACD04945 Database accession No. ACD04945.
"Database UniProt [Online] Jul. 1, 2008," SubName: Full= Uncharacterized protein {EC0:0000313 EMBL:ACD04945.1 };", XP55755394, retrieved from EBI accession No. UNIPROT:B2UR60".
Database UniProt [Online], Jul. 1, 2008, "SubName: Full=Exo-alpha-sialidase {ECO:0000313|EMBL:ACD04462.1}; EC=3.2.1.18 {ECO:0000313|EMBL:ACD04462.1};", retrieved from EBI accession No. UNIPROT:B2UPI5, Database accession No. B2UPI5.
Database UniProt [Online], Jul. 1, 2008, "SubName: Full= Uncharacterized protein {ECO:0000313| EMBL:ACD05368.1};", retrieved from EBI accession No. UNIPROT:B2ULI1, Database accession No. B2ULI1.

(Continued)

*Primary Examiner* — Anand U Desai
(74) *Attorney, Agent, or Firm* — Brian E. Davy; Bozicevic, Field & Francis LLP

(57) ABSTRACT

The present invention relates to a novel endoprotease, mutants thereof having binding but lacking or having reduced hydrolyzing activity, and use in methods of studying and isolating O-linked glycoproteins.

13 Claims, 34 Drawing Sheets

Specification includes a Sequence Listing.

(56) References Cited

OTHER PUBLICATIONS

Database UniProt [Online], Oct. 29, 2014, "RecName: Full=Serine protease {ECO:0000256|RuleBase:RU004296}; EC=3.4.21.-{ECO:0000256|RuleBase:RU004296};", retrieved from EBI accession No. Uniprot: A0A081R2Z4, Database accession No. A0A081R2Z4.
Datta et al. (2013) "Enzyme immobilization: an overview on techniques and support materials" 3 Biotech, 3(1):1-9.
Debray et al. (2006) "Glycoprotein Analysis: General Methods" Encyclopedia of Analytical Chemistry, John Wiley & Sons, Ltd, pp. 6-17.
Devereux et al. (1984) "A comprehensive set of sequence analysis programs for the VAX" Nucleic Acids Research 12, 387-395.
Examination Report dated Dec. 8, 2020, EP18728576.2, 5 pp.
Henikoff (1992) "Amino acid substitution matrices from protein blocks" Proc. Nat. Acad Sci. USA 89:10915-10919.
Huang et al. (2015) "Biochemical characterisation of the neuraminidase pool of the human gut symbiont *Akkermansia muciniphila*" Carbohydrate Research, 415:60-65.
Juge et al. (2016) "Sialidases from gut bacteria: a mini-review" Biochem Soc Transactions, 44:166-175.
Karlin and Altschul (1993) "Applications and statistics for multiple high-scoring segments in molecular sequences" Proc. Nat. Acad Sci. USA 90:5873-5787.
Lee et al. (2015) "rbCLCA1 is a putative metalloprotease family member: localization and catalytic domain identification" Amino Acids, Springer Verlag, AU, 48(3):707-720.
Lucas et al. (2013) "Akkermansia muciniphila ATCC BAA-835, complete genome" Genbank accession No. CP001071.1, NCBI website.
Magnelli et al. (2011) "Identification and characterization of protein glycosylation using specific endo- and exoglycosidases" Journal of Visualized Experiments, 58:1-5.
Nakjang et al. (2012) A Novel Extracellular Metallopeptidase Domain Shared by Animal Host-Associated Mutualistic and Pathogenic Microbes PLos One, 7:e30287, pp. 1-18.
NCBI (2021) BT _ 4244 [Bacteroides thetaiotaomicron], https://www.ncbi.nlm.nih.gov/protein/NP_813155.1?report=genpept, pp. 1-2.
Noach et al. (2017) "Recognition of protein-linked glycans as a determinant of peptidase activity" PNAS, p. E679-E688 and supporting appendices.
Rawlings et al. (1995) "Evolutionary Families of Metallopeptidases", Methods in Enzymology, Academic Press, US, 248:183-228.
Sambrook et al. (1989) Molecular Cloning—a laboratory manual; Cold Spring Harbor Press. 30 pp.
Tarp et al. (2007) "Identification of a novel cancer-specific immunodominant glycopeptide epitope in the MUC1 tandem repeat" Glycobiol., 17(2):197-209.
Van Passel et al. (2011) "The Genome of *Akkermansia muciniphila*, a Dedicated Intestinal Mucin Degrader, and Its Use in Exploring Intestinal Metagenomes" Plos One, 6(3):1-8.
Vazeux et al. (1996) "Identification of Glutamate Residues Essential for Catalytic Activity and Zinc Coordination in Aminopeptidase A" Journal of Biological Chemistry, 271(15):9069-9074.
NCBI Reference Sequence WP 012420160.1, 'hypothetical protein (Akkermansia muciniphila)', and Jul. 12, 2013. 1 page.
Foley et al. (2010) "Sequences from the First Fibronectin Type III Repeat of the Neural Cell Adhesion Molecule Allow O-Glycan Polysialylation of an Adhesion Molecule Chimera" JBC 285:35056-35067.
Smutova et al. (2014) "Structural Basis for Substrate Specificity of Mammalian Neuraminidases" PLoS ONE 9(9): e106320.

* cited by examiner

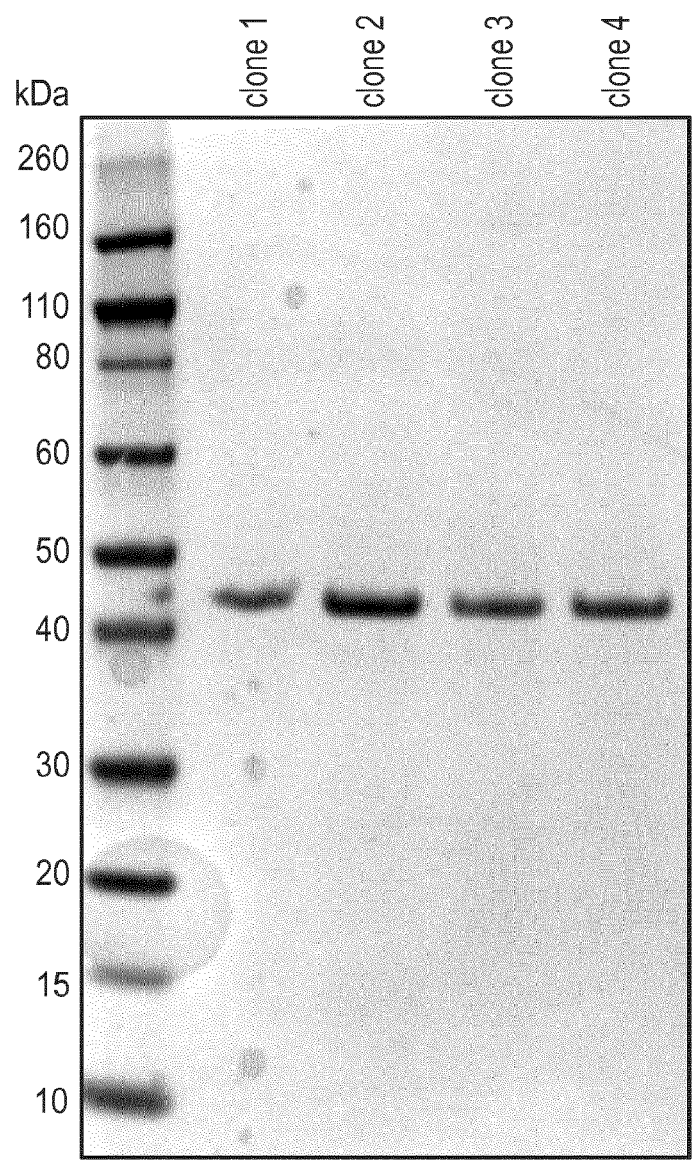

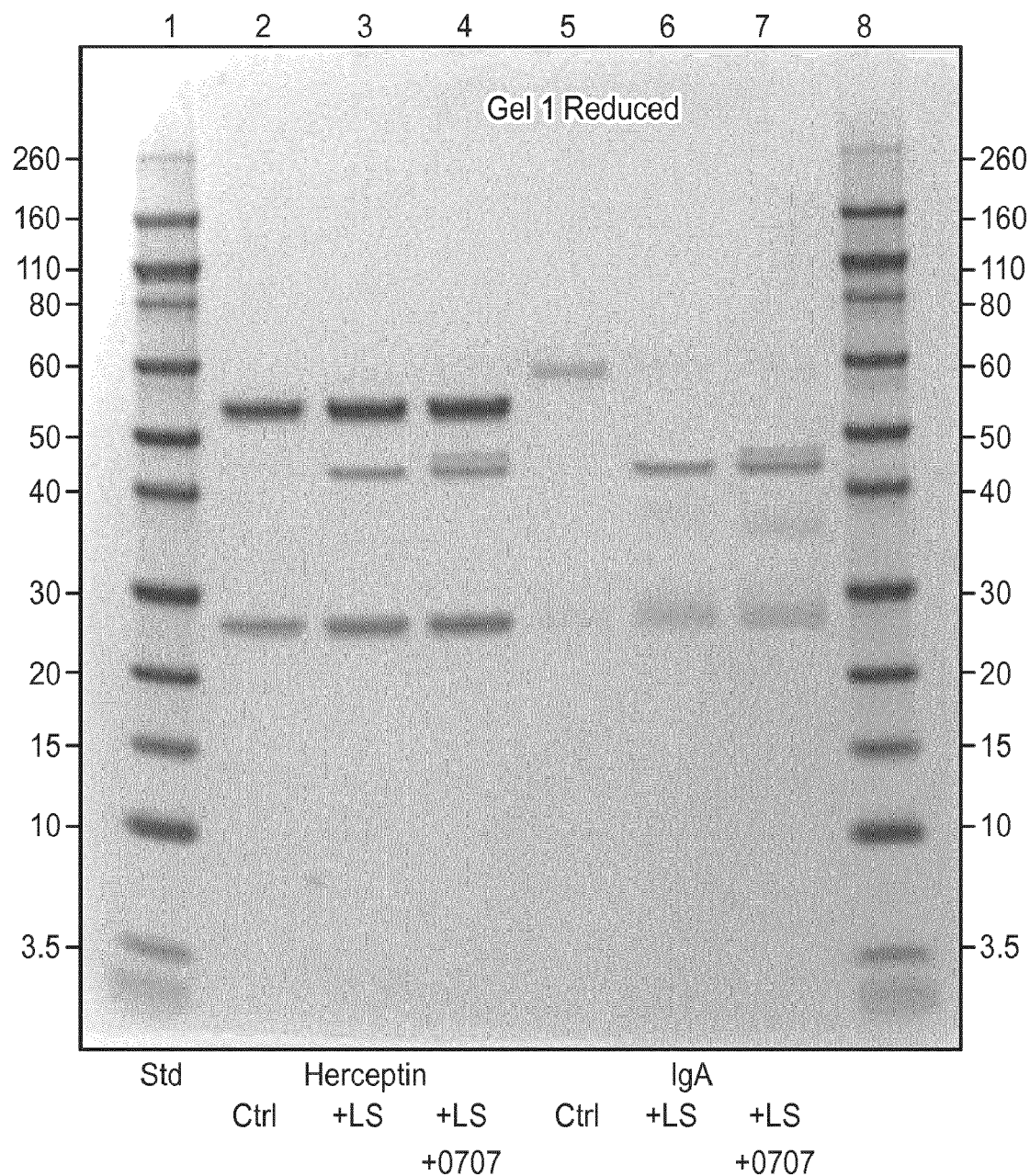

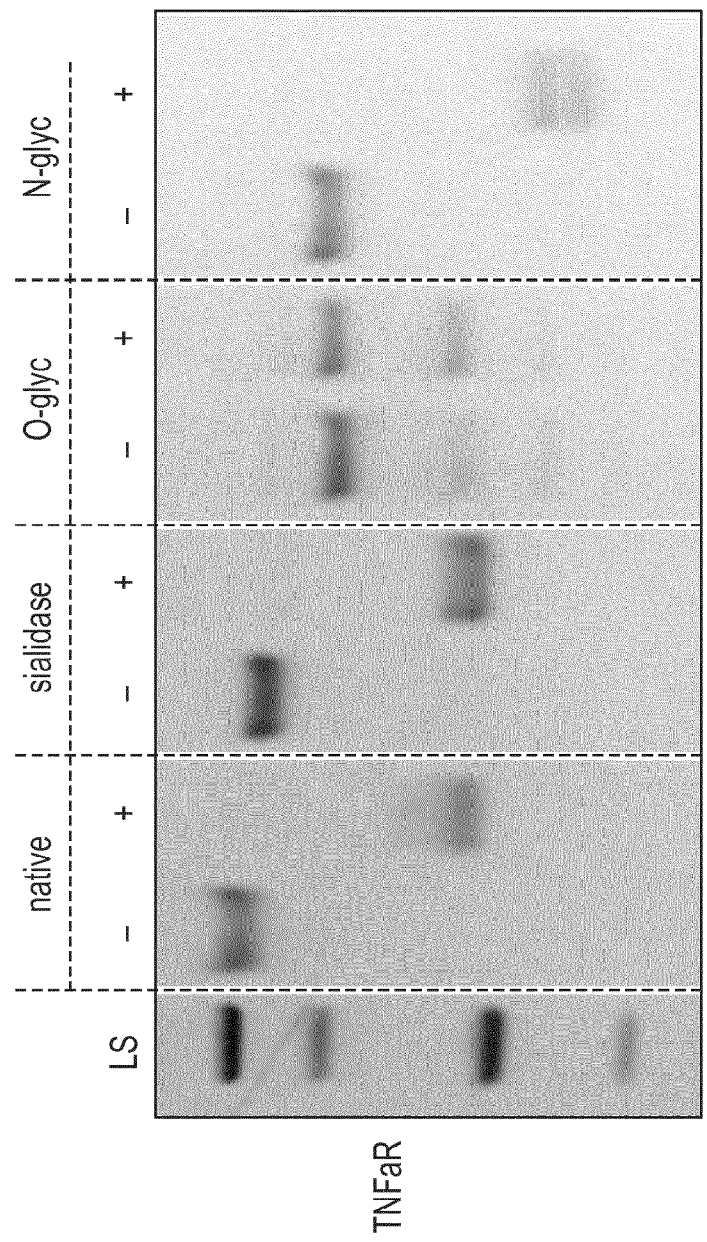

Fig. 5B

```
         10          20          30          40          50          60          70          80          90
LPAQVAFTPY  APEPGSTCRL  REYYDQTAQM  CCSKCSPGQH  AKVFCTKTSD  TVCDSCEDST  YTQLMNWVPE  CLSCGSRCSS  DQVETQACTR 100         110         120         130         140         150         160         170         180
EQNRICTCRP  GWYCALSKQE  GCRLCAPLRK  CRPGFGVARP  GTETSDVVCK  PCAPGTFSNT  TSSTDICRPH  QICNVVAIPG  NASMDAVCTS 190         200         210         220         230         240         250         260         270
TSPTRSMAPG  AVHLPQPVST  RSQHTQPTPE  PSTAPSTSFL  LPMGPSPPAE  GSTGDEPKSC  DKTHTCPPCP  APELLGGPSV  FLFPPKPKDT 280         290         300         310         320         330         340         350         360
LMISRTPEVT  CVVVDVSHED  PEVKFNWYVD  GVEVHNAKTK  PREEQYNSTY  RVVSVLTVLH  QDWLNGKEYK  CKVSNKALPA  PIEKTISKAK 370         380         390         400         410         420         430         440         450
GQPREPQVYT  LPPSREEMTK  NQVSLTCLVK  GFYPSDIAVE  WESNGQPENN  YKTTPPVLDS  DGSFFLYSKL  TVDKSRWQQG  NVFSCSVMHE 460         470
ALHNHYTQKS  LSLSPGK
```

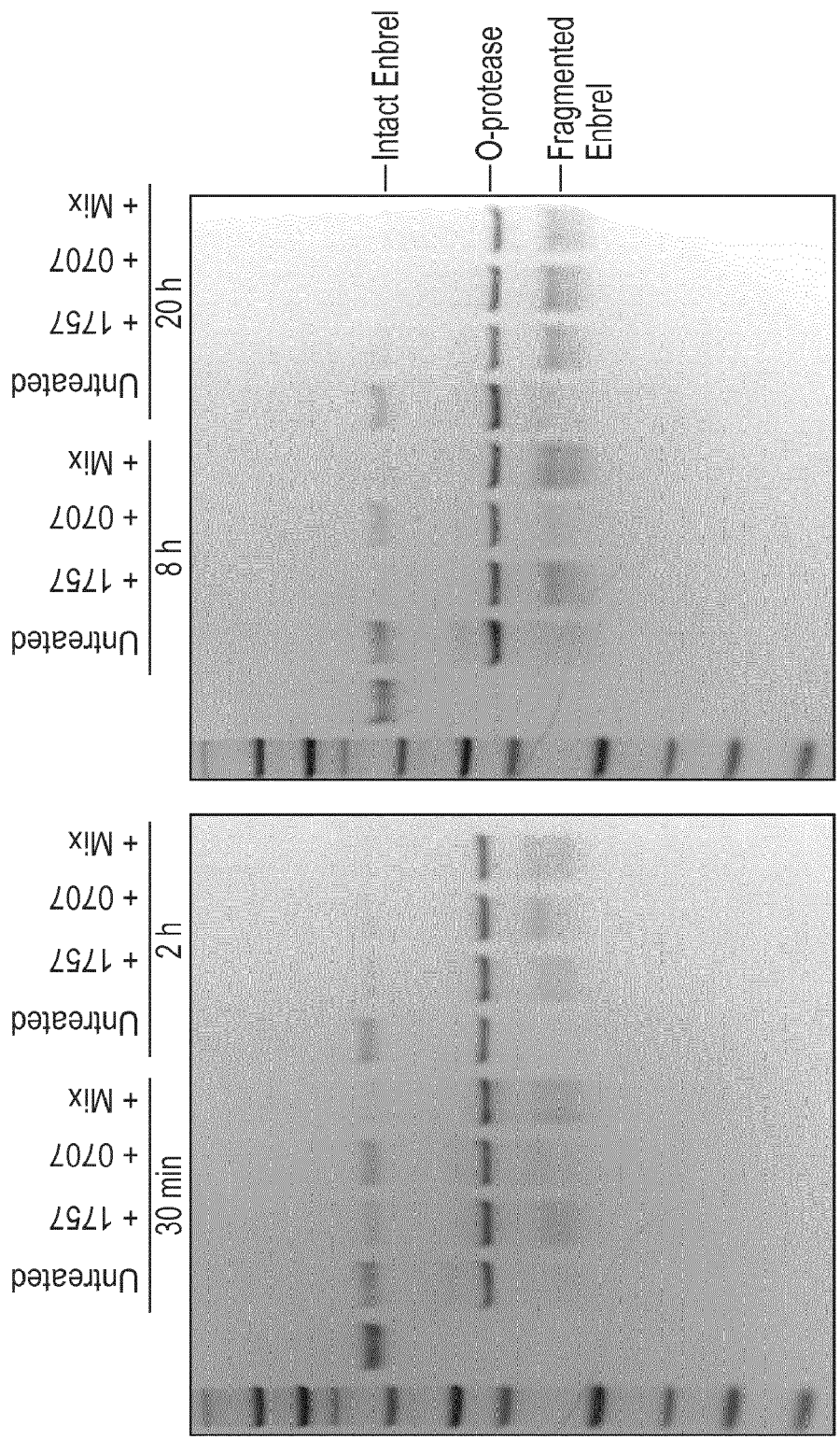

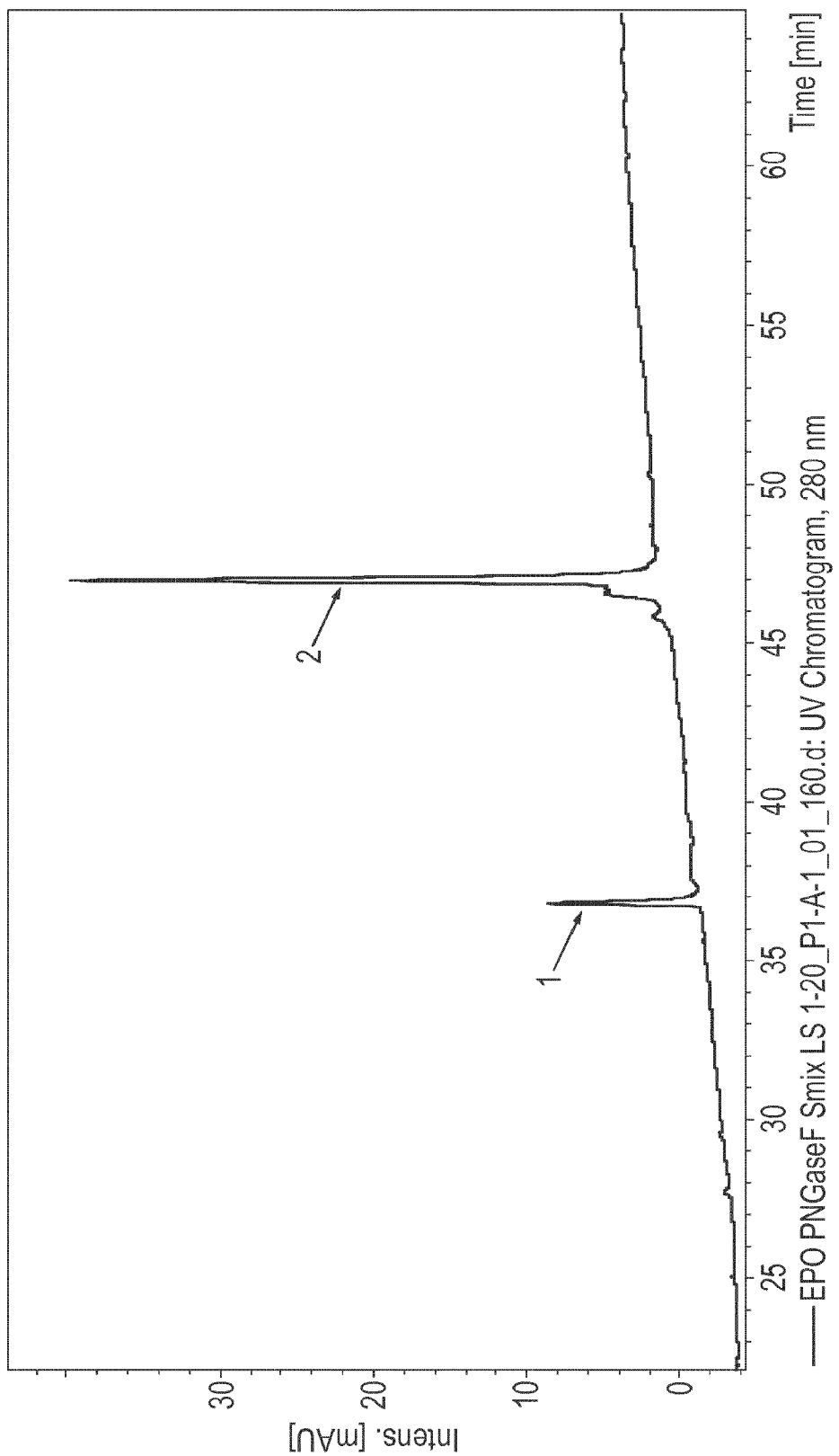

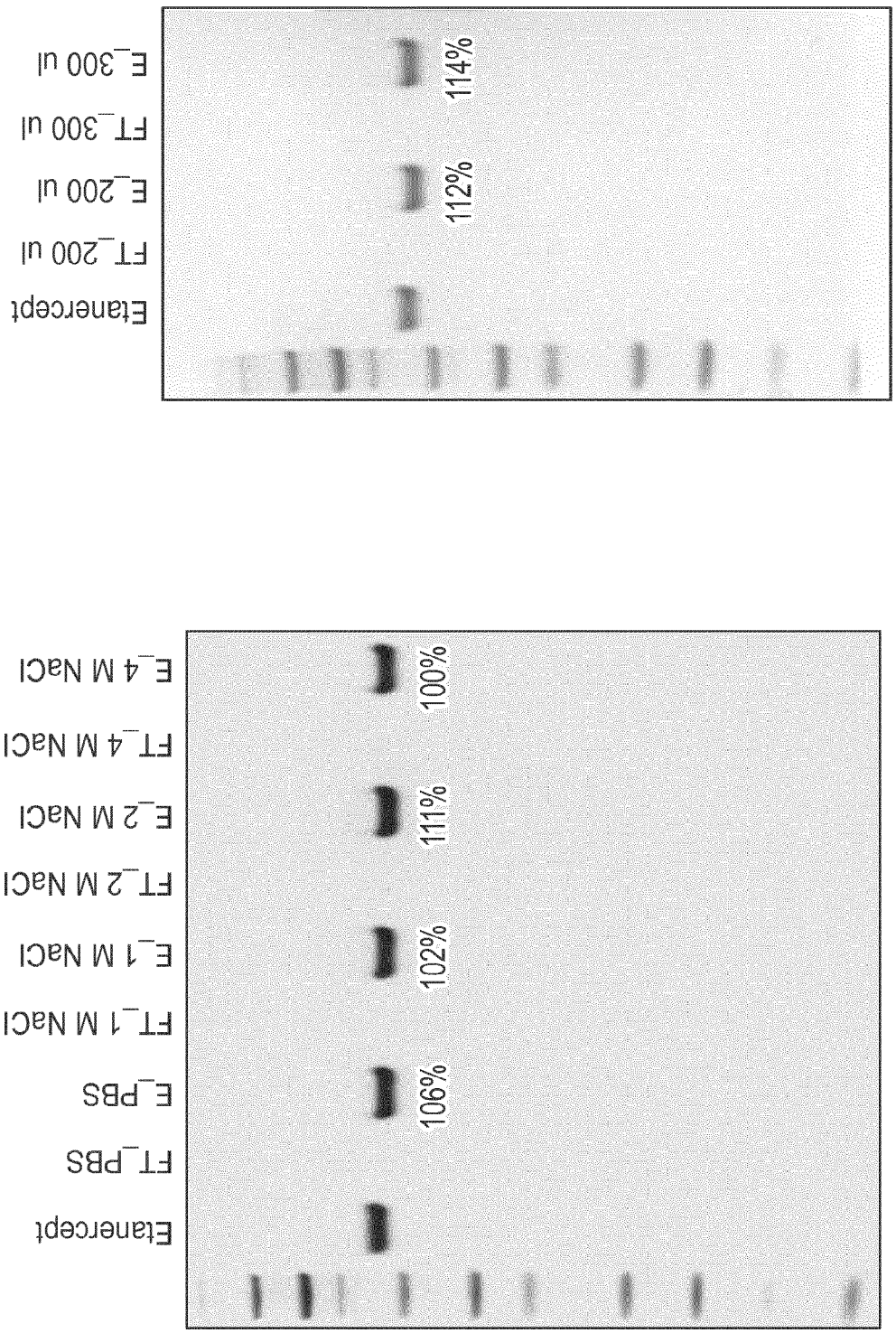

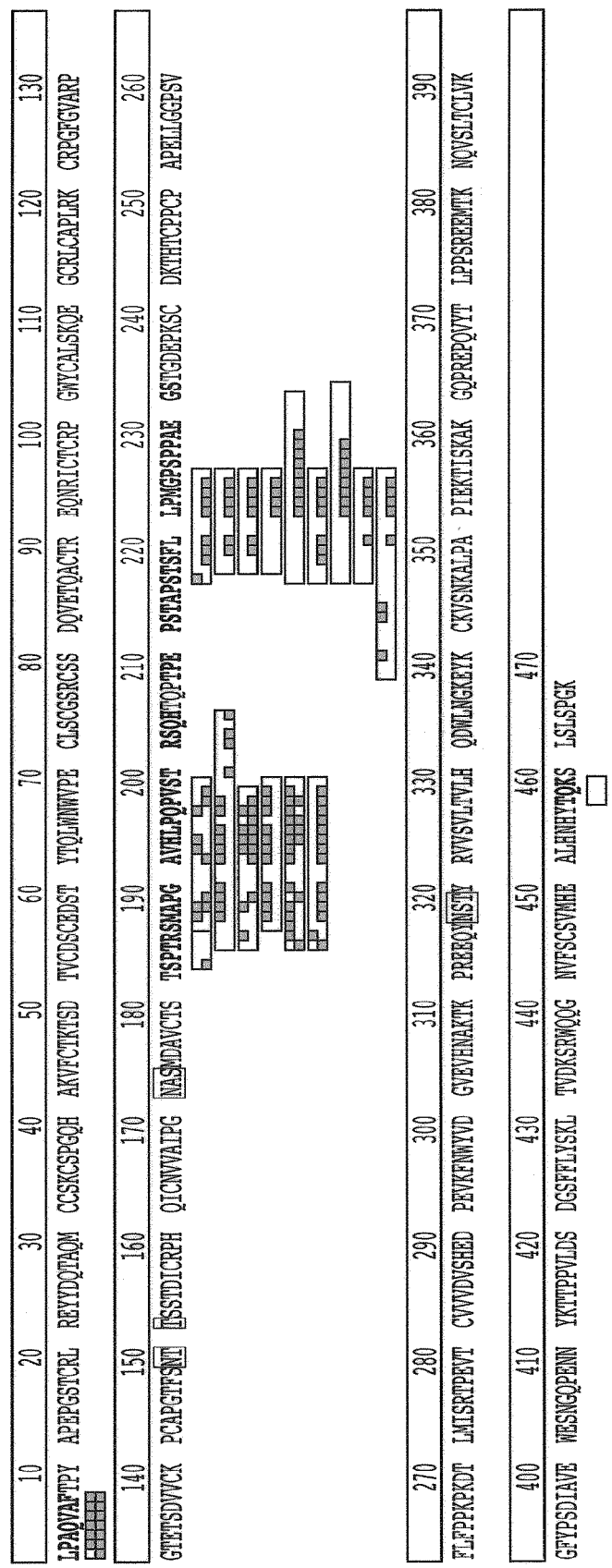
Fig. 16B.1

Fig. 16B.2

```
  10         20         30         40         50         60         70         80         90         100        110        120        130
LPAQVAFTPY APEPGSTCRL REYYDQTAQM CCSKCSPGQH AKVFCTKTSD TVCDSCEDST YTQLWNWVPE CLSCGSRCSS DQVETQACTR EQNRICTCRP GWYCALSKQE GCRLCAPLRK CRPGHGVARP
  140        150        160        170        180        190        200        210        220        230        240        250        260
GTETSDVVCK PCAPGTFSNT TSSTDICRPH QICNVVAIPG NASMDAVCTS TSPTRSMAPG AVHLPQPVST RSQHTQTPPE PSTAPSTSFL LPMGPSPPAE GSTGDEPKSC DKTHTCPPCP APELLGGPSV
  270        280        290        300        310        320        330        340        350        360        370        380        390
FLFPPKPKDT LMISRTPEVT CVVVDVSHED PEVKFNWYVD GVEVHNAKTK PREEQYNSTY RVVSVLTVLH QDWLNGKEYK CKVSNKALPA PIEKTISKAK GQPREPQVYT LPPSREEMTK NQVSLTCLVK
  400        410        420        430        440        450        460        470
GFYPSDIAVE WESNGQPENN YKTTPPVLDS DGSFFLYSKL TVDKSRWQQG NVFSCSVMHE ALHNHYTQKS LSLSPGK
```

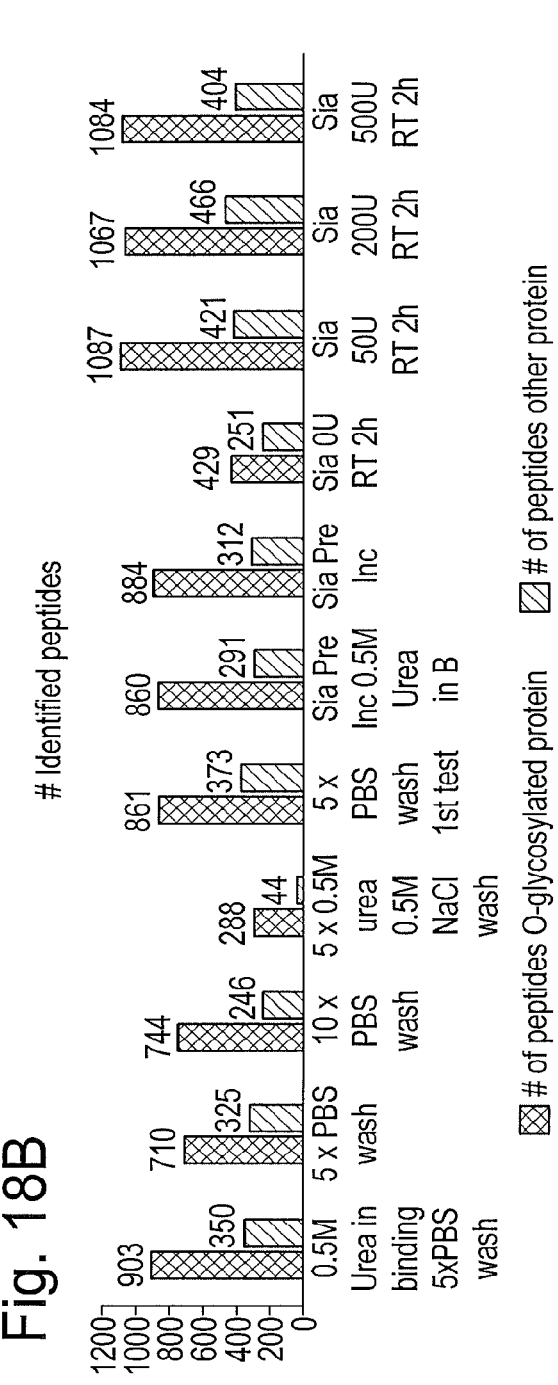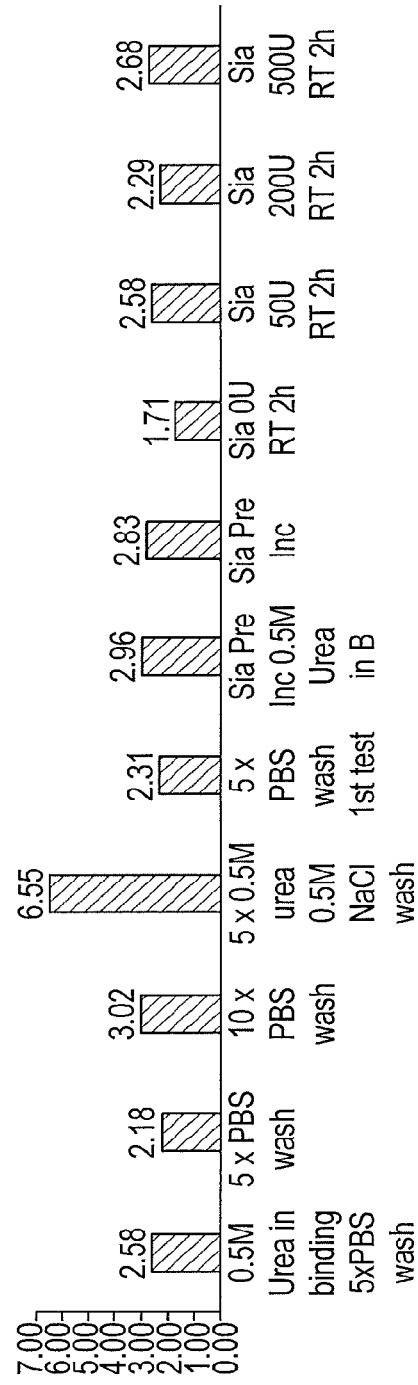

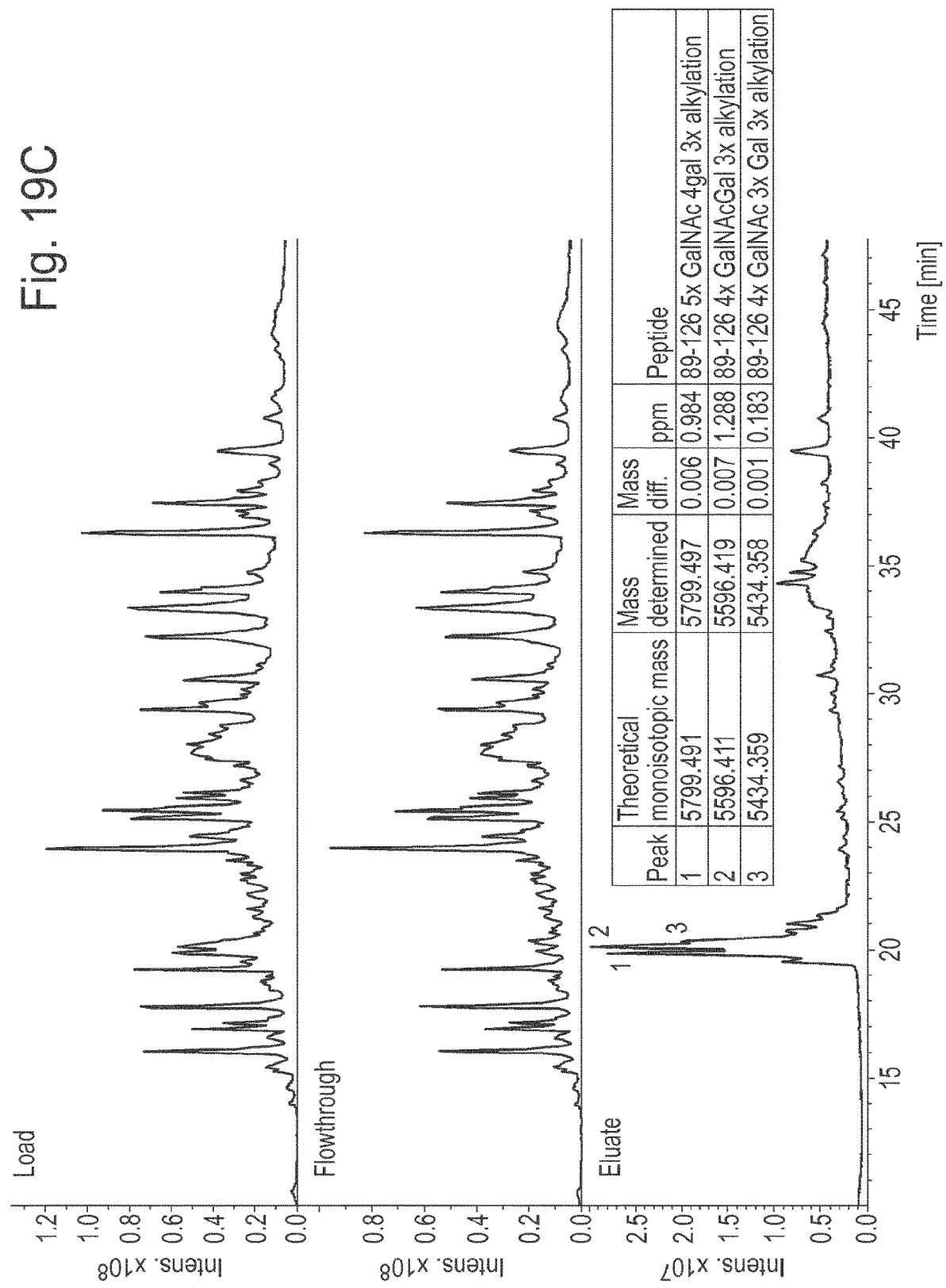

PROTEASE AND BINDING POLYPEPTIDE FOR O-GLYCOPROTEINS

FIELD OF THE INVENTION

The present invention relates to a novel endoprotease, mutants thereof having binding but lacking or having reduced hydrolyzing activity, and use in methods of studying and isolating O-linked glycoproteins.

INCORPORATION BY REFERENCE OF SEQUENCE LISTING PROVIDED AS A SEQUENCE LISTING XML FILE

A Sequence Listing is provided herewith as a Sequence Listing XML, DYNG-003DIV_SEQ_LIST, created on Dec. 22, 2022 and having a size of 110,646 bytes. The contents of the Sequence Listing XML are incorporated herein by reference in their entirety.

BACKGROUND OF THE INVENTION

Recently, the impact of glycosylation on biological functions has gathered increased attention, in particular in regards to O-linked glycans. However, while the interest for these important protein modifications have been renewed, the tools to efficiently study the glycans, and the glycoproteins, have been lacking.

Several exo- and endoglycosidases which are highly useful for both O-linked glycan removal from native proteins and for glycan sequencing have been developed. Both of these approaches can be used individually to reduce the heterogeneity of glycoproteins, thus facilitating the analysis of the protein and its fragmented peptides in mass spectrometry. A more efficient analysis of the biological effect of the glycans by downstream analysis of the functions affected by the hydrolysis can also be carried out. However, such tools are not efficient, for example, for facilitating the identification of O-linked glycoproteins, determination of the site of glycosylation and purification of O-linked glycopeptides.

The first O-glycoprotein-specific endoprotease, binding to O-glycans and mainly hydrolyzing R—N-bonds close to the glycan, was reported in 1991/1992 (Abdullah et al., J Bacteriol 173, 5597-5603 (1991); Abdullah et al., Infect Immun 60, 56-62 (1992). However, this enzyme is of limited usefulness for medicine and biotechnology because it is specific only for O-glycans comprising sialic acids (most but far from all O-linked glycans) and has specific amino acid demands, resulting in low levels of hydrolysis in general. There is a need for better tools for studying O-linked glycoproteins.

SUMMARY OF THE INVENTION

The present inventors have identified, purified and characterised a novel polypeptide from *Akkermansia muciniphila*, referred to herein as LS. This polypeptide acts as an endoprotease, specifically cleaving/hydrolysing amino acid bonds N terminal to and in proximity of an O-linked glycan, without showing any specificity or limitation to a particular amino acid sequence.

The inventors have also modified the sequence of LS and have identified mutants that are able to bind to O-linked glycans but lack or have a reduced ability to hydrolyze the glycoproteins. These mutants can be used for selective removal, enrichment or purification of free O-glycans, O-glycopeptides and/or O-glycoproteins.

Accordingly, in a first aspect of the invention, there is provided a polypeptide having endoprotease activity specific for O-glycosylated proteins which comprises:
 (a) an amino acid sequence of SEQ ID NO: 1;
 (b) an amino acid sequence which is at least 85% identical to the amino acid sequence of SEQ ID NO: 1 or
 (c) an amino acid sequence which is a fragment of the sequence of SEQ ID NO: 1 or a fragment of an amino acid sequence which is 85% identical to the amino acid sequence of SEQ ID NO: 1.

The invention also provides a method of hydrolysing an O-glycoprotein, wherein the method comprises contacting a sample comprising the protein with a polypeptide of the invention and optionally further comprising the detection or analysis of the hydrolysis products.

Additionally there is provided a method for assessing the glycosylation status of a protein, comprising contacting a sample comprising the protein with a polypeptide of the invention and detecting and/or analysing the products produced, optionally wherein the presence or absence of cleavage products is used to determine the presence or absence of an O-glycoprotein in the sample, and/or wherein said analysis is conducted to identify the type of a O-glycan chain and/or its position of attachment to an O-glycoprotein.

In a second aspect of the invention, there is provided a polypeptide which is capable of binding to an O-glycan, O-glycopeptide and/or O-glycoprotein and which lacks or has reduced endoprotease activity specific for O-glycosylated proteins comprising:
 (a) an amino acid sequence of SEQ ID NO: 5;
 (b) an amino acid sequence which is at least 85% identical to the amino acid sequence of SEQ ID NO: 5 or SEQ ID NO: 20; or
 (c) an amino acid sequence which is a fragment of the sequence of SEQ ID NO: 5 or SEQ ID NO: 20, or a fragment of an amino acid sequence which is 85% identical to the amino acid sequence of SEQ ID NO: 5 or SEQ ID NO: 20.

The invention also provides a method of binding to an O-glycan, O-glycopeptide and/or O-glycoprotein, wherein the method comprises contacting a sample comprising the O-glycan, O-glycopeptide and/or O-glycoprotein with a polypeptide of the invention, and optionally determining whether or not an O-glycan, O-glycopeptide or O-glycoprotein has been bound and/or separating the O-glycan and any linked glycoprotein, the O-glycopeptide or the O-glycoprotein from the resulting mixture.

Additionally there is provided a method for assessing the glycosylation status of a protein, comprising contacting a sample comprising the protein with a polypeptide of the invention and determining whether or not the protein is bound by the said polypeptide.

There is also provided a method for detecting O-glycopeptides and/or O-glycoproteins in a sample, wherein the method comprises:
 (a) contacting said sample with a polypeptide of the invention to thereby allow formation of a complex between the polypeptide of the invention and the O-linked glycopeptide and/or O-glycoprotein (an O-linked glycopeptide/protein-polypeptide complex);
 (b) optionally separating said polypeptide from the contacted sample; and
 (c) determining whether the separated polypeptide is bound to an O-linked glycopeptide or glycoprotein, thereby determining the presence or absence of O-linked glycopeptides or glycoproteins in the sample.

BRIEF DESCRIPTION OF THE FIGURES

FIG. 1: LS expression and purification. LS was expressed as a fusion protein with a C-terminal His-tag in the pET21 (a)+ vector. After transformation into BL21(DE3) Star, four individual clones were expressed and purified on His GravityFlow columns to homogeneity. Based on total quantity of protein in the purified samples, as well as purity based on SDS-PAGE, all four investigated clones expressed equally well.

FIG. 2: LS specifically acts upon proteins containing O-glycans—figure shows the products analysed by SDS-PAGE. Incubation of LS with IgG or IgA resulted in a specific degradation of IgA, but no visible activity against IgG (Herceptin/trastuzumab). All incubations took place o/n at 37° C. in PBS. Addition of sialidase (Am0707) was not necessary for the activity of LS during these conditions.

FIG. 7: α2-3 bonded sialic acids limit the efficiency of LS. Concurrent incubation of LS with a set of diverse sialidases for 30 min-20 h, using Enbrel as a glycoprotein substrate, revealed the higher efficiency in the presence of the α2-3 specific sialdiase 1757, or with the Mix (0707+1757), while the broad spectrum sialidase 0707 was not necessary for seemingly full activity of LS, thus suggesting that α2-6 (and α2-8) bonds are not a concern for LS activity.

Figure 3A:
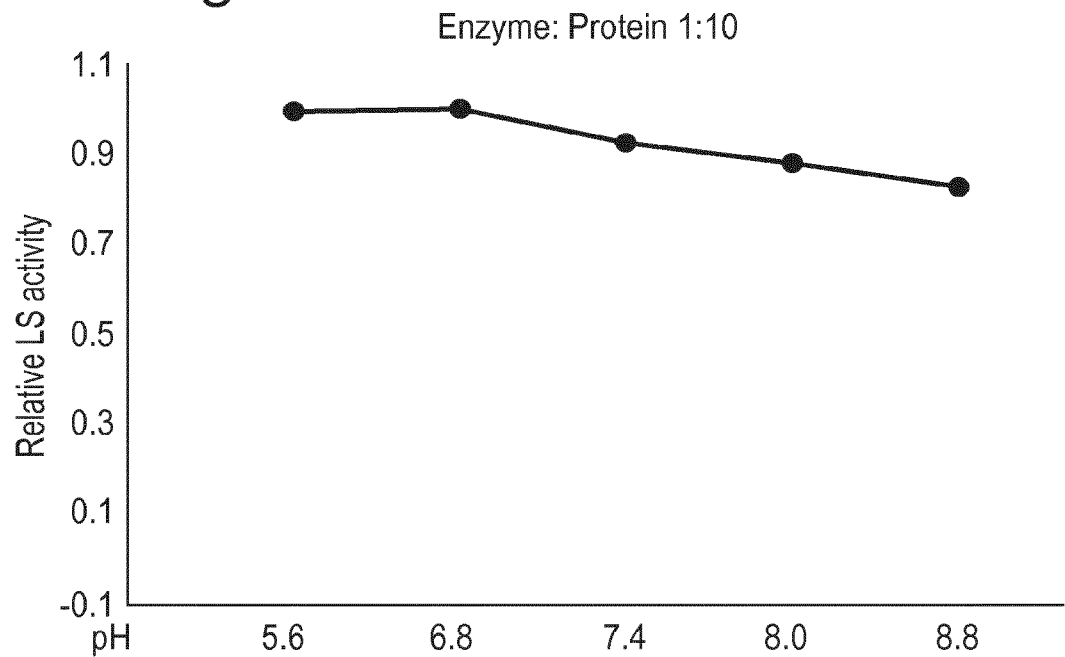
FIG. 3: Optimal enzymatic conditions. LS is active in a broad pH range (A), tolerates NaCl well (B), but is highly sensitive against EDTA (C, D), and is partly inhibited by Zn2+ (D). All experiments (except pH assay) were conducted in PBS o/n, at 37° C. For pH optimum determination, the enzyme was incubated in 20 mM Tris-HCl (pH 6.8-8.8) or 50 mM acetic acid (pH 5.6).

µg substrate (1:1-15:1, enzyme:substrate), incubating in PBS at 37° C. overnight before analysis on SDS-PAGE.

A) Lane 1: Asialylated substrate only; Lane 2: LS only, lane 3: 0.5 µg $LS_{E206A}$, lane 4: 5 µg $LS_{E206A}$, lane 5: TNFaR2+LS (1:1 ratio), lane 6: TNFaR2+$LS_{E206A}$ (1:1 ratio).

Figure 11A:
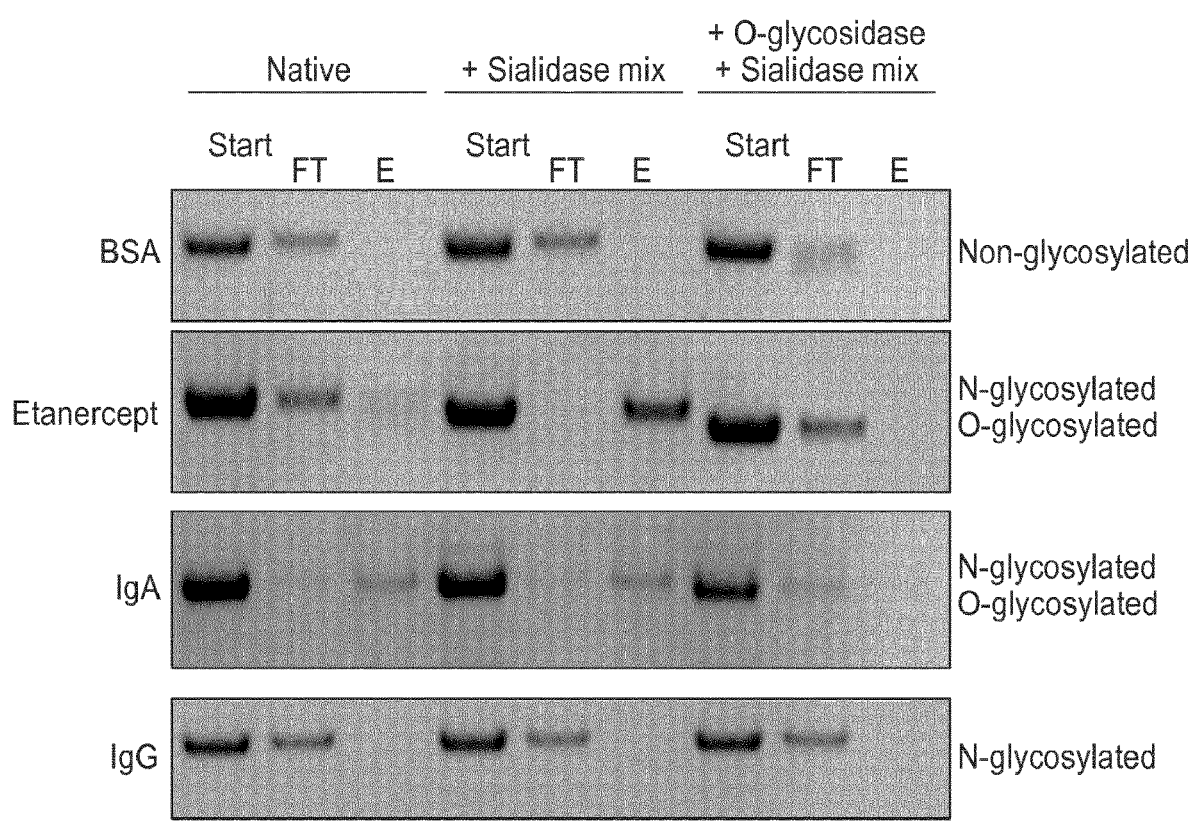
Figure 11C:
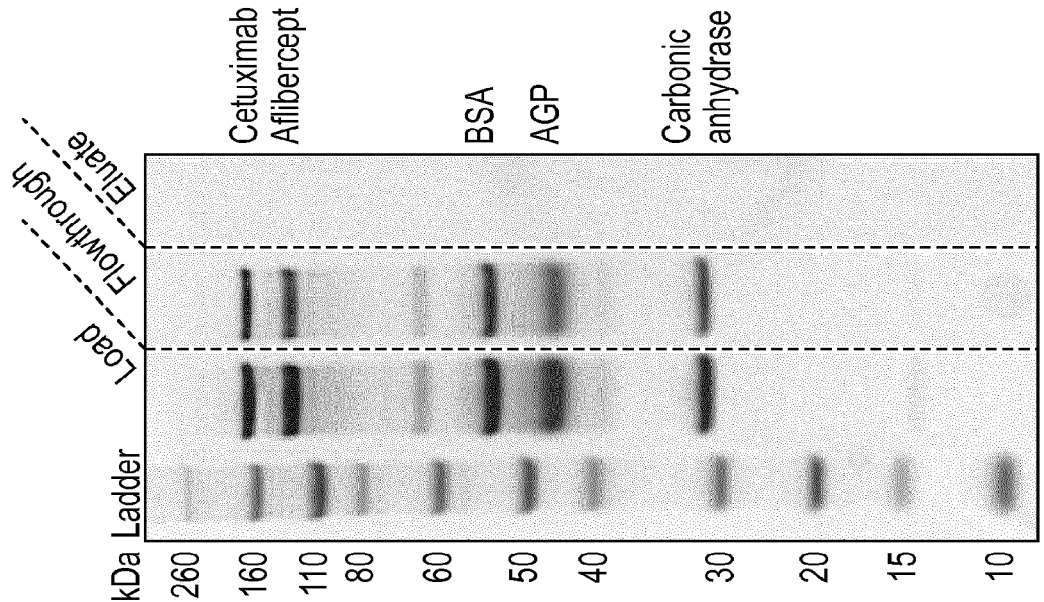
Figure 11B:
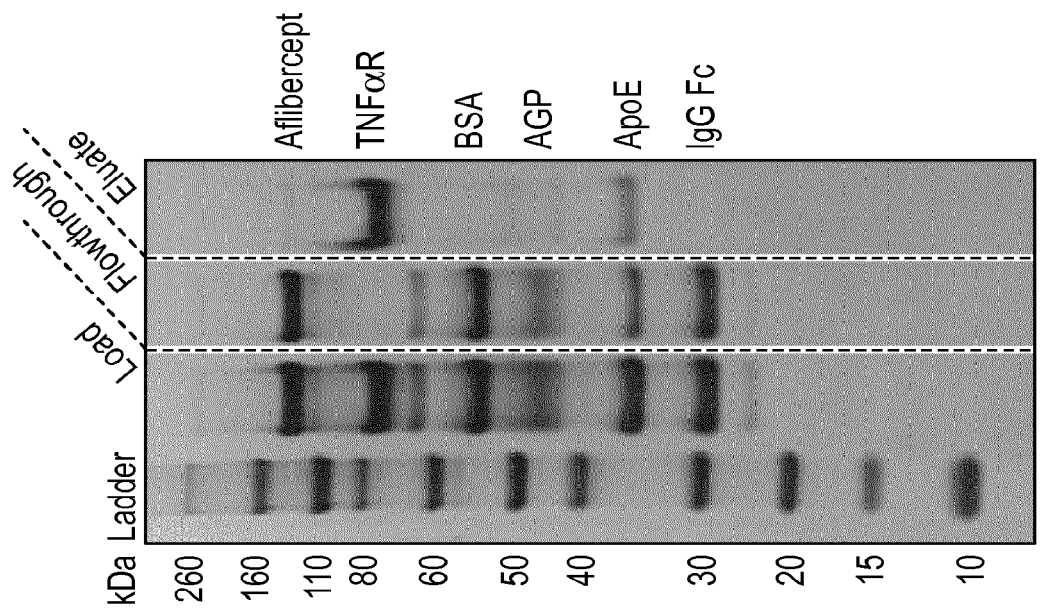

B) Lane 1: Asialylated substrate only; Lane 2: $LS_{H205A/E206A}$+Etanercept (15:1 ratio), lane 3: $LS_{H205A/E206A}$+Etanercept (5:1 ratio), lane 4: $LS_{H205A/E206A}$+Etanercept (1:1 ratio), lane 5: LS+Etanercept (1:1 ratio), lane 6: $LS_{H205A/E206A}$ FIG. 11: Results of experiments which show that $LS_{H205A/E206A}$ immobilised on resin specifically binds to O-glycan containing proteins. Figures show SDS-PAGE analyses for starting/loading material, flowthrough (FT) and Eluate (E) in each case (A) Samples included BSA (bovine serum albumin), Etanercept, IgA, and IgG, native or pretreated with Sialidase mixtures+/–O-glycosidase as shown. (B) Sample included a mix of O-glycosylated proteins (TNFαR and ApoE), N-glycosylated proteins (aflibercept, AGP (alpha-1-acid glycoprotein), IgG Fc (Fc domain of IgG) and non-glycosylated proteins (BSA), pre-treated with Sialidase mixture. (C) Sample included a mix of N-glycosylated proteins (cetuximab, aflibercept, AGP) and non-glycosylated proteins (BSA, carbonic anhydrase), pre-treated with Sialidase mixture.

FIG. 12: Results of experiment showing that immobilised $LS_{H205A/E206A}$ has a concentration dependent capacity for binding of O-glycoproteins. Asialylated Etanercept (50-250 µg; in 100 µl PBS) was added to 50 µl PBS-equilibrated $LS_{H205A/E206A}$ resin with different immobilization conditions of $LS_{H205A/E206A}$ (5-15 mg/mL). Proteins were allowed to bind to the resin for 2 hours at room temperature with end-over-end rotation. The resin was washed three times with PBS (350 µl) and then eluted with the addition of 8 M Urea (50 µl, 5 min incubation; 2 repeats). To study the effect of urea and guanidine hydrochloride (GHCl) in the binding, it was included in the binding buffer together with 50 µg asialylated Etanercept, but otherwise handled identically. (A) All samples were separated on SDS-PAGE, and band intensities determined through densitometry using GelDoc EZ and the software ImageLab. Stated percentages indicate the band intensity as compared to the control. (B) Protein binding capacity, as determined by the band intensity, was plotted versus the amount of immobilized $LS_{H205A/E206A}$.

Figure 13:
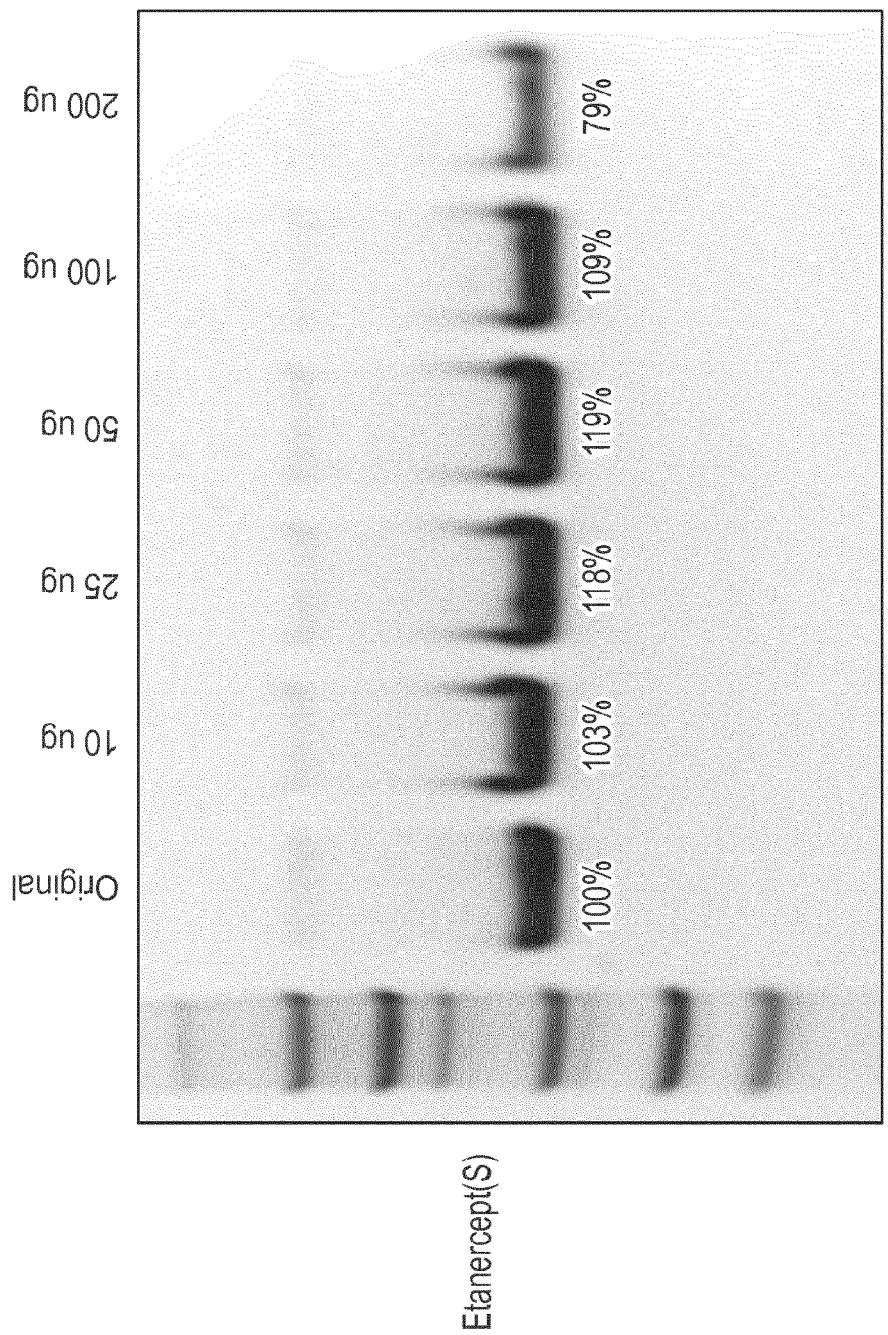

FIG. 13: Results of experiment showing that $LS_{H205A/E206A}$ can affinity purify around 3 mg of etanercept/mL of resin. Asialylated etanercept (10-200 µg; 100 µl in PBS) was added to 50 µl PBS-equilibrated $LS_{H205A/E206A}$ resin. Proteins were allowed to bind to the resin for 2 hours at room temperature with end-over-end rotation. The resin was washed three times with PBS (350 µl) and then eluted with the addition of 8 M Urea (50 µl, 5 min incubation; 2 repeats). All samples were separated on SDS-PAGE, and band intensities determined through densitometry using GelDoc EZ and the software ImageLab. Stated percentages indicate the band intensity as compared to the control.

Figure 14C:
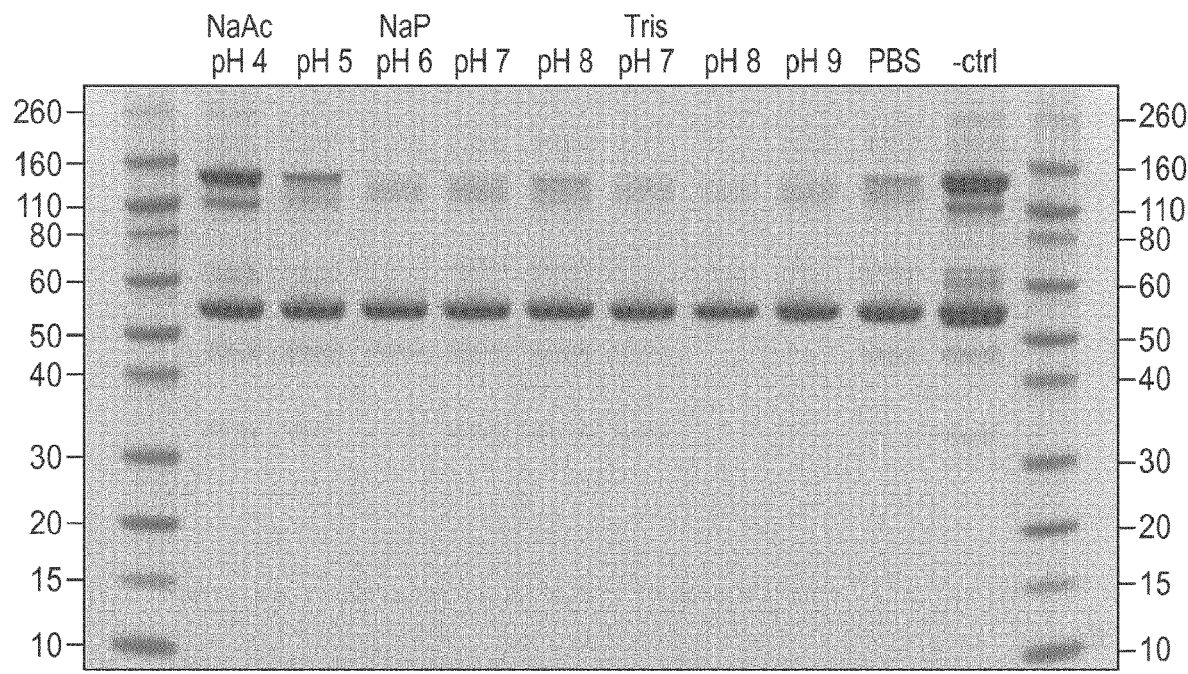
Figure 14D:
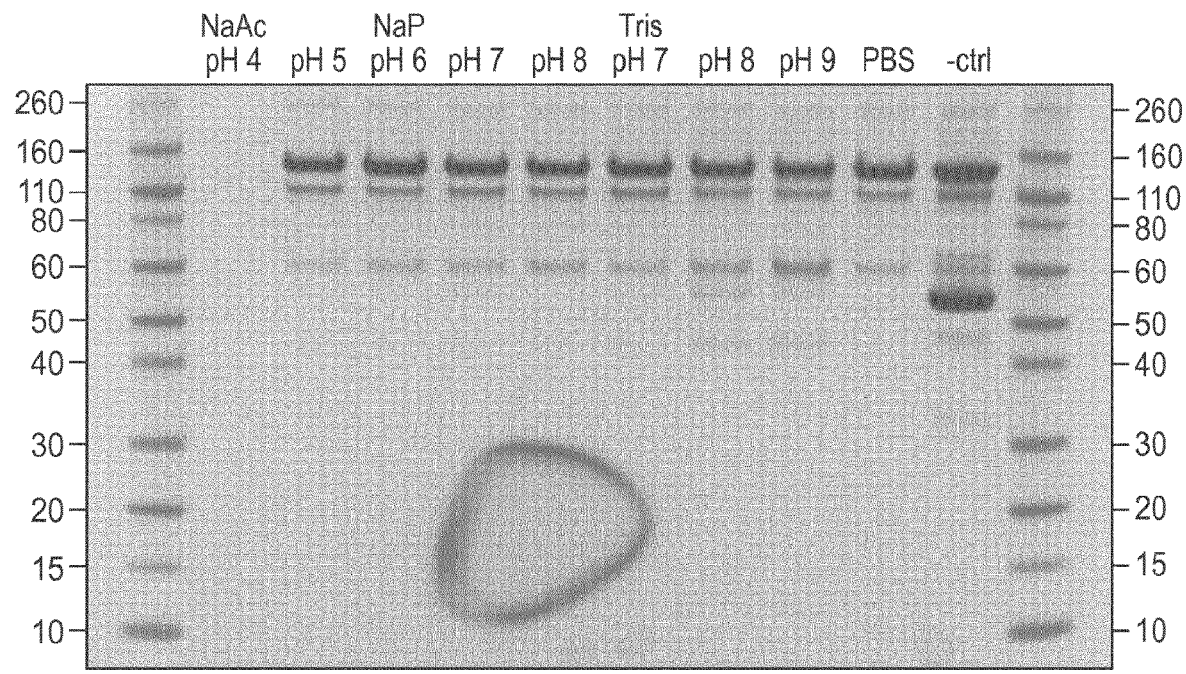

FIG. 14: Results of experiment showing that $LS_{H205A/E206A}$-substrate interaction is insensitive to high ionic strengths and differences in buffer volume/type, and works over a broad pH range. (A) Asialylated etanercept, 50 µg; 100 µl in PBS with added NaCl at concentrations as shown (B) Asialylated etanercept, 50 µg; 100-300 µl in PBS as shown; (C) Flow through from samples of asialylated etanercept (50 µg) and BSA (50 µg) in different buffers at different pHs as shown; (D) Eluates from the samples of C.

FIG. 15: Results of experiment showing that denaturation or addition of detergents elutes O-glycoproteins bound to $LS_{H205A/E206A}$. Asialylated Etanercept (50 µg; 100 µl in PBS) was added to 50 µl PBS-equilibrated $LS_{H205A/E206A}$ resin. Proteins were allowed to bind to the resin for 2 hours at room temperature with end-over-end rotation. The resin was washed three times with PBS (350 µl) and then eluted with the addition of (A) 1-8 M Urea or (B) 1.25-10% SDS (50 µl, 5 min incubation; 2 repeats). All samples were separated on SDS-PAGE for analysis.

Figure 16A:
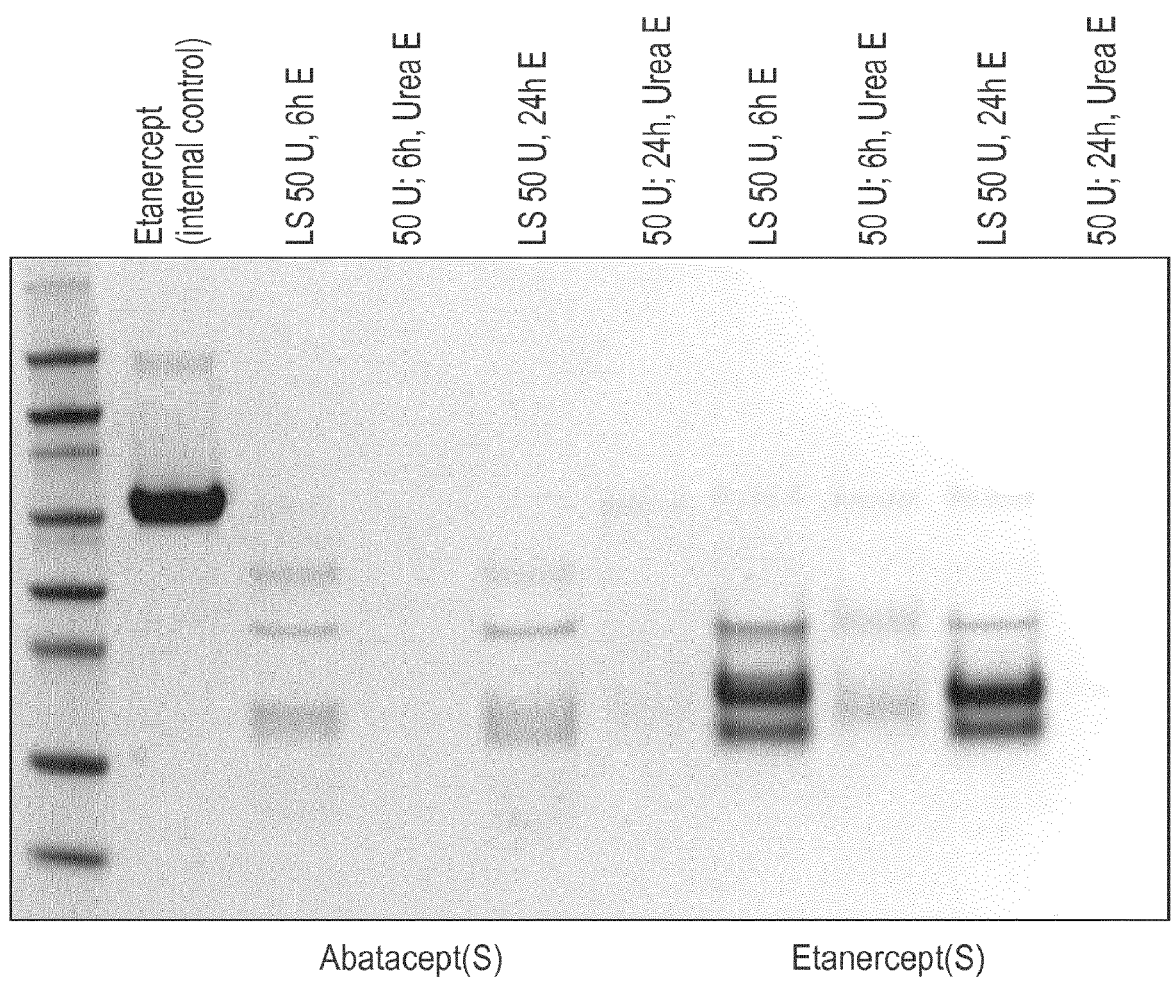

FIG. 16A: Results of experiment showing enzymatic elution of $LS_{H205A/E206A}$-bound O-glycoproteins using LS. Asialylated Abatacept (10 µg, 100 µl in PBS) and Etanercept (50 µg; 100 µl in PBS) were added to 50 µl PBS-equilibrated $LS_{H205A/E206A}$ resin. Proteins were allowed to bind to the resin for 2 hours at room temperature with end-over-end rotation. The resin was washed three times with binding buffers (350 µl) before addition of 50 Units LS in a total volume of 100 µl PBS. The samples were incubated for an additional 6-24 hours at 37° C. with shaking (450 rpm). LS released O-glycoproteins/glycopeptides were collected through centrifugation (1000 g, 1 min) before the column was finally eluted with the addition of 8 M Urea (50 µl, 5 min incubation; 2 repeats). All samples were separated on SDS-PAGE for analysis.

FIG. 16B: Results of mass spec analysis (liquid chromatography mass spectrometry (LC/MS) and tandem mass spectrometry (MS/MS)) of Etanercept eluted with LS. Identified peptides (FIG. 16B.1; SEQ ID NO: 51) were consistent with those generated in a LS digestion of etanercept (FIG. 16B.2: SEQ ID NO: 51). Identified peptides (white boxes) were fitted to the sequence of Etanercept based on m/z values and MS/MS data, with y' and b' ions marked as small grey boxes. All white boxes (e.g. peptides) start directly at a T or an S, where O-glycans are attached.

FIG. 17: Results demonstrating the affinity purification and enrichment of O-glycosylated serum proteins. (A) Asialylated serum (20 µl; 100 µl in PBS) was added to 50 µl PBS equilibrated $LS_{H205A/E206A}$ resin. Proteins were allowed to bind to the resin for 2 hours at room temperature with end-over-end rotation. The resin was washed three times with binding buffer (350 µl) and then eluted with the addition of 8 M Urea. (B) To investigate the impact of glycans for the interaction, samples were pre-treated with a sialidase mixture+/–O-glycosidase. The downstream purification was performed as described above. (C) Serum (40 µl) was mixed with PBS (up to 100 µl) and sialidase mixture (50-500 Units) and added to a PBS equilibrated column, incubating for 2 hours at room temperature with end-over-end rotation, after which the samples were washed and eluted as described above. All samples were separated on SDS-PAGE for analysis.

FIG. 18: Results showing enrichment of O-glycoproteins from human serum. Human serum diluted 2.5× in PBS to 100 µl was applied on 50 µl PBS equilibrated $LS_{H205A/E206A}$ resin in a spin column. 50-500 Units Sialidase mixture, was added and co-incubated on the resin at RT for 2 h. Flow through was collected, and the resin was washed 5-10 times with PBS. The bound proteins were eluted in 8 M urea followed by denaturation and reduction with the addition of 5 mM DTT and a 60-minute incubation at 37° C. The reduced cysteines were alkylated with 15 mM iodoacetamide at RT in dark for 30 minutes. Samples were buffer exchanged to 50 mM Tris pH 8.0 on a Spin Desalting Column. Trypsin (2.5 µg) was added to the solution and digestion was overnight at 37° C. Peptides were separated and analysed using RP-LC MS/MS on a C18 column in a 0.1% FA in MQ: 0.1% FA in 95% ACN gradient at 45° C. and a flow of 0.2 ml/min. Detection was on an ESI-Q-TOF. Data were converted to mgf format files and searched against the Swiss Prot database (A) Identified peptides coming from proteins annotated as O-glycosylated proteins or non-O-glycosylated. Only proteins with >6 matching peptides and a MASCOT score >200 were included. (B) Different washing steps resulted in changes in identified peptides, as well as changed ratio of O-glycosylated to non-O-glycosylated proteins (C). Sia=Sialidase treated; Sia Pre=Sialidase Pre-treated.

FIG. 19: Results of experiments that show that the immobilized double-mutant also binds to shorter O-glycopeptides. A shows representative results for LC/MS analysis of binding to a prepared mix of an O-glycosylated peptide (glycodrosocin (GD)) and several non-glycosylated peptides (H2686, H4062 H8390 and insulin oxidized beta chain (IOB). B shows a schematic diagram of IgA illustrating that tryptic digest will product a single O-glycosylated peptide (SEQ ID NO: 58). C shows representative results for LC/MS analysis of binding to the tryptic digest of IgA.

FIG. 20: Results of experiments that show that the immobilized double-mutant compares favorably to other commercially available O-glycoprotein binding matrixes. A shows representative SDS-PAGE gels comparing the presence of etanercept or asialylated etanercept (etanercept(S)) in flow through (FT) or Eluate (E) following incubation with different immobilized lectins or LS double mutant as shown. B shows densitometry analysis of the gels, relative to positive control of 1.5 μg directly-loaded substrate.

BRIEF DESCRIPTION OF THE SEQUENCES

SEQ ID NO: 1 is the amino acid sequence of a polypeptide having O-glycoprotein-specific endoprotease activity.

SEQ ID NO: 2 is an amino acid sequence of an exemplary polypeptide of the invention having O-glycoprotein-specific endoprotease activity. Relative to SEQ ID NO: 1 it includes an additional N terminal Methionine and a C-terminal linker+His$_6$ (SEQ ID NO: 62) tag. The polypeptide consisting of this sequence may be referred to herein as LS.

SEQ ID NO: 3 is a nucleotide sequence encoding a polypeptide having the sequence of SEQ ID NO:2.

SEQ ID NO: 4 is the wild-type amino acid sequence of a polypeptide isolated from *Akkermansia muciniphila* having O-glycoprotein-specific endoprotease activity. Relative to SEQ ID NO: 1 it includes a signal motif at the N terminus.

SEQ ID NO: 5 is the amino acid sequence of a polypeptide that is capable of binding to O-glycans but lacks or has reduced O-glycoprotein-specific endoprotease activity.

SEQ ID NO: 6 is an amino acid sequence of an exemplary polypeptide of the invention that is capable of binding to O-glycans but lacks or has reduced O-glycoprotein-specific endoprotease activity. Relative to SEQ ID NO: 5 it includes an additional N terminal Methionine and a C-terminal linker+His$_6$ (SEQ ID NO: 62) tag. The polypeptide consisting of this sequence may be referred to herein as LS$_{E206A}$.

SEQ ID NO: 7 is a nucleotide sequence encoding a polypeptide having the sequence of SEQ ID NO: 6.

SEQ ID NO: 8 is the metalloprotease domain motif of an exemplary polypeptide of the invention that has O-glycoprotein-specific endoprotease activity.

SEQ ID NO: 9 is the wild-type amino acid sequence of a sialidase, Am1757, isolated from *Akkermansia muciniphila*. It includes a signal motif at the N terminus.

SEQ ID NO: 10 is the wild-type amino acid sequence of a sialidase, Am1757, lacking a signal motif at the N terminus relative to SEQ ID NO: 9.

SEQ ID NO: 11 is an amino acid sequence of an exemplary sialidase, Am1757. Relative to SEQ ID NO: 10 it includes an additional N terminal Methionine and a C-terminal linker+His$_6$ (SEQ ID NO: 62) tag.

SEQ ID NO: 12 is wild-type amino acid sequence of a sialidase, Am0707, isolated from *Akkermansia muciniphila*. It includes a signal motif at the N terminus.

SEQ ID NO: 13 is the wild-type amino acid sequence of a sialidase, Am0707, lacking a signal motif at the N terminus relative to SEQ ID NO: 12.

SEQ ID NO: 14 is an amino acid sequence of an exemplary sialidase, Am0707. Relative to SEQ ID NO: 13 it includes an additional N terminal Methionine and a C-terminal linker+His$_6$ (SEQ ID NO: 62) tag.

SEQ ID NO: 15 is the amino acid sequence of an O-glycosidase isolated from *S. oralis*.

SEQ ID NOs: 16 and 17 are primer sequences.

SEQ ID NO: 18 shows the amino acid sequence of EPO.

SEQ ID NO: 20 is the amino acid sequence of a polypeptide that is capable of binding to O-glycans but lacks or has reduced O-glycoprotein-specific endoprotease activity.

SEQ ID NO: 21 is an amino acid sequence of an exemplary polypeptide of the invention that is capable of binding to O-glycans but lacks or has reduced O-glycoprotein-specific endoprotease activity. Relative to SEQ ID NO: 20 it includes an additional N terminal Methionine and a C-terminal linker+His$_6$ (SEQ ID NO: 62) tag. The polypeptide consisting of this sequence may be referred to herein as LS$_{HE206AA}$ or LS$_{H205A/E206A}$.

SEQ ID NO: 22 is a nucleotide sequence encoding a polypeptide having the sequence of SEQ ID NO: 21.

SEQ ID NOs: 23, 24 and 25 are sequences of disrupted metalloprotease domain motifs, each from a polypeptide of the invention that is capable of binding to O-glycans but lacks or has reduced O-glycoprotein-specific endoprotease activity.

SEQ ID NOs: 26, 27 and 28 are the amino acid sequences of polypeptides each having O-glycoprotein-specific endoprotease activity.

SEQ ID NO: 29, 30 and 31 are the amino acid sequences of exemplary polypeptides having O-glycoprotein-specific endoprotease activity. Relative to SEQ ID NOs: 26, 27 and 28, respectively, SEQ ID NOs: 29, 30 and 31 each include an additional N terminal Methionine and a C-terminal linker+His$_6$ (SEQ ID NO: 62) tag.

SEQ ID NOs: 32, 33 and 34 are wild-type amino acid sequences of polypeptides having O-glycoprotein-specific endoprotease activity, which were isolated from *Pseudomonas aeruginosa* PAO1, *Bacteroides thetaiotaomicron* VPI-5482, and *Clostridium perfringens*, respectively. Relative to SEQ ID NOs: 26, 27 and 28, respectively, each includes a signal motif at the N terminus.

SEQ ID NOs: 35, 36 and 37 are the amino acid sequences of polypeptides that are each capable of binding to O-glycans but lack or have reduced O-glycoprotein-specific endoprotease activity.

SEQ ID NO: 38, 39, and 40 are the amino acid sequences of exemplary polypeptides of the invention that are each capable of binding to O-glycans but lack or have reduced O-glycoprotein-specific endoprotease activity. Relative to SEQ ID NOs: 35, 36 and 37, respectively, SEQ ID NOs: 38, 39 and 40 each include an additional N terminal Methionine and a C-terminal linker+His$_6$ (SEQ ID NO: 62) tag.

SEQ ID NOs: 41-43 are the amino aid sequences of representative metalloprotease motifs of O-glycoprotein-specific endoproteases.

SEQ ID NOs: 44-46 are the amino acid sequences of representative disrupted metalloprotease motifs of polypeptides that are capable of binding to O-glycans but lack or have reduced O-glycoprotein-specific endoprotease activity.

SEQ ID NO: 47 is the amino acid sequence of the glycodrosocin peptide. There is a O-glycosylation site on the T residue.

SEQ ID NOs: 48 to 50 are the amino acid sequences of peptides which are not O-glycosylated.

DETAILED DESCRIPTION OF THE INVENTION

It is to be understood that different applications of the disclosed products and methods may be tailored to the specific needs in the art. It is also to be understood that the terminology used herein is for the purpose of describing particular embodiments of the invention only, and is not intended to be limiting. All publications, patents and patent applications cited herein, whether supra or infra, are hereby incorporated by reference in their entirety.

As used in this specification and the appended claims, the singular forms "a", "an", and "the" include plural referents unless the content clearly dictates otherwise. Thus, for example, reference to "a polypeptide" includes "polypeptides", and the like.

General Polypeptide Features

A "polypeptide" is used herein in its broadest sense to refer to a compound of two or more subunit amino acids, amino acid analogs, or other peptidomimetics. The term "polypeptide" thus includes short peptide sequences and also longer polypeptides and proteins. The terms "protein", "peptide" and "polypeptide" may be used interchangeably. As used herein, the term "amino acid" refers to either natural and/or unnatural or synthetic amino acids, including both D or L optical isomers, and amino acid analogs and peptidomimetics.

A polypeptide may be produced by suitable method, including recombinant or synthetic methods. For example, the polypeptide may be synthesised directly using standard techniques known in the art, such as Fmoc solid phase chemistry, Boc solid phase chemistry or by solution phase peptide synthesis. Alternatively, a polypeptide may be produced by transforming a cell, typically a bacterial cell, with a nucleic acid molecule or vector which encodes said polypeptide. Production of polypeptides by expression in bacterial host cells is described below and is exemplified in the Examples. The invention provides nucleic acid molecules and vectors which encode a polypeptide of the invention. The invention also provides a host cell comprising such a nucleic acid or vector. Exemplary polynucleotide molecules encoding polypeptides disclosed herein are provided as SEQ ID NOs: 3 and 7. Each of these sequences includes at the 5' end a codon for the N terminal methionine (ATG) and, prior to the stop codon (TAA) at the 3' end, codons for a Gly-Ser-Gly linker and a 6× His tag, which may optionally be excluded. The optional inclusion of an additional methionine and a tag are discussed in more detail below.

The terms "nucleic acid molecule" and "polynucleotide" are used interchangeably herein and refer to a polymeric form of nucleotides of any length, either deoxyribonucleotides or ribonucleotides, or analogs thereof. Non-limiting examples of polynucleotides include a gene, a gene fragment, messenger RNA (mRNA), cDNA, recombinant polynucleotides, plasmids, vectors, isolated DNA of any sequence, isolated RNA of any sequence, nucleic acid probes, and primers. A polynucleotide of the invention encodes a polypeptide of the invention and may be provided in isolated or substantially isolated form. By substantially isolated, it is meant that there may be substantial, but not total, isolation of the polypeptide from any surrounding medium. The polynucleotides may be mixed with carriers or diluents which will not interfere with their intended use and still be regarded as substantially isolated. A nucleic acid sequence which "encodes" a selected polypeptide is a nucleic acid molecule which is transcribed (in the case of DNA) and translated (in the case of mRNA) into a polypeptide in vivo when placed under the control of appropriate regulatory sequences, for example in an expression vector. The boundaries of the coding sequence are determined by a start codon at the 5' (amino) terminus and a translation stop codon at the 3' (carboxy) terminus. For the purposes of the invention, such nucleic acid sequences can include, but are not limited to, cDNA from viral, prokaryotic or eukaryotic mRNA, genomic sequences from viral or prokaryotic DNA or RNA, and even synthetic DNA sequences. A transcription termination sequence may be located 3' to the coding sequence.

Polynucleotides can be synthesised according to methods well known in the art, as described by way of example in Sambrook et al (1989, Molecular Cloning—a laboratory manual; Cold Spring Harbor Press). The nucleic acid molecules of the present invention may be provided in the form of an expression cassette which includes control sequences operably linked to the inserted sequence, thus allowing for expression of the polypeptide of the invention in vivo (e.g. in prokaryotic or eukaryotic expression systems). These expression cassettes, in turn, are typically provided within vectors (e.g., plasmids or recombinant viral vectors). Such an expression cassette may be administered directly to a host subject. Alternatively, a vector comprising a polynucleotide of the invention may be administered to a host subject. Preferably the polynucleotide is prepared and/or administered using a genetic vector. A suitable vector may be any vector which is capable of carrying a sufficient amount of genetic information, and allowing expression of a polypeptide of the invention.

The present invention thus includes expression vectors that comprise such polynucleotide sequences. Such expression vectors are routinely constructed in the art of molecular biology and may for example involve the use of plasmid DNA and appropriate initiators, promoters, enhancers and other elements, such as for example polyadenylation signals which may be necessary, and which are positioned in the correct orientation, in order to allow for expression of a peptide of the invention. Other suitable vectors would be apparent to persons skilled in the art. By way of further example in this regard we refer to Sambrook et al.

The invention also includes cells that have been modified to express a polypeptide of the invention. Such cells typically include prokaryotic cells such as bacterial cells, for example E. coli. Such cells may be cultured using routine methods to produce a polypeptide of the invention.

A polypeptide may be derivatised or modified to assist with their production, isolation or purification. For example, where a polypeptide of the invention is produced by recombinant expression in a bacterial host cell, the sequence of the polypeptide may include an additional methionine (M) residue at the N terminus to improve expression. As another example, the polypeptide of the invention may be derivatised or modified by addition of a ligand which is capable of binding directly and specifically to a separation means. Alternatively, the polypeptide may be derivatised or modified by addition of one member of a binding pair and the separation means comprises a reagent that is derivatised or modified by addition of the other member of a binding pair. Any suitable binding pair can be used. In a preferred embodiment where the polypeptide for use in the invention is derivatised or modified by addition of one member of a binding pair, the polypeptide is preferably histidine-tagged or biotin-tagged. Typically the amino acid coding sequence of the histidine or biotin tag is included at the gene level and the polypeptide is expressed recombinantly in E. coli. The histidine or biotin tag is typically present at either end of the polypeptide, preferably at the C-terminus. It may be joined directly to the polypeptide or joined indirectly by any suitable linker sequence, such as 3, 4 or 5 glycine residues, or a mixture of glycine and serine residues. The histidine tag typically consists of six histidine residues, although it can be longer than this, typically up to 7, 8, 9, 10 or 20 amino acids or shorter, for example 5, 4, 3, 2 or 1 amino acids.

A polypeptide may be provided in a substantially isolated or purified form. That is, isolated from the majority of the other components present in a cellular extract from a cell in which the polypeptide was expressed. By substantially purified, it will be understood that the polypeptide is purified to at least 50%, 60%, 70%, 80% or preferably at least 90% homogeneity. Purity level may be assessed by any suitable means, but typically involves SDS-PAGE analysis of a sample, followed by Coomassie Blue detection. A polypeptide may be mixed with carriers, diluents or preservatives which will not interfere with the intended purpose of the polypeptide and still be regarded as substantially isolated or purified. Where a polypeptide is provided in a composition with an additional active component, such as another polypeptide, each said polypeptide will individually be purified to a high level of homogeneity prior to mixing in an appropriate ratio for the intended purpose of each. For example, two polypeptides may be each be purified to at least 90% homogeneity prior to combining in a 1:1 ratio.

A polypeptide (or mixture thereof) may be provided in lyophilised form, suitable for reconstitution in aqueous solution prior to use. The lyophilised composition has improved stability enabling longer storage of the polypeptide. A method of preparing a polypeptide (or mixture thereof) in lyophilised form, comprising freeze-drying said polypeptide (or mixture) in a suitable buffer, such as Tris-buffered saline (TBS), is provided herein. A polypeptide is typically substantially purified prior to freeze-drying. The resulting polypeptide (or mixture) in lyophilised form is also provided. A method of preparing a solution of a polypeptide (or mixture), comprising providing the polypeptide (or mixture) in lyophilised form and reconstituting with a suitable carrier or diluent, such as water, is also provided.

A polypeptide may be immobilised using methods known in the art, for example as described in Datta S et al., Enzyme immobilization: an overview on techniques and support materials, 3 Biotech, 3(1):1-9 (2013). For example, the polypeptide may be immobilised by adsorption, covalent binding, affinity immobilization or entrapment. Materials that can be used as supports include but are not limited to for example, natural supports such as agarose, collagen, gelatin, cellulose, pectin, sepharose, inorganic materials such as ceramics, silica, glass, activated carbon or charcoal, or synthetic polymers. For example, the polypeptide may be immobilised on sepharose or agarose, optionally provided as a resin.

Polypeptides having Endoprotease Activity

Functional Features of a Polypeptide having Endoprotease Activity

In one embodiment, the present invention relates to a polypeptide having endoprotease activity specific for O-glycosylated proteins. In other words, the polypeptide has O-glycoprotein-specific endoprotease activity. The polypeptide cleaves any O-linked glycoprotein, preferably any human O-linked glycoprotein. Examples of O-linked glycoproteins include any protein that comprises or consists all or part of an immunoglobulin, including full length antibodies, Fc fragments and Fc fusion proteins, particularly those of the IgA, IgD and IgG3 isotypes. Another example of an O-linked glycoprotein is Etanercept, which is a fusion protein of the ligand binding domain of human TNFα receptor 2 linked to the Fc portion of IgG1, with numerous O-glycosylation sites. Other examples of O-linked glycoproteins include erythropoietin (EPO), TNFα Receptors, fetuin, and plasminogen.

The hydrolysis (i.e. cleavage) of the substrate glycoprotein typically occurs with high specificity at a peptide bond N-terminal to and in close proximity to an O-glycosylated serine or threonine, and is O-glycan dependent. A polypeptide of the invention is preferably capable of cleaving such a peptide bond in close proximity to every O-glycosylated site in the substrate glycoprotein. The reaction preferably does not show any amino acid specificity or limitation, and in particular does not require any specific amino acid(s) to be present N-terminal to the O-glycosylated serine or threonine. When assessed using standard mass spectrometry parameters, the cleavage site is generally observed to be at the peptide bond immediately N terminal to each O-glycosylated residue.

Endoprotease activity and specificity of a given polypeptide may be determined by means of a suitable assay. For example, a standard O-glycoprotein substrate, such as an IgA molecule or erythropoietin (EPO), may be incubated with a test polypeptide. The starting materials and the reaction products may then be analysed by SDS-PAGE and/or mass spectrometry to determine the presence of cleavage products (if any) and if required also to further characterise those products. A glycoprotein substrate which is not O-glycosylated, such as an IgG1 molecule, may be used as a negative control. The results may be compared to those obtained in the same assay when the substrate is contacted with an exemplary polypeptide of the invention, such as a polypeptide consisting of the amino acid sequence of SEQ ID NO: 2. One unit of the polypeptide of SEQ ID NO: 2 is defined as the amount required to digest >90% of 1 µg of Erytropoietin (EPO) in combination with one unit of a sialidase mixture in 20 mM Tris buffer pH 6.8, overnight at 37° C. as monitored by SDS-PAGE (preferred sialidase mixtures are described further below). A test polypeptide preferably achieves a similar level of activity when present in the same amount. Exemplary assays are also described in the Examples.

Structural Features of a Polypeptide having Endoprotease Activity

This section sets out the structural features of a polypeptide in accordance with this embodiment, which apply in addition to the functional features outlined in the preceding section.

The polypeptide is typically at least 150, 200, 250, 275, 280, 290, 300, 310, 320, 330, 340, 350 or 360 amino acids in length. The polypeptide is typically no larger than 400, 395, 390, 385, 380, 375, 370 or 365 amino acids in length.

It will be appreciated that any of the above listed lower limits may be combined with any of the above listed upper limits to provide a range for the length the polypeptide. For example, the polypeptide may be 150 to 400 amino acids in length, or 280 to 380 amino acids in length. The polypeptide is preferably 340 to 380 amino acids in length, most preferably 360 to 375 amino acids in length.

The primary structure (amino acid sequence) of the polypeptide is based on the primary structure of the polypeptide encoded by the Amuc1119 gene of *Akkermansia muciniphila*. The full sequence of this polypeptide is shown in SEQ ID NO: 4, which includes a signal motif at positions 1-24. The sequence with the signal motif removed is shown in SEQ ID NO: 1.

The polypeptide of the invention may comprise, consist essentially, or consist of the sequence of SEQ ID NO: 1.

Alternatively, the polypeptide of the invention may comprise, consist essentially, or consist of a variant of the amino acid sequence of SEQ ID NO: 1 which is at least 50% identical to the amino acid sequence of SEQ ID NO: 1. The variant sequence may be at least 60%, at least 70%, at least 80%, at least, 85%, at least 90%, at least 95%, at least 98% or at least 99% identical to the sequence of SEQ ID NO:1. The identity level is preferably at least 85% or higher. Identity relative to the sequence of SEQ ID NO: 1 can be measured over a region of at least 100, at least 200, at least 300 or at least 350 or more contiguous amino acids of the sequence shown in SEQ ID NO: 1, or more preferably over the full length of SEQ ID NO: 1. A variant is typically of a length which is no more than 50 amino acids longer or shorter than the reference sequence, and is preferably of approximately (or exactly) the same length as the reference sequence.

Amino acid identity may be calculated using any suitable algorithm. For example the PILEUP and BLAST algorithms can be used to calculate identity or line up sequences (such as identifying equivalent or corresponding sequences (typically on their default settings), for example as described in Altschul S. F. (1993) J Mol Evol 36:290-300; Altschul, S, F et al (1990) J Mol Biol 215:403-10. Software for performing BLAST analyses is publicly available through the National Center for Biotechnology Information (www.ncbi.nlm.nih-.gov/). This algorithm involves first identifying high scoring sequence pair (HSPs) by identifying short words of length W in the query sequence that either match or satisfy some positive-valued threshold score T when aligned with a word of the same length in a database sequence. T is referred to as the neighbourhood word score threshold (Altschul et al, supra). These initial neighbourhood word hits act as seeds for initiating searches to find HSPs containing them. The word hits are extended in both directions along each sequence for as far as the cumulative alignment score can be increased. Extensions for the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T and X determine the sensitivity and speed of the alignment. The BLAST program uses as defaults a word length (W) of 11, the BLOSUM62 scoring matrix (see Henikoff and Henikoff (1992) *Proc. Natl. Acad. Sci. USA* 89: 10915-10919) alignments (B) of 50, expectation (E) of 10, M=5, N=4, and a comparison of both strands.

The BLAST algorithm performs a statistical analysis of the similarity between two sequences; see e.g., Karlin and Altschul (1993) *Proc. Natl. Acad. Sci. USA* 90: 5873-5787. One measure of similarity provided by the BLAST algorithm is the smallest sum probability (P(N)), which provides an indication of the probability by which a match between two polynucleotide or amino acid sequences would occur by chance. For example, a sequence is considered similar to another sequence if the smallest sum probability in comparison of the first sequence to the second sequence is less than about 1, preferably less than about 0.1, more preferably less than about 0.01, and most preferably less than about 0.001. Alternatively, the UWGCG Package provides the BESTFIT program which can be used to calculate identity (for example used on its default settings) (Devereux et al (1984) *Nucleic Acids Research* 12, 387-395).

The sequence of a polypeptide of the invention may comprise a variant of the amino acid sequence of SEQ ID NO: 1 in which modifications, such as amino acid additions, deletions or substitutions are made relative to the sequence of SEQ ID NO: 1. Unless otherwise specified, the modifications are preferably conservative amino acid substitutions. Conservative substitutions replace amino acids with other amino acids of similar chemical structure, similar chemical properties or similar side-chain volume. The amino acids introduced may have similar polarity, hydrophilicity, hydrophobicity, basicity, acidity, neutrality or charge to the amino acids they replace. Alternatively, the conservative substitution may introduce another amino acid that is aromatic or aliphatic in the place of a pre-existing aromatic or aliphatic amino acid. Conservative amino acid changes are well-known in the art and may be selected in accordance with the properties of the 20 main amino acids as defined in Table A1 below. Where amino acids have similar polarity, this can be determined by reference to the hydropathy scale for amino acid side chains in Table A2. A sequence of a polypeptide of the invention may comprise a variant of the amino acid sequence of SEQ ID NO: 1 in which up to 10, 20, 30, 40, 50 or 60 conservative substitutions are made.

TABLE A1

Chemical properties of amino acids

| | | | |
|---|---|---|---|
| Ala (A) | aliphatic, hydrophobic, neutral | Met (M) | hydrophobic, neutral |
| Cys (C) | polar, hydrophobic, neutral | Asn (N) | polar, hydrophilic, neutral |
| Asp (D) | polar, hydrophilic, charged (−) | Pro (P) | hydrophobic, neutral |
| Glu (E) | polar, hydrophilic, charged (−) | Gln (Q) | polar, hydrophilic, neutral |
| Phe (F) | aromatic, hydrophobic, neutral | Arg (R) | polar, hydrophilic, charged (+) |
| Gly (G) | aliphatic, neutral | Ser (S) | polar, hydrophilic, neutral |
| His (H) | aromatic, polar, hydrophilic, charged (+) | Thr (T) | polar, hydrophilic, neutral |
| Ile (I) | aliphatic, hydrophobic, neutral | Val (V) | aliphatic, hydrophobic, neutral |
| Lys (K) | polar, hydrophilic, charged(+) | Trp (W) | aromatic, hydrophobic, neutral |
| Leu (L) | aliphatic, hydrophobic, neutral | Tyr (Y) | aromatic, polar, hydrophobic |

TABLE A2

Hydropathy scale

| Side Chain | Hydropathy |
|---|---|
| Ile | 4.5 |
| Val | 4.2 |
| Leu | 3.8 |
| Phe | 2.8 |
| Cys | 2.5 |
| Met | 1.9 |
| Ala | 1.8 |
| Gly | −0.4 |
| Thr | −0.7 |
| Ser | −0.8 |
| Trp | −0.9 |
| Tyr | −1.3 |
| Pro | −1.6 |
| His | −3.2 |
| Glu | −3.5 |
| Gln | −3.5 |
| Asp | −3.5 |
| Asn | −3.5 |
| Lys | −3.9 |
| Arg | −4.5 |

The amino acid sequence of a polypeptide of the invention may comprises a variant of the amino acid sequence of SEQ ID NO: 1 as described above. However, certain residues in the amino acid sequence of SEQ ID NO: 1 are preferably retained within the said variant sequence. For example, the said variant sequence typically retains certain residues which are known to be required for endoprotease activity. Thus, the glutamate at position 182 of SEQ ID NO: 1 (corresponds to position 206 of SEQ ID NO: 4) is preferably retained in the amino acid sequence of a polypeptide of the invention. This residue is thought to be required for electron transfer in the active site. Thus, a polypeptide of the invention typically comprises a variant of the amino acid sequence of SEQ ID NO: 1 which has a glutamate (E) at the position in said variant sequence which corresponds to position 182 of SEQ ID NO: 1. Similarly, the histidine at position 181 of SEQ ID NO: 1 (corresponds to position 205 of SEQ ID NO: 4) is preferably retained in the amino acid sequence of a polypeptide of the invention. This residue is thought to be required for binding to a zinc ion co-factor.

The said glutamate and said histidine residue are both typically comprised within a metalloprotease domain having the motif HEbbH (SEQ ID NO: 59), where b is an amino acid with no charge, such as amino acid A, C, F, G, I, L, M, N, P, Q, S, T, V or W. A preferred example of such a domain has the sequence HELGH (SEQ ID NO: 41), which corresponds to positions 181 to 185 of SEQ ID NO: 1 (positions 205 to 209 in SEQ ID NO: 4). Thus, a polypeptide of the invention typically comprises a variant of the amino acid sequence of SEQ ID NO: 1 which comprises the motif HEbbH (SEQ ID NO: 59) (such as HEIGH (SEQ ID NO: 42) or HELGH (SEQ ID NO: 41), preferably HELGH (SEQ ID NO:41)), at positions corresponding to positions 181 to 185 of SEQ ID NO: 1. A polypeptide of the invention typically comprises an O-glycan specific binding domain located C-terminal to the metalloprotease domain.

The motif HEbbH (SEQ ID NO: 59) may be compromised within a larger metalloprotease domain having the motif abxHEbbHbc (SEQ ID NO: 60), where a is amino acid V, T or G, b is an amino acid with no charge, such as amino acid A, C, F, G, I, L, M, N, P, Q, S, T, V or W, x is any amino acid, and c is a hydrophobic amino acid such as A, C, F, I, L, M, P, V, W or Y. A preferred example of such a domain has the sequence GMAHELGHGL (SEQ ID NO: 8), which corresponds to positions 178 to 187 of SEQ ID NO: 1 (positions 202 to 211 in SEQ ID NO: 4). Other examples include GVAHELGHNF (SEQ ID NO: 43). Thus, a polypeptide of the invention preferably comprises a variant of the amino acid sequence of SEQ ID NO: 1 which comprises the motif abxHEbbHbc (SEQ ID NO: 60), (such as GMAHELGHGL (SEQ ID NO: 8) or GVAHELGHNF (SEQ ID NO:43), preferably GMAHELGHGL (SEQ ID NO: 8)), at positions corresponding to positions 178 to 187 of SEQ ID NO: 1. A polypeptide of the invention typically comprises an O-glycan specific binding domain located C-terminal to the metalloprotease domain.

Alternatively, a polypeptide of the invention may comprise, consist essentially, or consist of a shorter fragment of SEQ ID NO: 1 or of a variant thereof as described above. The fragments may be described as a truncated form of SEQ ID NO: 1 which retains O-glycoprotein specific-endoprotease activity. Such fragments are shorter than SEQ ID NO: 1 and are typically at least 100, 150 or 200 amino acids in length. The fragments typically comprise a metalloprotease domain at positions corresponding to positions 178 to 187 of SEQ ID NO: 1, including a glutamic acid residue (E) at a position which corresponds to position 182 of SEQ ID NO: 1 and a histidine residue (H) at a position which corresponds to position 181 of SEQ ID NO: 1, and an O-glycan specific binding domain located C-terminal to the metalloprotease domain.

Any polypeptide of the invention which comprises SEQ ID NO:1 or a variant thereof, or a fragment of either thereof, may optionally include an additional methionine at the N terminus and/or a histidine or other tag at the C terminus. Such additional sequences may aid with expression and/or purification. A histidine tag preferably consists of six histidine residues. The histidine tag is preferably linked to the C terminus by a linker, which is typically a short sequence of amino acids, such as 3-5 amino acids. The linker typically consists predominantly of glycine and serine residues, and may preferably include the sequence GSG. For example GSG and GSGLE (SEQ ID NO: 61) are suitable linkers.

In summary therefore, a polypeptide of the invention is a polypeptide having O-glycoprotein-specific endoprotease activity which comprises:
(a) an amino acid sequence of SEQ ID NO: 1;
(b) an amino acid sequence which is at least 85% identical to the amino acid sequence of SEQ ID NO: 1 or
(c) an amino acid sequence which is a fragment of the sequence of SEQ ID NO: 1 or a fragment of an amino acid which is 85% identical to the amino acid sequence of SEQ ID NO: 1;
optionally wherein said polypeptide includes an additional methionine at the N terminus and/or a histidine tag at the C terminus, which tag may be joined to the C terminus by a linker.

The sequence of an exemplary polypeptide of the invention is provided as SEQ ID NO: 2. The polypeptide may comprise or consist of the amino acid sequence of SEQ ID NO: 2. An exemplary polynucleotide sequence encoding this polypeptide is shown in SEQ ID NO: 3.

Alternative polypeptides which have O-glycoprotein-specific endoprotease activity have been identified in *Pseudomonas aeruginosa* PAO1, *Bacteroides thetaiotaomicron* VPI-5482, and *Clostridium perfringens* (see three peptidases described in Noach et al; PNAS 2017, pE679-688 and supporting appendices, specifically Materials and Methods for Cloning, Protein Expression and Purification). The full length sequences of these polypeptides are provided as SEQ ID NOs: 32, 33 and 34. Each of these sequences includes a metalloprotease domain having the motif HEbbH (SEQ ID NO: 59) as described above. The *Clostridium perfringens* sequence also has the longer metalloprotease domain having the motif abxHEbbHbc (SEQ ID NO: 60) as described above. Each of these sequences can be optionally modified to remove any signal sequence or pro-enzyme sequences that may be present and/or to include an additional methionine at the N terminus and/or a histidine or other tag at the C terminus. Such additional sequences may aid with expression (e.g. in *E. coli*) and/or purification. Corresponding sequences with signal and other immature sequences removed are provided as SEQ ID NOs: 26, 27 and 28. Versions of these sequences optimised for expression in *E. coli* and subsequent purification (by inclusion of an additional methionine at the N terminus and a histidine tag at the C terminus) are provided as SEQ ID NOs: 29, 30 and 31. In methods described herein for use of a polypeptide of the invention having O-glycoprotein-specific endoprotease activity, the polypeptide of the invention may optionally be replaced with one of these polypeptides. Preferred polypeptides for use in such methods therefore comprise, consist essentially, or consist of any one of SEQ ID NOs: 26 to 31.

Methods using the Endoprotease Activity of the Polypeptide

The present invention also provides a method of hydrolysing an O-glycoprotein, wherein the method comprises contacting a sample of said protein with a polypeptide of the invention having O-glycoprotein-specific endoprotease activity and optionally further comprising detection of the hydrolysis products.

The present invention may also include a method for assessing the glycosylation status of a protein, comprising contacting a sample of said with a polypeptide of the invention having O-glycoprotein-specific endoprotease activity and analysing the products produced. The presence of cleavage products indicates that the protein in said sample is O-glycosylated, and thus the method may also be used for the detection of O-glycoproteins. The cleavage products may optionally be further analysed to identify the glycan chain and its position of attachment to the protein.

In such methods, a sample is contacted with a polypeptide of the invention under conditions suitable for polypeptide to interact with any proteins in the sample and for hydrolysis/cleavage reactions (endoprotease activity) to occur. Suitable conditions include incubation with a polypeptide of the invention for at least 20 minutes, 30 minutes, 40 minutes, 50 minutes, 60 minutes, 70 minutes, 80 minutes, 90 minutes or 120 minutes, 3 hours, 5 hours, 10 hours, or overnight. Incubation preferably takes place at room temperature, more preferably at approximately 20° C., 25° C., 30° C., 35° C., 40° C. or 45° C., and most preferably at approximately 37° C. The methods described above may be carried out under any suitable pH. Suitable pH values include, for example, a pH of around 3.0, 3.5, 4, 4.5, 5, 5.5, 6, 6.5, 7, 7.5, 8, 8.5, 9 or 9.5. Preferred pH for the activity of a polypeptide of the invention is in the range 5.6 to 6.8. The method may be conducted in any suitable buffer, such as tris buffered saline (TBS) or phosphate buffered saline (PBS). The approximate ratio of the polypeptide of the invention to the protein content of the sample (enzyme:substrate) may be 1:1, 2:1, 4:1, 6:1, 10:1, 15:1, 20:1, 1:2, 1:4, or 1:6, 1:10, 1:15, 1:20, 1:40, 1:100, 1:200 or 1:400. A preferred ratio is 1:20. Higher proportions of enzyme to substrate may be beneficial if a shorter reaction time is required, or if the O-glycoprotein is heavily sialyated. Alternatively an earlier or simultaneous sialidase incubation step may be used to reduce sialic acid content, as is discussed in more detail below. The substrate is typically present at a concentration of 0.1 mg/ml to 10 mg/ml, preferably around 0.1 to 2 mg/ml.

The detection or analysis of the products produced may be assessed by any suitable analytical method, such as but not limited to mass spectrometry, HPLC, affinity chromatography, gel electrophoresis, SDS-PAGE, ELISA, lectin blotting, spectrometry, capillary electrophoresis and other standard laboratory techniques for the analysis of proteins.

The sample in any of the above methods may be a sample taken from a patient, preferably a human patient. The results obtained may be used for a diagnostic purpose, for example to detect the presence of cancers which involve O-linked glycosylation. Such a use may involve comparison of the results obtained from the patient sample to those obtained using a sample obtained from a healthy control.

In any method of the invention, the polypeptide can be used in combination with another enzyme such as a protease or glycosidase. The additional protease or glycosidase will typically further digest the substrate proteins, which may enhance the activity of the polypeptide of the invention and/or permit easier or more detailed analysis of the products.

For example, the present inventors have determined that a polypeptide of the invention demonstrates improved endoprotease activity if the O-glycans of a substrate protein are first modified to remove sialic acid. Thus, in a preferred method of the invention, the sample is contacted with an agent to remove sialic acid. Said agent may preferably be a sialidase enzyme or a mixture of such enzymes, which may be present in a suitable buffer such as TBS or PBS. The buffer preferably comprises a low concentration of NaCl, typically up to 300 mM, 250 mM, 200 mM, or 150 mM. The NaCl concentration is preferably around 150 mM, such as between 125 mM and 175 mM. Sialidases (or neuraminidases) catalyse the cleavage of terminal sialic acids from complex carbohydrates on glycoproteins and show a high degree of specificity. These enzymes target three distinct sialic acid bonds which are commonly found within O-glycoproteins, namely α2-3, α2-6 and α2-8 bonds. Sialidases that are suitable for use in the methods described include broad spectrum sialidases that target all of the α2-3, α2-6, or α2-8 bonds, as well as narrow spectrum sialidases that typically target only one type of bond. The α2-3 bond is the most common in human glycoproteins, so if a narrow spectrum sialidase is used it is preferable that it targets this bond. Suitable sialidases may include viral or mammalian sialidases but are preferably sialidases isolated from bacteria, including but are not limited to strains of *Clostridium perfringens, Arthrobacter ureafaciens, Streptococcus pneumoniae, Vibrio cholera* and *Akkermansia muciniphila*.

A preferred narrow spectrum sialidase is Am1757 isolated from *Akkermansia muciniphila*. Am1757 has specific activity against α2-3 bonds. The wild-type sequence of Am1757 is provided as SEQ ID NO: 9, which includes a signal sequence. The wild-type sequence of Am1757 lacking the signal sequence is provided as SEQ ID NO: 10. These sequences can be optionally modified to include an additional methionine at the N terminus and/or a histidine or other tag at the C terminus. Such additional sequences may aid with expression (e.g. in *E. coli*) and/or purification. A histidine tag preferably consists of six histidine residues. The histidine tag is preferably linked to the C terminus by a linker, which is typically a short sequence of amino acids, such as 3-5 amino acids. The linker typically consists predominantly of glycine and serine residues, and may preferably include the sequence GSG. For example GSG and GSGLE (SEQ ID NO: 61) are suitable linkers. An exemplary Am1757 sequence having an additional methionine at the N terminus and a GSGLE (SEQ ID NO: 61) linker and His$_6$ (SEQ ID NO: 62) tag at the C terminus is provided as SEQ ID NO: 11. Any reference to Am1757 in the present disclosure may mean any of SEQ ID NOs: 9, 10 or 11, but preferably refers to a polypeptide which comprises or consists of the amino acid sequence of SEQ ID NO: 10. Most preferred is a polypeptide which consists of the amino acid sequence of SEQ ID NO: 11.

A preferred broad spectrum sialidase is Am0707 isolated from *Akkermansia muciniphila*. Am0707 has activity against α2-3, α2-6 and α2-8 bonds. The wild-type sequence of Am0707 is provided as SEQ ID NO: 12, which includes a signal sequence. The wild-type sequence of Am0707 lacking the signal sequence is provided as SEQ ID NO: 13. These sequences can be optionally modified to include an additional methionine at the N terminus and/or a histidine or other tag at the C terminus. Such additional sequences may aid with expression and/or purification. A histidine tag preferably consists of six histidine residues. The histidine tag is preferably linked to the C terminus by a linker, which is typically a short sequence of amino acids, such as 3-5 amino acids. The linker typically consists predominantly of glycine and serine residues, and may preferably include the sequence GSG. For example GSG and GSGLE (SEQ ID NO: 61) are suitable linkers. An exemplary Am0707 sequence having an additional methionine at the N terminus and a GSGLE (SEQ ID NO: 61) linker and His$_6$ (SEQ ID NO: 62) tag at the C terminus is provided as SEQ ID NO: 14. Any reference to Am0707 in the present disclosure may mean any of SEQ ID NOs: 12, 13 or 14, but preferably refers to a polypeptide which comprises or consists of the amino acid sequence of SEQ ID NO: 13. Most preferred is a polypeptide which consists of the amino acid sequence of SEQ ID NO: 14.

A preferred sialidase mixture capable of hydrolyzing all sialic acid bonds comprises Am1757 and Am0707 isolated from *Akkermansia muciniphila*. The mixture of Am1757 and Am0707 is typically in a 1:1 ratio. A particularly preferred mixture may comprise a polypeptide consisting of the amino acid sequence of SEQ ID NO: 11 and a polypeptide consisting of the amino acid sequence of SEQ ID NO: 14.

Methods of the invention may preferably comprise incubating a sample with Am1757 or with a mixture of Am1757 and Am0707 prior to or simultaneously with the polypeptide of invention, under conditions suitable for activity of the sialidases. The invention also provides a composition (in lyophilised or solution form) comprising a polypeptide of the invention and Am1757 or a mixture of Am1757 and Am0707. Such a composition may preferably be lyophilised in tris buffered saline, which may be at around pH7.6. In such a composition, Am1757 and Am0707 will preferably be present in a 1:1 ratio to each other, with the total sialidase content (Am1757+Am0707) also being present at a 1:1 ratio relative to the polypeptide of the invention. For example, if a composition includes 2000 units of the polypeptide of the invention, it will also include 2000 units of sialidase, in which said 2000 units of sialidase comprise 1000 units Am1757 and 1000 units Am0707. A unit of sialidase mixture is typically the amount required to hydrolyse sialic acids from ≥90% of 1 μg glycoprotein (fetuin) when incubated in 20 mM Tris pH 6.8 at 37° C. for 2 h at 37° C. as monitored by SDS-PAGE. A unit of the polypeptide of the invention is typically the amount required to digest >90% of 1 μg of Erythropoietin (EPO) when incubated in 20 mM Tris buffer pH 6.8, overnight with one unit of sialidase mixture at 37° C. as monitored by SDS-PAGE.

The invention also provides a kit comprising a polypeptide of the invention in a separate container from Am1757 or a mixture of Am1757 and Am0707, with instructions for the combined use of the different enzymes.

As another example, in any of the methods described herein, the sample may be incubated with an N-glycosidase prior to, at the same time as, or after contacting the sample with the polypeptide of the invention, to remove N-glycans from target proteins. An exemplary N-glycosidase is PNGaseF. Other N-glycosidases that may be used when the sample includes immunoglobulins are EndoS (see SEQ ID NO: 1 of WO2008071418) or EndoS2 (may be referred to as EndoS49—see SEQ ID NO: 1 of WO2013037824). Each of these enzymes removes the N-linked glycoprotein from Asn-297 of IgG1. In a particular embodiment, the sample may be contacted with an N-glycosidase and a sialidase (or mixture thereof) in addition to the polypeptide of the invention. In such a method, the sialidase (or mixture) may be applied first, prior to simultaneous addition of the N-glycosidase and the polypeptide of the invention. Such a method is particularly suitable for the subsequent assessment of O-glycosylation sites, typically achieved by separation of the products e.g. using RPLC and subsequent analysis of the different fractions e.g. using mass spectrometry.

As another example, in any of the methods described herein, the sample may be incubated with a protease prior to, at the same time as, or after contacting the sample with the polypeptide of the invention, to further digest the target protein. Suitable general proteases include trypsin, chymotrypsin, Lys-C, Asp-N, Glu-C, Arg-C or similar endoproteases, or Arg-gingipain (RgpB) of *Porphyromonas gingivalis*.

If the sample includes immunoglobulins, immunoglobulin proteases may be used such as SpeB (see sequence in WO2015040125), Immunoglobulin G-degrading enzyme of *S. pyogenes* (IdeS—see sequence in WO2015040125), Immunoglobulin G-degrading enzyme of *S. equi* subspecies *zooepidemicus* (IdeZ), Lys-gingipain (Kgp) of *Porphyromonas gingivalis*, and Immunoglobulin G-degrading Enzyme of *S. agalactiae* (IgdE$_{agalactiae}$—see SEQ ID NO: 3 of PCT/EP2017/052463). Use of any combination of these proteases in a method of the present invention may assist with determination of O-glycosylation sites on monoclonal antibodies and subunits thereof, for example using mass spectrometry (middle down approach).

As another example, in any of the methods described herein, the sample may be incubated with an O-glycosidase after contacting the sample with a polypeptide of the invention. For instance, to simplify the analysis of the products produced, the products are subjected to digestion by an O-glycosidase for removal of the O-glycans prior to further analysis by any suitable method. Suitable O-glycosidases may be obtained from a strain of *Enterococcus faecalis, Streptococcus oralis*, or *Bifidobacterium bifidum*, preferably *Enterococcus faecalis* or *Streptococcus oralis*, most preferably *Streptococcus oralis*. The sequence of an exemplary O-glycosidase from *Streptococcus oralis* is provided as SEQ ID NO: 15.

Polypeptides which Bind to O-Linked Glycoproteins but Lack or have a Reduced Endoprotease Activity Functional Features of a Polypeptide Lacking Endoprotease Activity In one embodiment, the present invention relates to a polypeptide lacking or having a reduced endoprotease activity, whilst retaining the ability to bind O-glycans. In other words, the polypeptide may be described as an O-glycan-specific binding agent which does not significantly hydrolyse a glycoprotein to which said glycan is attached.

O-glycoprotein endoprotease activity may be determined using any suitable method, but may typically employ the same assay as described above for polypeptides of the invention which posses such activity. A lack of activity in a test polypeptide will be indicated by the absence of cleavage products following incubation with an O-glycoprotein substrate. Cleavage of the same substrate by a polypeptide comprising the amino acid sequence of SEQ ID NO: 1 may be used as a positive control. A reduction in activity in the test polypeptide may be determined by comparison to the same control. The polypeptide of the invention typically has O-glycoprotein endoprotease activity which is reduced relative to the activity of a polypeptide comprising the amino acid sequence of SEQ ID NO: 1. The polypeptide of the invention typically has O-glycoprotein endoprotease activity which is less than 95%, 90%, 85%, 80%, 75%, 70%, 65%, 60%, 55%, 50%, 45%, 40%, 35%, 30%, 25%, 20%, 15%, 10% or 5% compared to the activity of a polypeptide comprising the amino acid sequence of SEQ ID NO: 1.

The ability of a polypeptide to bind to O-glycan or O-glycoprotein may also be assessed by any suitable method. One such method involves immobilising a test polypeptide, e.g. on sepharose in a spin column, followed by incubation with a sample containing O-glycoproteins and/or O-glycans. If the test polypeptide has O-glycan and/or O-glycoprotein binding ability, the O-glyoproteins and/or O-glycans will be detectable bound to the column or in a subsequent eluent. Preferably, the polypeptide is able to bind all O-glycoproteins which are hydrolysable by a polypeptide comprising the amino acid sequence of SEQ ID NO: 1.

Exemplary assays of this type are described in the examples.

Structural Features of a Polypeptide Lacking Endoprotease Activity

This section sets out the structural features of a polypeptide in accordance with this embodiment, which apply in addition to the functional features outlined in the preceding section. A polypeptide in accordance with this embodiment of the invention may possess the same structural features as described above in connection with a polypeptide having endoprotease activity, with the exception that the amino acid sequence is modified by one or more amino acid additions, deletions or substitutions such that said activity is reduced or eliminated. Typically, a polypeptide in accordance with this embodiment of the invention will not include an intact metalloprotease motif of HEbbH (SEQ ID NO: 59) or abxHEbbHbc (SEQ ID NO: 60). Said motif may be disrupted by addition, deletion or substitution, but is preferably disrupted by at least one amino acid substitution. Preferably, the substitution involves replacement of the glutamic acid (E) residue in the said motif with an alternative amino acid and/or the replacement of the histidine (H) residue in the position corresponding to the $1^{st}$ position of the shorter motif (the $4^{th}$ position of the longer motif) and/or replacement of the histidine (H) residue in the position corresponding to the $5^{th}$ position of the shorter motif (the $8^{th}$ position of the longer motif). Preferably, either or both or all three said substitutions is non-conservative. The substitution of the E residue should reduce or eliminate electron transfer. The substitution of either of the H residues should reduce or eliminate Zinc ion co-factor binding. The E residue is therefore preferably substituted with a non-polar or uncharged amino acid, such as A, C, F, G, I, L, M, N, P, Q, S, T, V or W, but is most preferably substituted with Alanine (A) or Glycine (G). The H residues may each individually be substituted with any non-H amino acid, but non-polar amino acids such as A and G are again preferred.

Thus, a polypeptide of the invention may comprise, consist essentially, or consist of the amino acid sequence of SEQ ID NO: 1 in which the metalloprotease motif of HEbbH (SEQ ID NO: 59) or abxHEbbHbc (SEQ ID NO: 60) is disrupted, preferably by the replacement of the glutamic acid residue in the position corresponding to position 182 of SEQ ID NO: 1 and/or the replacement of the histidine residue corresponding to position 181 of SEQ ID NO: 1 with an alternative amino acid and/or the replacement of the histidine residue corresponding to position 185 of SEQ ID NO: 1 with an alternative amino acid. In other words, the polypeptide may be described as not comprising the metalloprotease motif HEbbH (SEQ ID NO: 59) and preferably comprising a disrupted version of said motif, such that:

(a) H in the first position is replaced with an alternative amino acid, preferably A or G; and/or
(b) E in the second position is replaced with an uncharged amino acid, optionally A, C, F, G, I, L, M, N, P, Q, S, T, V or W, preferably A or G; and/or
(c) H in the fifth position is replaced with an alternative amino acid, preferably A or G wherein b in the said motif is an uncharged amino acid, optionally A, C, F, G, I, L, M, N, P, Q, S, T, V or W.

The said polypeptide may therefore be described as comprising the motif xbbbx (SEQ ID NO: 63), wherein:

(a) x is preferably any amino acid except H, and is preferably A or G; and/or
(b) b is an uncharged amino acid, optionally A, C, F, G, I, L, M, N, P, Q, S, T, V or W, preferably A or G;

optionally wherein said motif is present in said polypeptide at positions corresponding to positions 181 to 185 of SEQ ID NO: 1.

The said polypeptide may therefore comprise a disrupted metalloprotease motif, for example with any one of the following sequences: HALGH (SEQ ID NO: 44), AELGH (SEQ ID NO: 45) or most preferably AALGH (SEQ ID NO: 46). Sequences comprising this type of specific change to SEQ ID NO: 1 are shown in SEQ ID NO: 5 and SEQ ID NO: 20. In other words therefore, a polypeptide of this embodiment of the invention may comprise, consist essentially, or consist of the amino acid sequence of SEQ ID NO: 5 or SEQ ID NO: 20.

The said polypeptide may alternatively be described as comprising the motif abxxbbbxbc (SEQ ID NO: 64), wherein:

(a) a is amino acid V, T or G;
(b) b is an uncharged amino acid, optionally A, C, F, G, I, L, M, N, P, Q, S, T, V or W, preferably A or G;
(c) x is any amino acid except that the amino acid in the $4^{th}$ and/or $8^{th}$ position of the motif is preferably not H, and is preferably A or G; and
(d) c is a hydrophobic amino acid, optionally A, C, F, I, L, M, P, V, W or Y;

optionally wherein said motif is present in said polypeptide at positions corresponding to positions 178 to 187 of SEQ ID NO: 1.

The said polypeptide may therefore comprise a disrupted metalloprotease motif, for example with any one of the following sequences: GMAHALGHGL (SEQ ID NO: 23), GMAAELGHGL (SEQ ID NO: 24) or most preferably GMAAALGHGL (SEQ ID NO: 25). Sequences comprising this type of specific change to SEQ ID NO: 1 are shown in SEQ ID NO: 5 and SEQ ID NO: 20. In other words therefore, a polypeptide of this embodiment of the invention may comprise, consist essentially, or consist of the amino acid sequence of SEQ ID NO: 5 or SEQ ID NO: 20.

Alternatively, the polypeptide of the invention may comprise, consist essentially, or consist of a variant of the amino acid sequence of SEQ ID NO: 5 or SEQ ID NO: 20 which is at least 50% identical to the amino acid sequence of SEQ ID NO: 5, provided that a glutamic acid residue is not introduced in the position corresponding to position 182 of SEQ ID NO: 1 and/or a histidine residue is not introduced in the position corresponding to position 181 of SEQ ID NO: 1 and/or a histidine residue is not introduced in the position corresponding to position 185 of SEQ ID NO: 1.

The variant sequence may be at least 60%, at least 70%, at least 80%, at least, 85%, at least 90%, at least 95%, at least 98% or at least 99% identical to the sequence of SEQ ID NO: 5. The identity level is preferably at least 85% or higher. Identity relative to the sequence of SEQ ID NO: 5 or SEQ ID NO: 20 can be measured over a region of at least 100, at least 200, at least 300 or at least 350 or more contiguous amino acids of the sequence shown in SEQ ID NO: 5 or SEQ ID NO: 20, or more preferably over the full length of SEQ ID NO: 5 or SEQ ID NO: 20. A sequence of a polypeptide of the invention may comprise a variant of the amino acid sequence of SEQ ID NO: 5 or SEQ ID NO: 20 in which up to 10, 20, 30, 40, 50 or 60 conservative substitutions are made. Determinations of sequence identity and an explanation of conservative and non-conservative substitutions are providing in the section relating to polypeptides having endoprotease activity and apply equally here.

Alternatively, a polypeptide of the invention may comprise, consist essentially, or consist of a shorter fragment of SEQ ID NO: 5 or SEQ ID NO: 20, or of a variant thereof as described above. The fragments may be described as a truncated form of SEQ ID NO: 5 or SEQ ID NO: 20 which retains O-glycoprotein binding activity. Such fragments are shorter than SEQ ID NO: 1 and are typically at least 100, 150 or 200 amino acids in length.

Any polypeptide of the invention which comprises SEQ ID NO: 5 or SEQ ID NO:20, or a variant thereof, or a fragment of either thereof, may optionally include an additional methionine at the N terminus and/or a histidine or other tag at the C terminus. Such additional sequences may aid with expression and/or purification. A histidine tag preferably consists of six histidine residues. The histidine tag is preferably linked to the C terminus by a linker, which is typically a short sequence of amino acids, such as 3-5 amino acids. The linker typically consists predominantly of glycine and serine residues, and may preferably include the sequence GSG. For example GSG and GSGLE (SEQ ID NO: 61) are suitable linkers.

In summary therefore, a polypeptide of the invention is a polypeptide having O-glycoprotein binding activity but lacking or having reduced O-glycoprotein-specific endoprotease activity which comprises:
(a) an amino acid sequence of SEQ ID NO: 5 or SEQ ID NO: 20;
(b) an amino acid sequence which is at least 85% identical to the amino acid sequence of SEQ ID NO: 5 or SEQ ID NO: 20;
(c) an amino acid sequence which is a fragment of the sequence of SEQ ID NO: 5 or SEQ ID NO: 20, or a fragment of an amino acid which is 85% identical to the amino acid sequence of SEQ ID NO: 5 or SEQ ID NO: 20;

optionally wherein said polypeptide includes an additional methionine at the N terminus and/or a histidine tag at the C terminus, which tag may be joined to the C terminus by a linker.

The sequence of an exemplary polypeptide of the invention is provided as SEQ ID NO: 6. The polypeptide may comprise or consist of the amino acid sequence of SEQ ID NO: 6. An exemplary polynucleotide sequence encoding this polypeptide is shown in SEQ ID NO: 7. The sequence of another exemplary polypeptide of the invention is provided as SEQ ID NO: 21. The polypeptide may comprise or consist of the amino acid sequence of SEQ ID NO: 21. An exemplary polynucleotide sequence encoding this polypeptide is shown in SEQ ID NO: 22.

The said polypeptide is preferably provided in immobilised form, such as on agarose or sepharose, optionally provided as a resin.

Additional polypeptides of the invention having O-glycoprotein binding activity but lacking or having reduced O-glycoprotein-specific endoprotease activity may be produced by disrupting the metalloprotease domain motif HEbbH (SEQ ID NO: 59) or abxHEbbHbc (SEQ ID NO: 60) in any other polypeptide having O-glycoprotein-specific endoprotease activity which comprises such a motif. In methods described herein for use of a polypeptide of the invention lacking or having reduced endoprotease activity, references to the polypeptide of the invention include such polypeptides. Disruption of the said motif is preferably achieved as described above such that:
(a) H in the first position is replaced with an alternative amino acid, preferably A or G; and/or
(b) E in the second position is replaced with an uncharged amino acid, optionally A, C, F, G, I, L, M, N, P, Q, S, T, V or W, preferably A or G; and/or
(c) H in the fifth position is replaced with an alternative amino acid, preferably A or G wherein b in the said motif is an uncharged amino acid, optionally A, C, F, G, I, L, M, N, P, Q, S, T, V or W.

The said polypeptide may therefore be described as comprising the motif xbbbx (SEQ ID NO: 63), wherein:
(a) x is preferably any amino acid except H, and is preferably A or G; and/or
(b) b is an uncharged amino acid, optionally A, C, F, G, I, L, M, N, P, Q, S, T, V or W, preferably A or G;

Other polypeptides having O-glycoprotein-specific endoprotease activity and which may be disrupted in this way are described above as having been identified in *Pseudomonas aeruginosa* PAO1, *Bacteroides thetaiotaomicron* VPI-5482, and *Clostridium perfringens* (see three peptidases described in Noach et al; PNAS 2017, pE679-688 and supporting appendices, specifically Materials and Methods for Cloning, Protein Expression and Purification). The full length sequences of these polypeptides are provided as SEQ ID NOs: 32, 33 and 34. Corresponding mature sequences (e.g. with signal and other sequences removed) are provided as SEQ ID NOs: 26, 27 and 28. Versions of these sequences optimised for expression in *E. coli* and subsequent purification (by inclusion of an additional methionine at the N terminus and a histidine tag at the C terminus) are provided as SEQ ID NO: 29, 30 and 31. Each of SEQ ID NOs: 26 to 34 therefore includes a metalloprotease domain having the motif HEbbH (SEQ ID NO: 59) which may be disrupted to produce a motif xbbbx (SEQ ID NO: 63) as described above, to product an additional polypeptide of the invention. Versions of SEQ ID NOs: 26, 27 and 28 in which the HEbbH (SEQ ID NO: 59) motif has been so disrupted are provided as SEQ ID NOs: 35, 36 and 37. Versions of these sequences optimised for expression in E. coli and subsequent purification (by inclusion of an additional methionine at the N terminus and a histidine tag at the C terminus) are provided as SEQ ID NO: 38, 39, and 40. Polypeptides of the invention which lack or have reduced O-glycoprotein-specific endoprotease activity may comprises, consist essentially, or consist of any one of SEQ ID NOs: 35, 36, 37, 38, 39 or 40.

Methods using LS Mutant Lacking or having Reduced Endoprotease Activity

The present invention also provides a method of binding to an O-glycan, wherein the method comprises contacting a sample comprising the O-glycan with a polypeptide of the invention capable of binding to an O-glycan and which lacks or has reduced endoprotease activity specific for O-glycosylated proteins. The method optionally further includes determining whether or not an O-glycan has been bound and/or separating the O-glycan and any linked glycoprotein from the resulting mixture.

The present invention may also include a method for assessing the glycosylation status of a protein, comprising contacting a sample of said with a polypeptide of the invention capable of binding to an O-glycan and which lacks or has reduced endoprotease activity specific for O-glycosylated proteins, and determining whether or not the protein is bound by the said polypeptide.

The present invention may also include a method for detecting O-linked glycoproteins in a sample, wherein the method comprises contacting said sample with a polypeptide of the invention capable of binding to an O-glycan and which lacks or has reduced endoprotease activity specific for O-glycosylated proteins, to thereby allow formation of an O-linked glycoprotein-polypeptide complex. The method may optionally include separating said polypeptide from the contacted sample and determining whether the separated polypeptide is bound to the O-linked glycoproteins, thereby determining the presence or absence of O-linked glycoproteins in the sample can thereby be determined. The method may also be used for isolating an O-glycan or O-linked glycoprotein from a sample containing O-glycans or O-linked glycoproteins.

In such methods, a sample is contacted with a polypeptide of the invention under conditions suitable for the polypeptide to interact with any O-glycan or proteins in the sample and for binding to occur. Suitable conditions include incubation with a polypeptide of the invention for at least 20 minutes, 30 minutes, 40 minutes, 50 minutes, 60 minutes, 70 minutes, 80 minutes, 90 minutes or 120 minutes, 3 hours, 5 hours, 10 hours, or overnight, typically with mixing e.g. end-over-end mixing. Incubation preferably takes place at room temperature, more preferably at approximately 20° C., 25° C., 30° C., 35° C., 40° C. or 45° C., and most preferably at approximately 37° C. The methods described above may be carried out under any suitable pH. Suitable pH values include, for example, a pH of around 3.0, 3.5, 4, 4.5, 5, 5.5, 6, 6.5, 7, 7.5, 8, 8.5, 9 or 9.5. Preferred pH for the activity of a polypeptide of the invention is in the range 5.6 to 6.8. The method may be conducted in any suitable buffer, such as tris buffered saline (TBS) or phosphate buffered saline (PBS). The approximate ratio of the polypeptide of the invention to the protein content of the sample may be 1:1, 2:1, 4:1, 6:1, 10:1, 15:1, 20:1, 1:2, 1:4, or 1:6, 1:10, 1:15, 1:20, 1:40, 1:100, 1:200 or 1:400 (wt:wt). A preferred ratio is 1:1 (wt:wt). Higher proportions of polypeptide to substrate may be beneficial if a shorter reaction time is required, or if the O-glycoprotein is heavily sialylated. Alternatively an earlier or simultaneous sialidase incubation step may be used to reduce sialic acid content, as is discussed in more detail below. The substrate is typically present at a concentration of around 0.01 mg/ml to 10 mg/ml, preferably around 0.1 mg/ml to 10 mg/ml, around 0.01 mg/ml to 2 mg/ml, or around 0.1 mg/ml to 2 mg/ml.

The detection or analysis of the sample to determine whether an O-glycan or O-linked glycoprotein has been bound may be assessed by any suitable analytical method, such as but not limited to mass spectrometry, HPLC, affinity chromatography, gel electrophoresis, SDS-PAGE, ELISA, lectin blotting, spectrometry, capillary electrophoresis and other standard laboratory techniques for the analysis of proteins. For example, the molecular weight of the polypeptide may be analysed. The polypeptide of the invention bound to an O-glycan or O-linked glycoprotein will have a higher molecular weight than a polypeptide not bound to an O-glycan or O-linked glycoprotein.

Separation of the bound O-glycan or O-linked glycoprotein and the polypeptide of the invention may be carried out by any suitable separation means. For example, the separation means may comprise a population of magnetic nanoparticles. These may be separated from a sample using magnetic field separation, preferably high-gradient magnetic field separation. Examples of reagents or separating means are populations of magnetic particles capable of binding to the polypeptide of the invention. For example, where the polypeptide is derivatised with a histidine tag, the magnetic particles contain on their surface chelating groups which carry a nickel, copper or zinc ion. Alternatively, where the polypeptide is derivatised with a biotin tag, the magnetic particles contain on their surface streptavidin.

The separation means may also comprise a solid support to which the polypeptide of the invention is immobilised. Examples of solid supports include those described in previous sections, and may include agarose or sepharose resins, cross-linked agarose beads, or similar. The support may be used as the matrix in an affinity chromatography column. Alternatively the solid support may comprise a suitable silica-based material or polystyrene, or a plastic container such as a microtiter plate or equivalent, to which the polypeptide of the invention can be directly adsorbed.

Alternative separation means include reagents comprising antibodies specific to the polypeptide of the invention, which may be generated by methods standard in the art. Antibodies in this sense include a monoclonal antibody, a polyclonal antibody, a single chain antibody, a chimeric antibody, a CDR-grafted antibody or a humanized antibody. The antibody may be an intact immunoglobulin molecule or a fragment thereof such as a Fab, F(ab')2 or Fv fragment. If more than one antibody is present, the antibodies preferably have different non-overlapping determinants such that they may bind to the polypeptide of the invention simultaneously. The antibody may be bound to a solid support or may be labeled or conjugated to another chemical group or molecule to assist with their separation or isolation. For example, typical chemical groups include fluorescent labels such as Fluorescein (FITC) or Phycoerythrin (PE), or tags such as biotin.

Other suitable means of separation include elution of the protein from the (typically immobilised) polypeptide by contacting the polypeptide from the contacted sample with a suitable elution buffer. The choice of elution buffer may depend on the acid-sensitivity of the protein. Preferred elution buffers may comprise high molar concentrations of urea (typically at least 5, 6, 7 or most preferably at least 8M) or high concentrations of a detergent (typically at least around 1%, 5% or 10%). Suitable detergents include Nonidet P40, Triton X-100, Tween 20, CHAPS, sodium deoxycholate, and RapiGest SF surfactant, but Sodium dodecyl sulphate (SDS) is preferred. High molar urea is preferred over detergent since downstream procedures are more likely to be sensitive to the presence of detergent.

Another preferred elution buffer comprises a suitable concentration of a polypeptide of the invention which has O-glycoprotein endoprotease activity, e.g a polypeptide of SEQ ID NO: 1. Cleavage at the O-glycan by this polypeptide will release bound O-glycoproteins, thus obviating the need for Urea or detergent-based elution.

Preferred methods of elution of O-glycoproteins from immobilised polypeptides of the invention are demonstrated in the Examples.

The sample in any of the above methods may be a sample taken from a patient, preferably a human patient. The results obtained may be used for a diagnostic purpose, for example to detect the presence of cancers which involve O-linked glycosylation. Such a use may involve comparison of the results obtained from the patient sample to those obtained using a sample obtained from a healthy control.

In any method of the invention, the polypeptide can be used in combination with another enzyme such as a protease or glycosidase. The additional protease or glycosidase will typically further digest the substrate proteins or glycans, which may permit easier or more detailed analysis of the products.

For example, the polypeptide of the invention may be used in combination with an agent to remove sialic acid. Said agent may preferably be a sialidase enzyme or a mixture of such enzymes as described in the section above. The invention also provides a composition (in lyophilised or solution form) comprising a polypeptide of the invention and Am1757 or a mixture of Am1757 and Am0707. The invention also provides a kit comprising a polypeptide of the invention in a separate container from Am1757 or a mixture of Am1757 and Am0707, with instructions for the combined use of the different enzymes.

As another example, in any of the methods described herein, the sample may be incubated with an N-glycosidase prior to, at the same time as, or after contacting the sample with the polypeptide of the invention, to remove N-glycans from target proteins. An exemplary N-glycosidase is PNGaseF. Other N-glycosidases that may be used when the sample includes immunoglobulins are EndoS (see SEQ ID NO: 1 of WO2008071418) or EndoS2 (may be referred to as EndoS49—see SEQ ID NO: 1 of WO2013037824). Each of these enzymes removes the N-linked glycoprotein from Asn-297 of IgG1. The sample may be contacted with an N-glycosidase and a sialidase (or mixture thereof) in addition to the polypeptide of the invention. In such a method, the sialidase (or mixture) may be applied first, prior to simultaneous addition of the N-glycosidase and the polypeptide of the invention.

As another example, in any of the methods described herein, the sample may be incubated with a protease prior to, at the same time as, or after contacting the sample with the polypeptide of the invention, to further digest the target protein. Suitable general proteases include trypsin, chymotrypsin, Lys-C, Asp-N, Glu-C, Arg-C or similar endoproteases, or Arg-gingipain (RgpB) of *Porphyromonas gingivalis*.

If the sample includes immunoglobulins, immunoglobulin proteases may be used such as SpeB (see sequence in WO2015040125), Immunoglobulin G-degrading enzyme of *S. pyogenes* (IdeS—see sequence in WO2015040125), Immunoglobulin G-degrading enzyme of *S. equi* subspecies *zooepidemicus* (IdeZ), Lys-gingipain (Kgp) of *Porphyromonas gingivalis*, and Immunoglobulin G-degrading Enzyme of *S. agalactiae* (IgdE$_{agalactiae}$—see SEQ ID NO: 3 of PCT/EP2017/052463). Use of any combination of these proteases in a method of the present invention may assist with analysis of the substrate protein or glycan, for example using mass spectrometry.

As another example, in any of the methods described herein, the isolated O-linked glycoprotein may be incubated with an O-glycosidase to remove the O-glycans prior to further analysis by any suitable method. Suitable O-glycosidases may be obtained from a strain of *Enterococcus faecalis, Streptococcus oralis*, or *Bifidobacterium bifidum*, preferably *Enterococcus faecalis* or *Streptococcus oralis*, most preferably *Streptococcus oralis*. The sequence of an exemplary O-glycosidase from *Streptococcus oralis* is provided as SEQ ID NO: 15.

The following Examples illustrate the invention:

Example 1

Materials and Methods

Mutagenesis of LS

Site-directed mutagenesis using Q5 (NEB) was performed according to manufacturer's instructions (annealing temperature 68° C., 3 min elongation) using primers E206A_fwd 5'-ATGGCGCACGC GCTGGGCCACG-3' (SEQ ID NO: 16) and 5'-GCCACCGTAC CATTTCGTC-3' (rev) (SEQ ID NO: 17); thus changing a glutamic acid to an alanine in an Amuc1119 gene from *Akkermansia muciniphila* to create the mutant, Amuc1119$_{E206A}$ (LS$_{E206A}$). The construct was transformed into DH5α *E. coli*, isolated and verified using sequencing (GATC Biotech).

Recombinant Expression of LS and LS$_{E206A}$

The gene Amuc1119 from *Akkermansia muciniphila* ATCC BAA-835, and a mutant, Amuc1119$_{E206A}$ (Amuc1119-LS; Amuc1119$_{E206A}$-LS$_{E206A}$), were codon optimized for expression in *E. coli* (DNA 2.0) and cloned into an expression vector with a C-terminal 6×His-tag as part of the fusion protein.

The codon-optimized genes were transformed into BL21 (DE3) Star cells. *E. coli* was routinely cultured in LB at 37° C., 180 rpm. In the presence of the plasmid, 50 µg/mL kanamycin was added. After overnight incubation, cultures were diluted 1:20 in fresh LB(kana), and grown until OD$_{620}$~0.7-0.8, after which recombinant protein expression was induced by addition of 1 mM IPTG, and the expression continued for 6 hours before the cells were collected and frozen. Frozen cells were thawed and resolved in His binding buffer (20 mM NaP pH 7.4, 500 mM NaCl, 20 mM imidazole), and sonicated for release of intracellular proteins. Cell debris was removed by centrifugation. Sterile filtered supernatant was affinity purified on a nickel column, and re-buffered to 20 mM Tris-HCl pH 8.0 on a PD-25 column. Concentration of the proteins was determined using the Nanodrop, and purity estimated through SDS-PAGE.

Activity Assessment using Protein Substrate

TNFαR was mixed together with LS at a 2:1 ratio and incubated for 15-60 minutes at 37° C. after which the proteins were separated on a 4-20% Novex gradient SDS-PAGE. The impact of NaCl (0-1 M), divalent cations, EDTA, and pH on LS activity was investigated, and differences in generated hydrolytic fragments measured through densitometric analysis using Gel Doc EZ (BioRad).

Time and Dose Dependency for Activity

TNFαR (0.5 µg) was incubated with varying doses of LS for 15 or 60 minutes at 37° C. in PBS after which the proteins were separated on a 4-20% Novex gradient SDS-PAGE. The intensity of the generated fragments (densitometry) was used for determining optimal dose and time for efficient incubation conditions.

Substrate Specificity

LS was incubated with a variety of N- and O-linked substrates overnight at 37° C. at a ratio of 2:1 (substrate: enzyme). LS was incubated with EPO (0.3 mg/ml) at a ratio of 50:1 (substrate:enzyme). The proteins were separated and analyzed on 4-20% Novex gradient SDS-PAGE gels.

Immobilization of $LS_{E206A}$ $LS_{E206A}$ was resuspended into a coupling buffer (0.2 M $NaHCO_3$, 0.5 M NaCl pH 8.3), and concentrated to 20 mg/ml. NHS-activated sepharose 4 Fast Flow (GE Healthcare) was prepared for coupling according to manufacturer's instructions (e.g. HCl wash and equilibration in coupling buffer). $LS_{E206A}$ was immobilized by overnight incubation with the sepharose at 4° C., slowly rocking for constant mixing. The sepharose was blocked by addition of 0.1 M Tris pH 8.5, washed with 3 repetitions of 0.1 M Tris pH 8.5/0.1 M NaAc, 0.5 M NaCl pH 5.0, and stored in EtOH until usage.

Binding affinity of $LS_{E206A}$

Spin columns with 50 µl immobilized $LS_{E206A}$ (e.g. ca 50 µg protein) equilibrated in PBS were incubated with 10 µg glycoprotein pretreated with either a sialidase mix (Am0707:Am1757), or with a combination of sialidases and a *Streptococcus oralis* Endo-α-N-acetyl-galactosaminidase (e.g. an O-glycosidase). The samples were allowed to incubate for 2 h at 37° C. after which the columns were washed with PBS (10 volumes; 100 g, 30 s) and eluted with 0.1 M glycine pH 3.0. Fractions were analyzed on SDS-PAGE.

Mass Spectrometry Analysis

Etanercept (Enbrel®) is clinically approved Fc-fusion protein that binds to TNFα. etanercept contains several O-glycans. In order to test enzymatic cleavage specificities the endoprotease was incubated together with etanercept overnight at 37° C. To simplify mass spectrometric analysis, a second round of enzymatic treatment was done to remove the remaining O-glycans using sialidase and O-glycosidase (overnight, in PBS, 1:40 ratio of all single enzymes). The generated peptides were analyzed by MS/MS after separating the peptides by C18 reversed phase liquid chromatography.

Results

LS is a Putative Metalloprotease

Based on sequence and domains similarity, LS shares homology with several metalloproteases, containing the putative active site sequence GMAHELGHGL (SEQ ID NO: 8), sharing similarity to the general metalloprotease sequence abxHEbbHbc (SEQ ID NO: 60; a=V/T, b=no charge, c=hydrophobic). The histidines are generally involved in substrate binding and $Zn^{2+}$ affinity, while the glutamic acid together with the histidines mediate the electron transfer, and thus the hydrolytic effect. To be able to further characterize the enzyme, we constructed an $LS_{E206A}$ mutant, capable of binding the substrates, but lacking or having reduced hydrolytic capabilities by altering the E to an A. Further modifications (e.g. altering H to A) may be necessary for full inactivity. Both constructs expressed well, and were readily purified using affinity chromatography based on their His-tags (FIG. 1).

LS Specifically Hydrolyses Glycoproteins with O-glycans

In order to investigate the substrate specificity of LS, the protease was incubated with a diversity of proteins. As shown in FIG. 2, LS was incubated with IgA and Herceptin (trastuzumab). LS was only able to act upon proteins having O-linked glycans, such as IgA. While the presence of terminal sialic acids seemingly partly inhibits the activity of LS, the absence of sialic acids is not a prerequisite for hydrolysis (FIG. 4).

LS can Act Upon O-Linked Glycoproteins Under Diverse Conditions

Figure 3B:
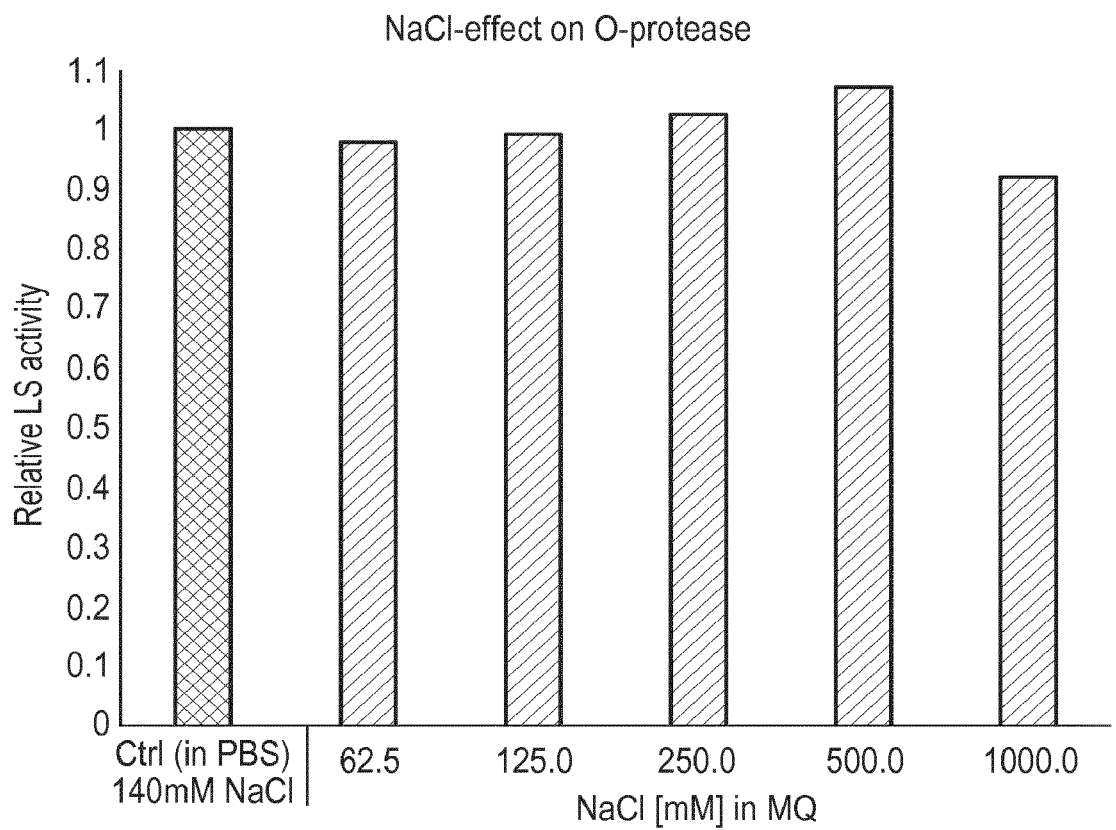
Figure 3C:
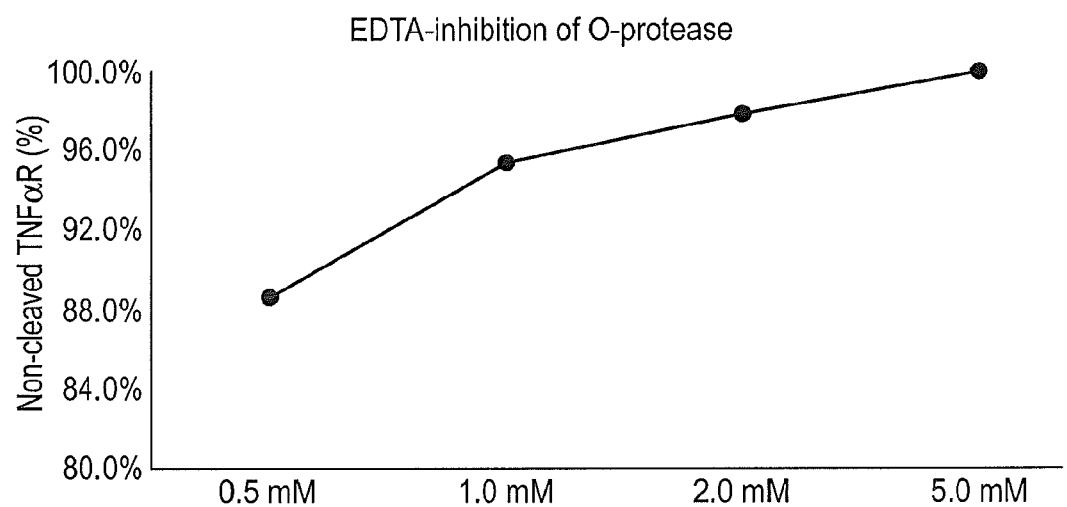
Figure 3D:
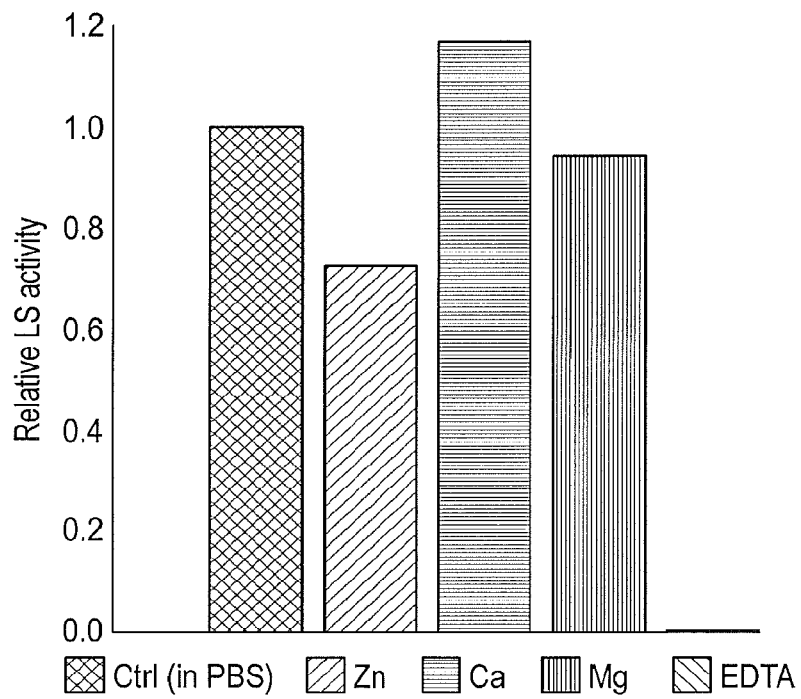

Densitometric analyses of SDS-PAGE gels were carried out to evaluate the enzymatic properties of LS. LS is active under most conditions, with a preference for a slightly acidic pH and a low NaCl concentration (FIG. 3A-B). While both $Mg^{2+}$ and $Ca^{2+}$ ions positively affected the hydrolytic activity of LS, the presence of $Zn^{2+}$ significantly lowered the activity, and EDTA completely abolished it (FIG. 3C-D).

O-Linked Galactosidase Residues are Critical for Activity of LS

Figure 4A:
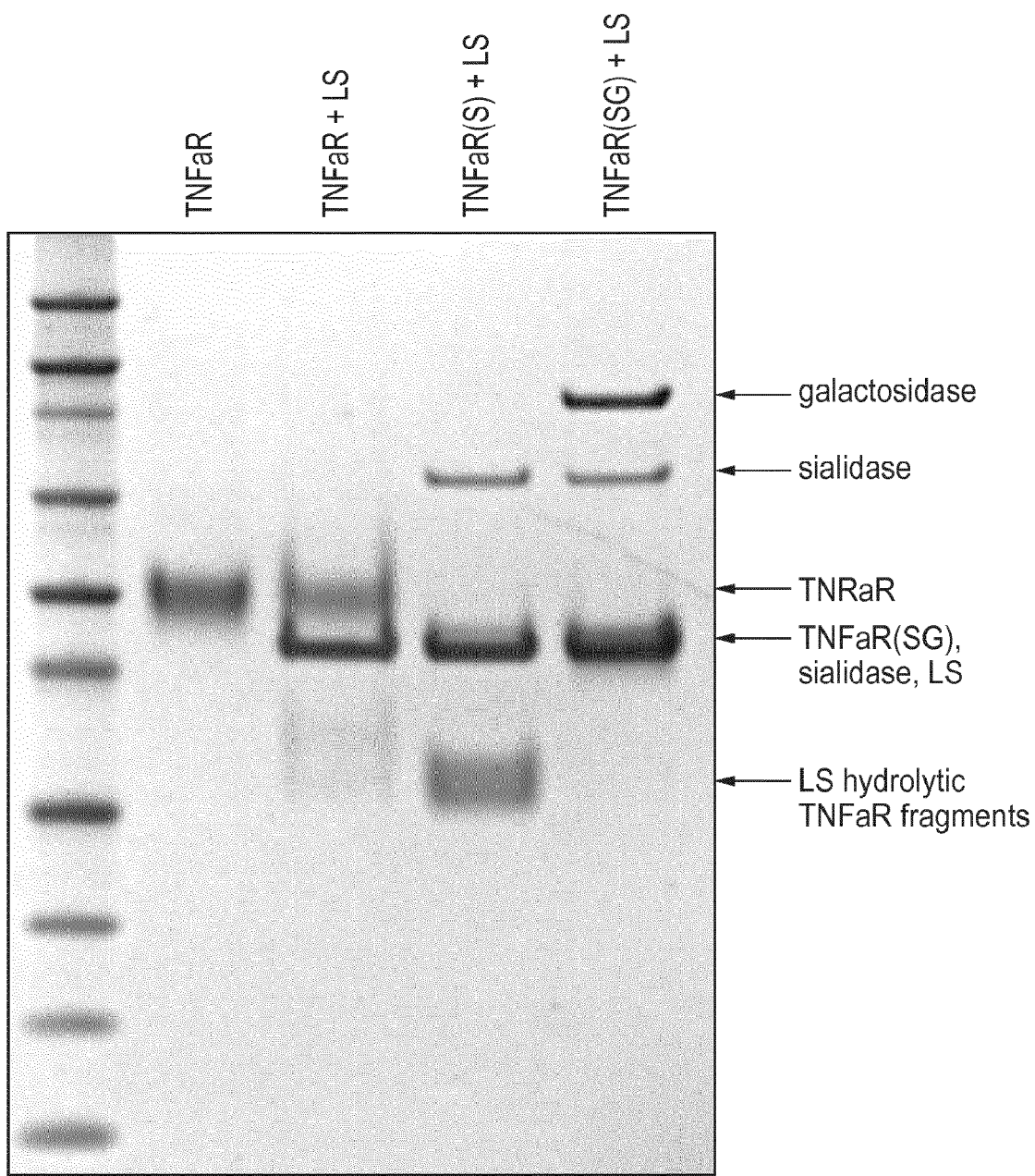
FIG. 4: Activity of LS is regulated by glycan composition. (A) Sequential removal of specific glycans before hydrolysis with LS for 30 minutes resulted in very low activity in a sialylated protein, high activity in an asialylated protein, and no activity in a sample with removed galactoses. (S) sialidase, (SG) sialidase and galactosidase, (LS) LS. (B) Prolonged incubation (o/n) of fully glycosylated (Enbrel) or sialidase treated (Enbrel(S)) glycoproteins resulted in full hydrolysis in both samples Enbrel may also be referred to herein as etanercept. (C) The TNFα binding part of etanercept (TNFαR) was pretreated with sialidase ("sialidase"), O-glycosidase/sialidase ("O-glyc"), or with PNGaseF ("N-glyc"), to remove sialic acids, O-glycans, and N-glycans, respectively. LS was added to the samples, and incubation was allowed to continue o/n before analysis. LS had activity in all samples except those treated with O-glycosidase.
Figure 4B:
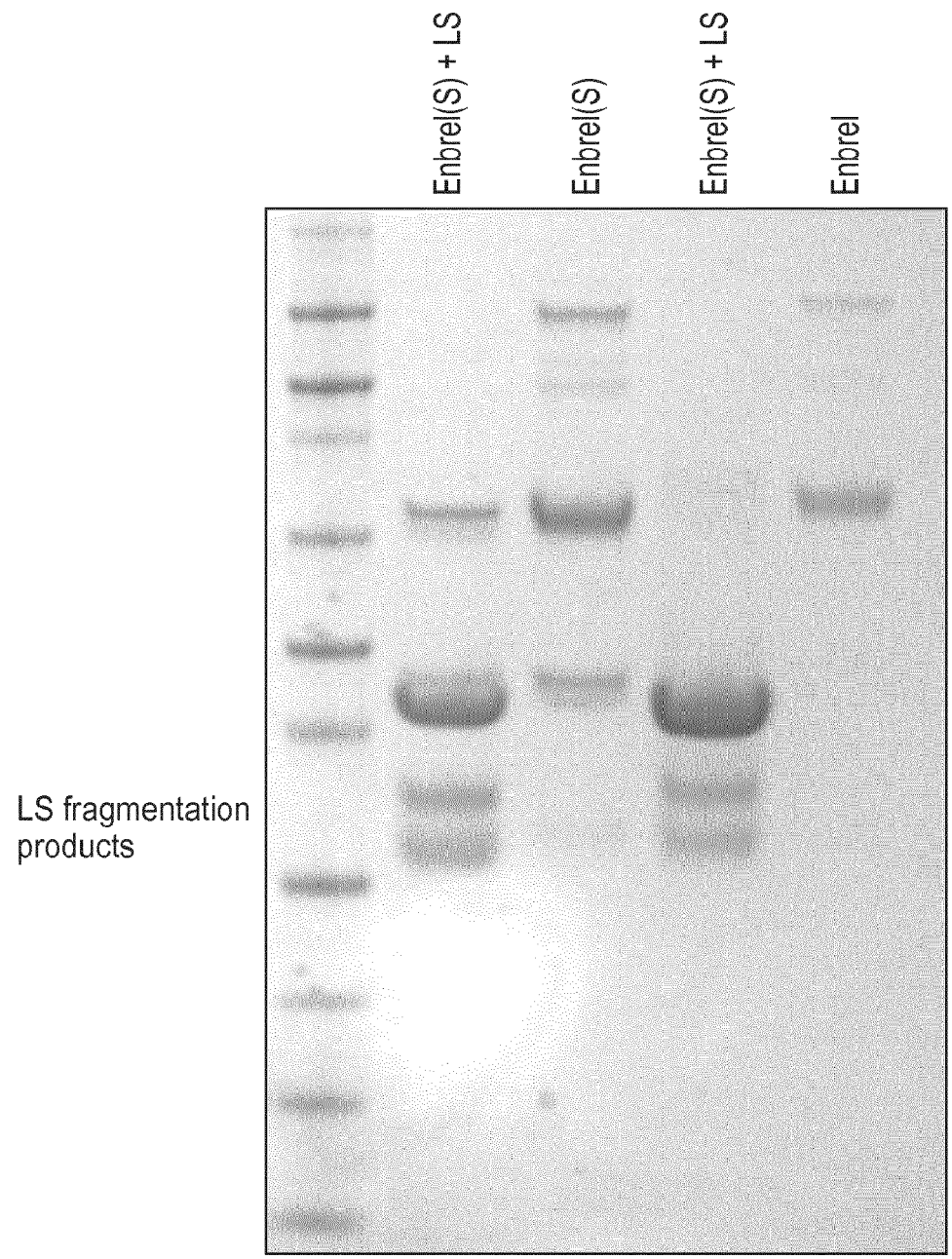

While having an increased activity in the absence of terminal sialic acids, the importance of the other carbohydrates in the O-glycans for the activity of LS was not fully understood. While the activity of LS is significantly increased in the absence of terminal sialic acids, the removal of galactoses completely inhibits the activity of LS (FIG. 4A). Further, the lower activity of LS on sialylated proteins is not due to an inability to hydrolyze the bond in the presence of sialic acids, as demonstrated by the full hydrolysis after overnight incubation (FIG. 4B). The activity of LS fully relies on O-glycans, since removal of N-glycans did not affect the hydrolysis by LS (FIG. 4C).

O-Linked Glycans Direct the Cleavage Site of LS

Having demonstrated that the O-glycan is critical for activity, we next sought to investigate the specific cleavage site of LS. Using mass spectrometry, we were able to demonstrate that LS hydrolyzes the amino bond between the O-glycosylated Ser/Thr and its N-terminal amino acid, regardless of its type (e.g. proline does not seem to inhibit the hydrolysis) (FIG. 5).

Figure 5A:
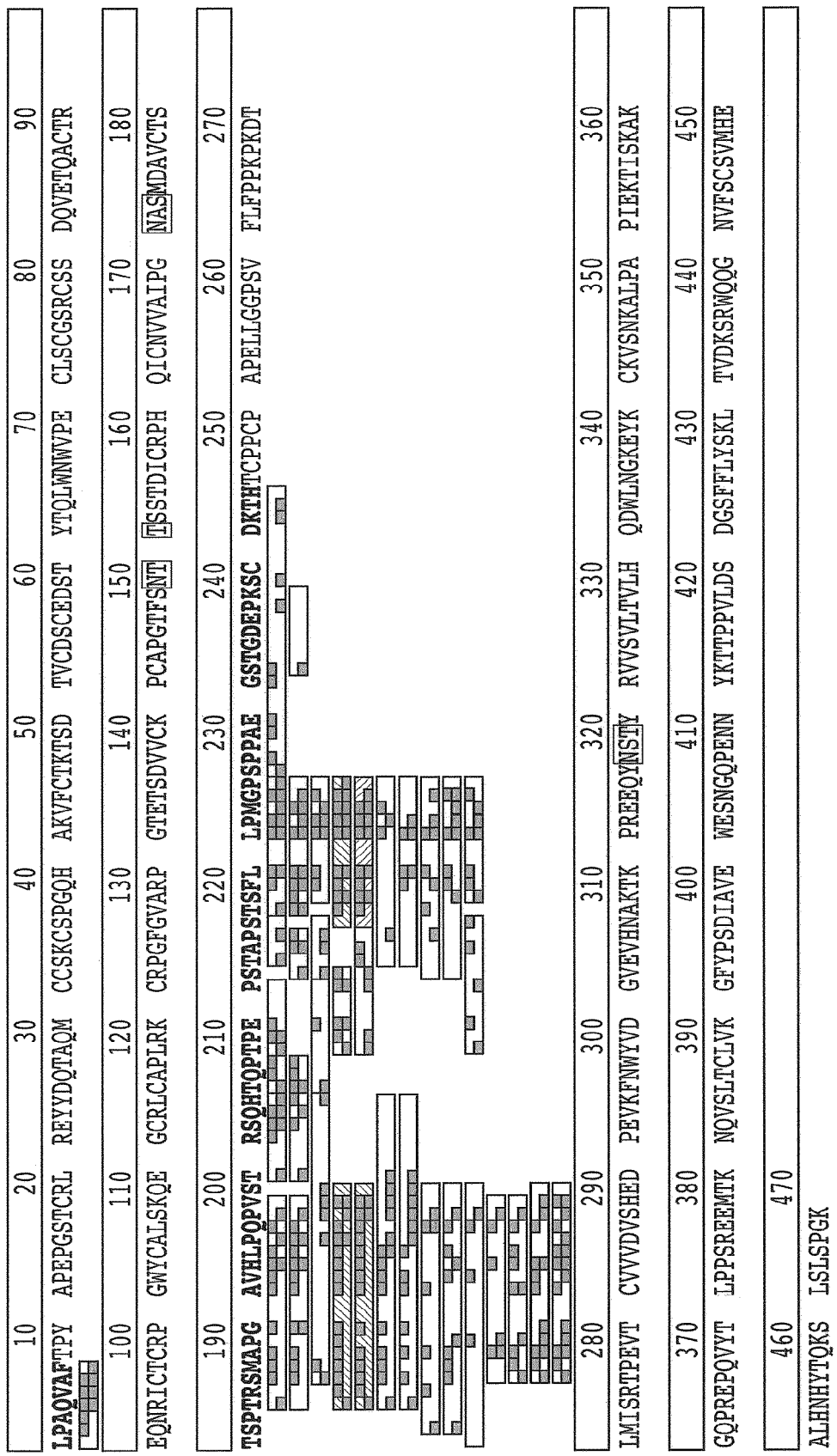
FIG. 5: Search results showing that LS hydrolyses the glycoprotein N-terminal of O-glycans. Etanercept hydrolyzed to fragments with LS, and subsequently deglycosylated with O-glycosidase treatment were subjected to mass spec analysis (liquid chromatography mass spectrometry (LC/MS) and tandem mass spectrometry (MS/MS)). Identified peptides (white and hatched boxes) were fitted to the sequence of Etanercept based on m/z values and MS/MS data, with y' and b' ions marked as small grey boxes. All gwhite and hatched boxes (e.g. peptides) start directly at a T or an S, where O-glycans have been attached. The preceding amino acid varies (P, S, H, T, G), and seems likely to not influence the hydrolysis. (A) Analysis using a biased approach, specifically searching for peptides generated with an S/T-peptidase (SEQ ID NO: 51). (B) Analysis using an unbiased approach (SEQ ID NO: 51).

Using etanercept as a model protein due to its high abundance of O-linked glycans, the glycoprotein was treated with LS, after which it was subsequently treated with O-glycosidases to facilitate the mass spec analysis. m/z values generated from the mass spec analysis, in combination with MS/MS data, were fitted to etanercept. All identified peptides had an N-terminal serine or threonine, consistent with LS cleaving just N-terminal of the O-glycans (FIG. 5). The analysis identified peptides both in a directed search (defining S/T hydrolysis in the parameters; FIG. 5A), and in an unbiased approach (FIG. 5B).

A Hydrolytic Inactive Variant of LS Specifically Bind to O-glycan Containing Proteins With the ability of LS to bind to O-glycans and specifically hydrolyze the amino acid bond next to the glycan (e.g. next to Ser/Thr), we hypothesized that an $E_{206}A$ mutant of LS would lack hydrolytic activity, but retain binding ability. Such a tool would be valuable among others for a) identifying O-linked glycoproteins, b) affinity-purify O-linked glycopeptides for removal or for study, and c) affinity-purify O-glycans.

Figure 6A:
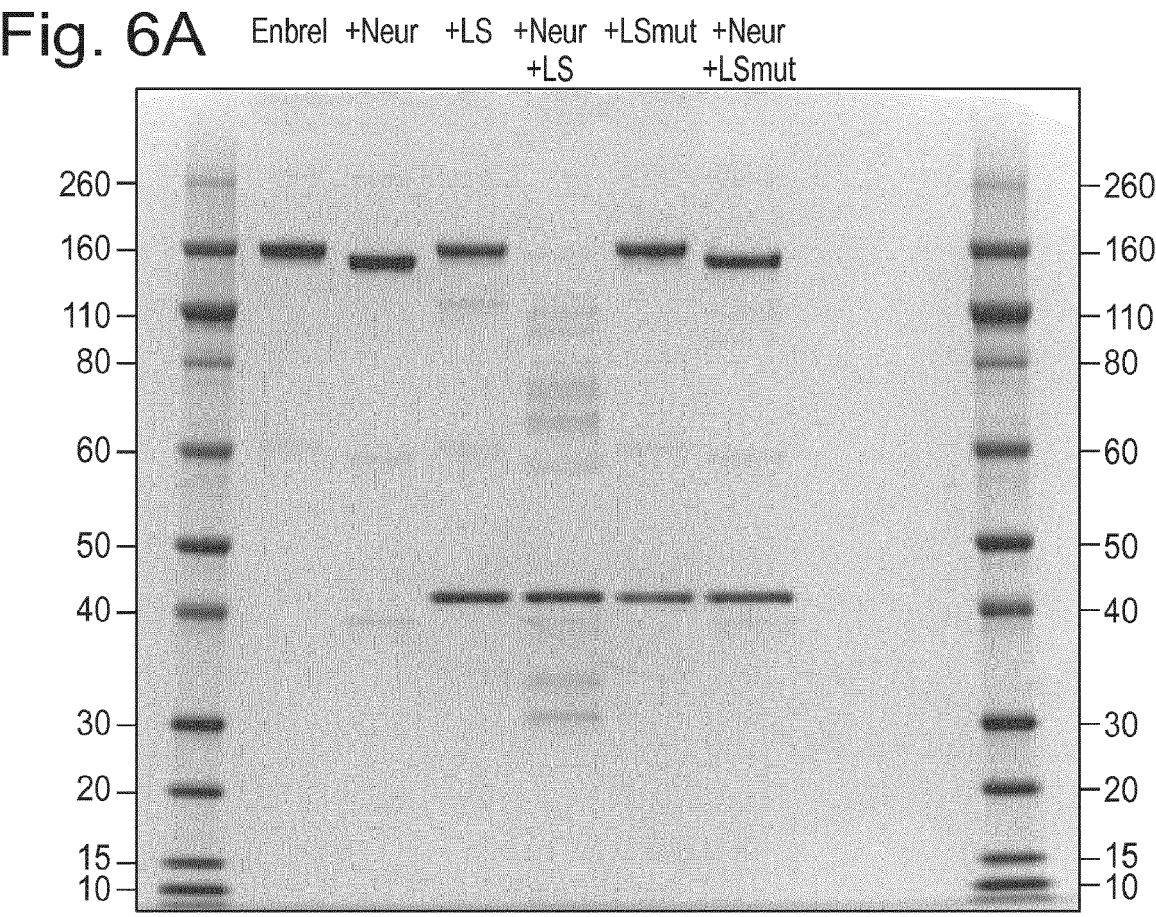
FIG. 6: Inactivated LS specifically binds to O-linked glycoproteins. The metalloprotease active site was mutated to remove the catalytic capacity while not affecting substrate affinity or interaction. Specifically this was done by exchanging an E to an A, thus creating clone "$LS_{mut}$" (also referred to as $LS_{E206A}$). (A) While LS was able to hydrolyze Enbrel in the presence of sialidase, the inactivated Lsmut could not hydrolyze Enbrel under the conditions tested. Loss of activity was verified on SDS-PAGE. (B) Despite having lost hydrolytic activity, $LS_{mut}$ was still able to bind to O-glycoprotein. Specific binding was verified on spin columns with immobilized $LS_{E206A}$, demonstrating a specific affinity for O-linked glycoproteins. By immobilizing LSmut on sepharose we were able to affinity purify IgA. Herceptin (Trastuzumab), lacking O-glycans, as well as O-glycosidase treated IgA, did not bind to the column, but could be detected in the flowthrough (FT). Neur=Neuraminidase/Sialidase 0707.

FIG. 6A shows that the mutant LS did not have any detectable hydrolytic activity. While LS was able to hydrolyze etanercept in the presence of sialidase, the LSmut could not hydrolyze etanercept, confirming that the genetic alteration indeed inactivated O-glycoprotease under the conditions tested.

Figure 6B:
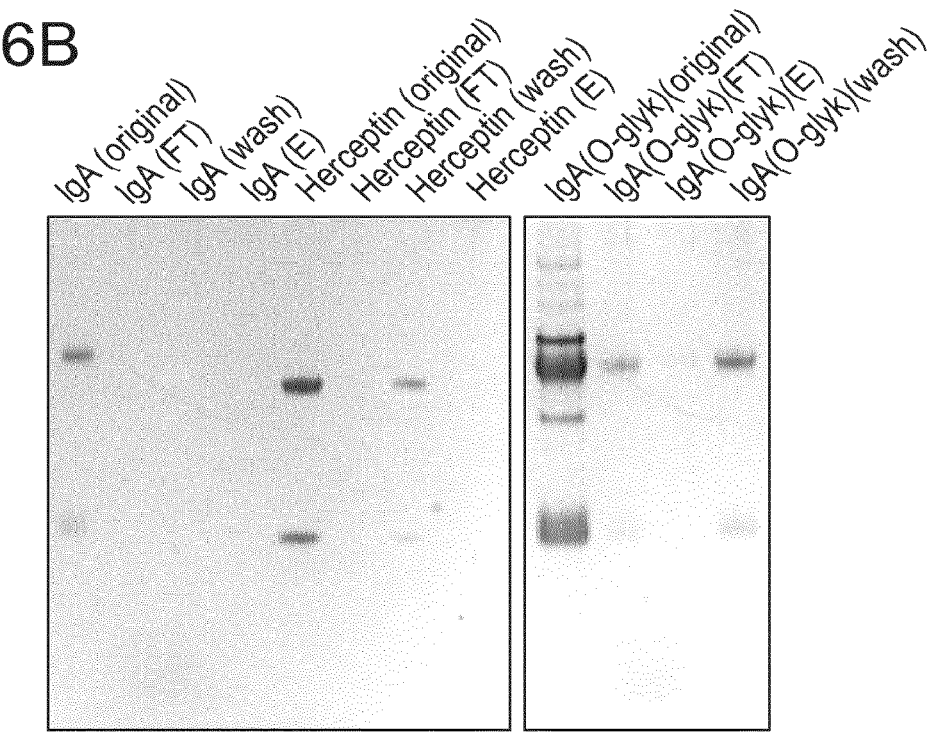
Figure 8:
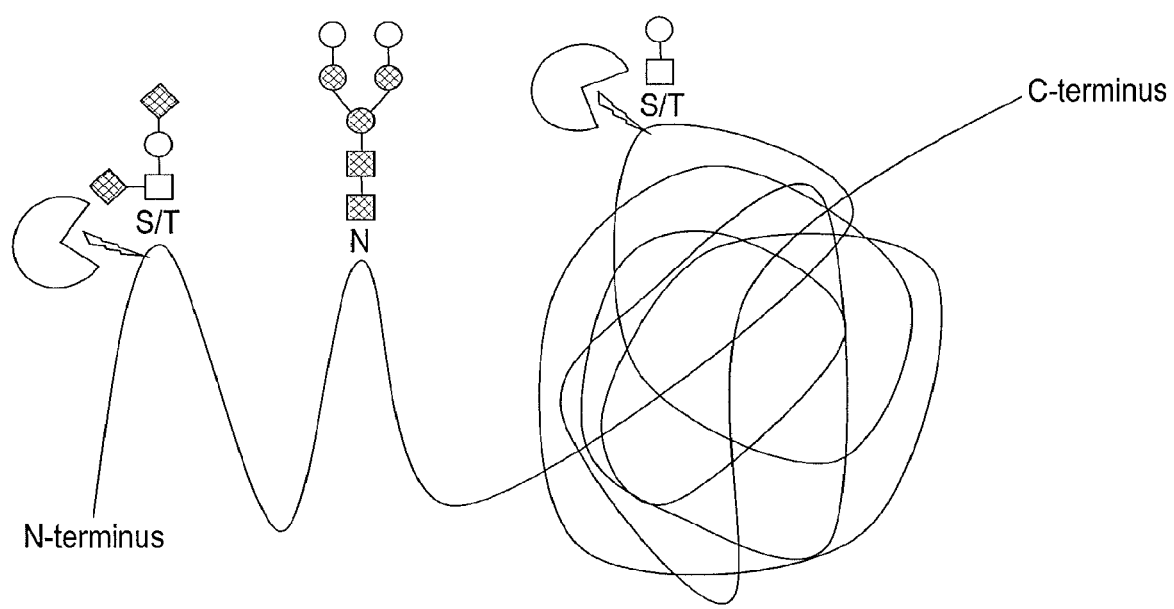
FIG. 8: Schematic presentation of LS activity. LS preferentially binds terminal galactoses attached to O-linked GalNAc, resulting in an N-terminal hydrolysis of the serine or threonine upon which the glycan is attached. Presence of sialic acids will reduce the efficiency of LS, but not inhibit it. No activity can be seen upon N-linked glycans.

$LS_{E206A}$ was immobilised onto sepharose and added onto spin columns for easier handling. Importantly, the binding of $LS_{E206A}$ to different substrates perfectly correlated with the hydrolytic activity of LS (FIG. 6B). $LS_{E206A}$ (labelled as $LS_{mut}$) demonstrated a specific affinity for O-linked glycoproteins. By immobilizing $LS_{mut}$ on sepharose we were able to affinity purify IgA. However, we were not able to elute the protein, likely due to a strong affinity. Herceptin (trastuzumab), lacking O-glycans, as well as O-glycosidase treated IgA, did not bind to the column, but could be detected in the flowthrough (FT).

2-3 Sialic Bonds are Important to Remove for Full LS Activity

We recently determined that endoprotease activity relied on specific sialic acid bonds, necessitating the removal of both 2-3 and 2-6 linked sialic acids for full effect. To determine the individual role of specific sialic acid bonds for the activity of LS, we incubated Enbrel with different sialidases in combination with LS for 30 min-20 h. Removal of 2-3 bonds seemed sufficient for hydrolysis by LS (FIG. 7).

LS Cleaves Erythropoietin (EPO)

EPO was treated with PNGaseF, a sialidase (Smix, comprises Am0707 and Am1757) and/or an O-glycosidase and incubated with LS.

Figure 9A:
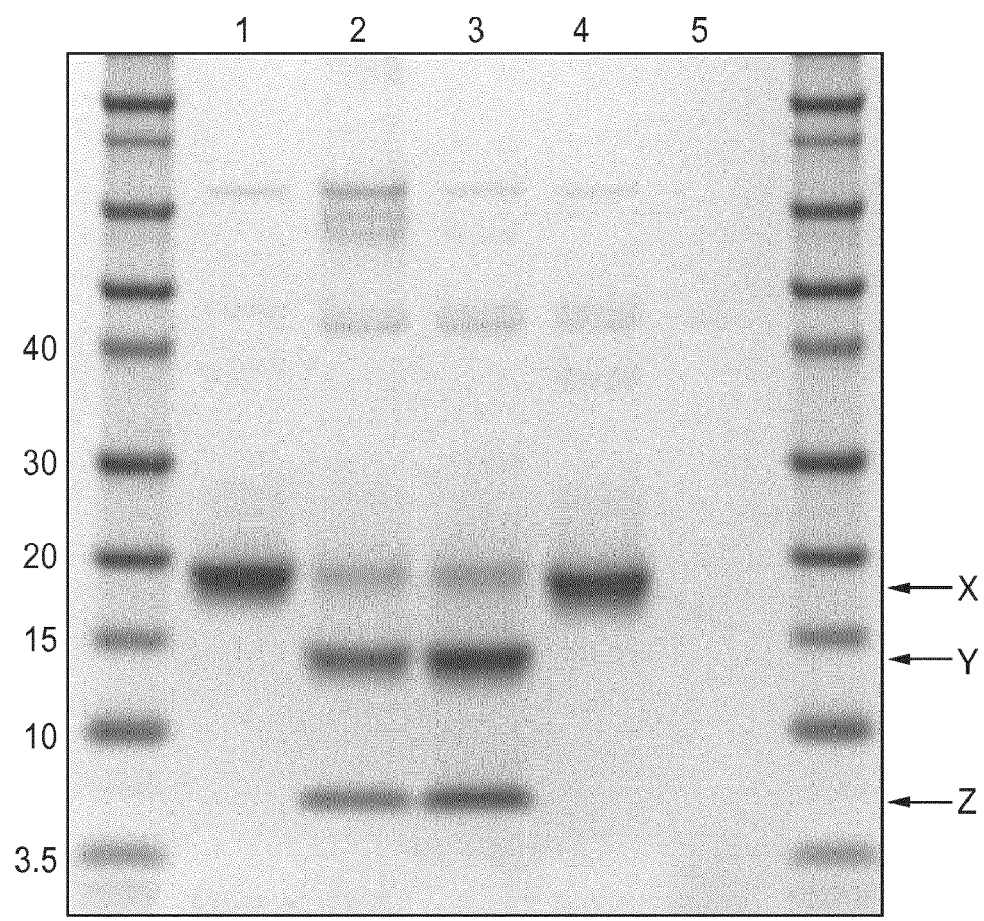
FIG. 9: Results of an experiment in which erythropoeitin is cleaved with different combinations of LS, PNGaseF to remove N-glycans, Sialidases to remove sialic acid, and with an O-glycosidase to remove O-glycans. Reaction products were analysed by SDS-PAGE, RPLC and ESI mass spectrometry (A) Results of SDS-PAGE analysis: Lane 1=EPO treated with PNGaseF and sialidase; Lane 2=EPO treated with PNGaseF and sialidase+LS; Lane 3=EPO treated with PNGaseF+LS; Lane 4=EPO treated with PNGaseF, sialidase, O-glycosidase before LS; Lane 5=enzyme control. Band X=uncleaved EPO; Band Y=N terminal fragment of EPO digested by LS; Band Z=C terminal fragment of EPO digested by LS. Lanes 2 and 3 show that LS cleaves EPO where the sialic acids have been removed as well as where they are intact. Lanes 2-3 show that LS also cleaves EPO where N-glycans have been removed with PNGaseF. Lane 4 shows that LS does not cleave EPO where the O-glycans have been removed. (B) UV chromatogram shows results of RPLC separation for EPO treated with PNGaseF and sialidase+LS. Two major peaks were identified as shown. Peak 1 is the C terminal fragment of EPO digested by LS; Peak 2 is the N terminal fragment of EPO digested by LS; (C,D) show results of mass spectrometry analysis. Fig C shows masses of the C terminal fragment of EPO (from top to bottom SEQ ID NOs: 52 and 53) with O-glycan still attached to the (now N terminal) serine (Square=GlcNAc, Circle=Galactose). Differences in mass are due to differences in degradation of the O-glycan (loss of a terminal Galactose) in some parts of the sample, likely caused by the ionisation energy in the MS instrument; Fig D shows the N terminal fragment of EPO lacking glycan (SEQ ID NO: 54), plus undigested EPO with glycan still attached (SEQ ID NO: 55).

The resulting products were then analysed by SDS-PAGE and Coomassie blue staining, as well as RPLC and mass spectrometry. Results of SDS-PAGE are shown in FIG. 9A, which shows that LS cleaves EPO both when sialic acids have been removed and when they are intact. Furthermore, LS also digests EPO where the N-glycans have been removed with PNGaseF, confirming that LS activity is not affected by N-glycan removal. However, LS did not cleave EPO when the O-glycans were removed with O-glycosidase, showing that O-glycan is needed for LS to cleave a protein. Equivalent results were observed at ratios of 10:1, 5:1 and 2:1 (substrate:enzyme) (data not shown).

The sample mixtures following incubation with PNGaseF, Smix and LS were separated by Reverse Phase Liquid Chromatography and analyzed by ESI mass spectrometry for identification of reaction products after enzymatic treatment.

FIG. 9B shows an UV chromatogram from the RPLC. As expected, given that EPO has only one suggested O-glycan position (see predicted position in SEQ ID NO: 14 below), the chromatogram shows 2 peaks which correspond to the 2 fragments resulting from cleavage by LS.

Figure 9C:
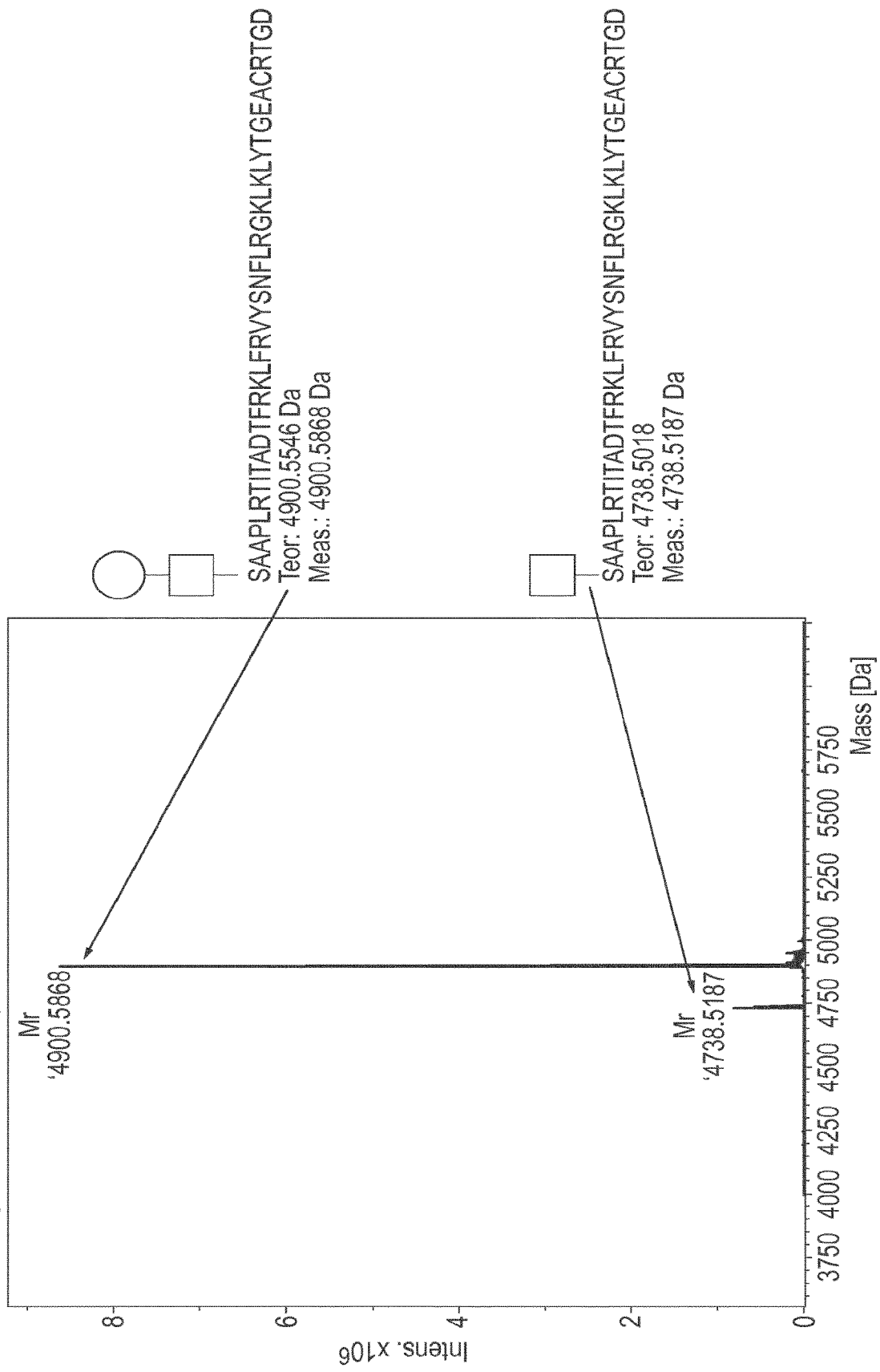
Figure 9D:
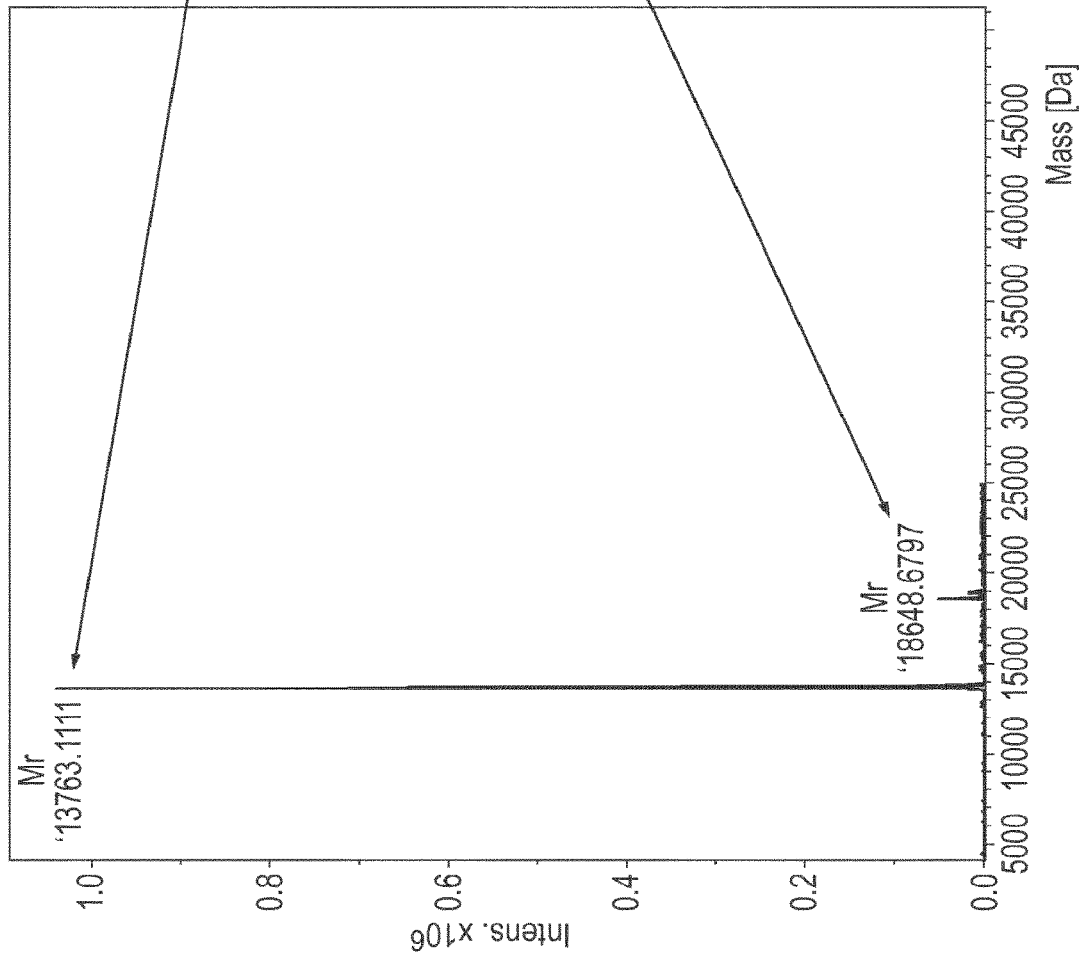

These fragments were further analysed by MS (see FIGS. 9C and D) and identified as follows:

```
SAAPLRTITADTFRKLFRVYSNFLRGKLKLYTGEACRTGD
(SEQ ID NO: 53; Mass = 4900.5868 Da-
corresponds to the sequence
C terminal to the cleavage point and thus
includes the O-glycan still linked to the
N terminal serine);
and
```

```
-continued
APPRLICDSRVLERYLLEAKEAEDITTGCAEHCSLDENITV

PDTKVDFYAWKRMEVGQQAVEVWQGLALLSEAVLRGQALLV

NSSQPWEPLQLHVDKAVSGLRSLTTLLRALGAQKEAISPPD

AA
(SEQ ID NO: 54; Mass = 13714.1199 Da,
corresponds to the sequence N terminal
to the cleavage point).
```

Therefore the combined use of PNGaseF, sialidase mix and LS permitted the isolation and precise identification of the O-glycan-bearing serine in EPO. Methods of this type are applicable to any O-glycoprotein and permit the rapid identification of O-glycan attachment positions.

Example 2

Introduction

The LSE206A mutant described in Example 1 incorporates a site-directed mutation of the active site of LS (abxHEbbHbc (SEQ ID NO: 60) to abxHAbbHbc (SEQ ID NO: 65)), removing the electron transfer capacity of the enzymatic cleft. As is explained further below, upon further stress testing it was found that although this change reduced O-glycoprotease activity relative to the wild-type sequence it did not completely eliminate it. Accordingly the inventors have developed and characterized another mutant incorporating an additional substitution in the enzymatic cleft. Specifically, a His residue important in the orientation of the co-factor zinc ion was replaced with an Ala. The resulting double-mutant is referred to as H205A/E206A (abxHEbbHbc (SEQ ID NO: 60) to abxAAbbHbc (SEQ ID NO: 66)).

2.1 Production of the Double-Mutant

Site-directed mutagenesis using standard protocols (e.g. as in Example 1) was used to change both a histidine and a glutamic acid to alanine relative to the Amuc1119 gene of *Akkermansia muciniphila*, to create the double mutant, Amuc1119H205A/E206A ($LS_{H205A/E206A}$). The construct was transformed into *E. coli*, isolated and verified using sequencing as in Example 1. Expression in *E. coli* was conducted as described in Example 1. The sequence of the expressed protein is provided as SEQ ID NO: 21.

2.2 Characterization of the Double-Mutant 2.2.1 Double Mutant Fully Inactivates the Activity of LS As shown in Example 1, the single mutant LSE206A was seen to be inactive given its inability to hydrolyze an O-glycoprotein in 2 hours. However, in a stress test it was found that O-glycoprotease activity was not completely abolished, but was rather only reduced in that some activity was observed at higher ratios of enzyme: O-glycoprotein and longer incubation times.

Figure 10B:
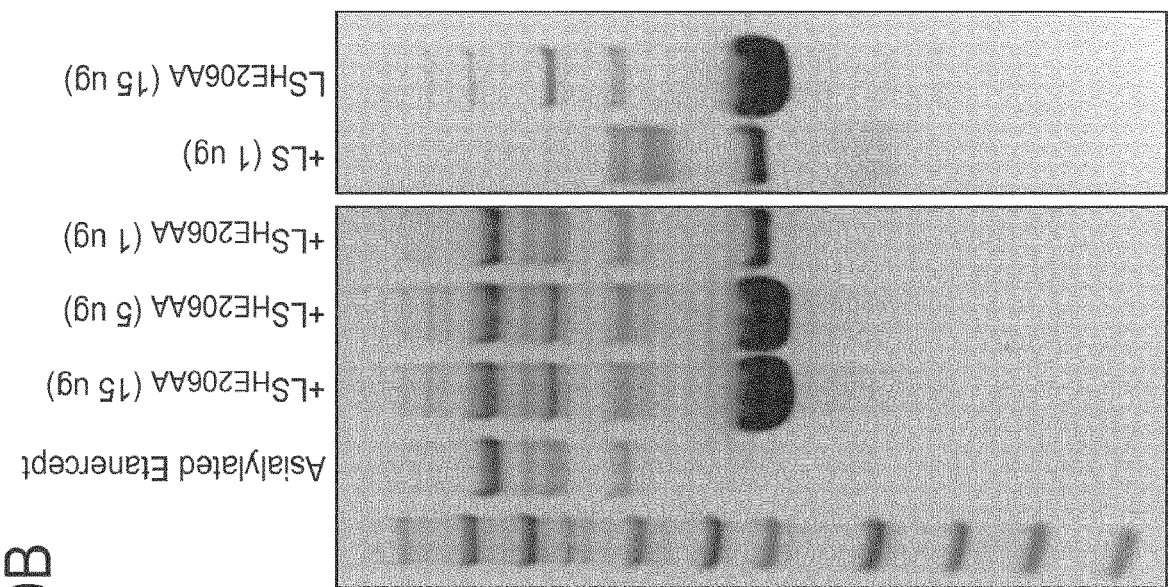
FIG. 10: Results of experiments which show that $LS_{E206A}$ retains some activity whereas $LS_{H205A/E206A}$ (may also be referred to as $LS_{HE206AA}$) is completely inactive. The activity of the LS mutants $LS_{E206A}$ (A) and $LS_{H205A/E206A}$ (B) was evaluated against asialylated O-glycosylated substrates including the TNFα binding part of etanercept (TNFaR2; may also be referred to herein as TNFaR) and etanercept itself (Etanercept), as compared to the wild type LS enzyme. Different concentrations of the LS mutants were added to 1
Figure 10A:
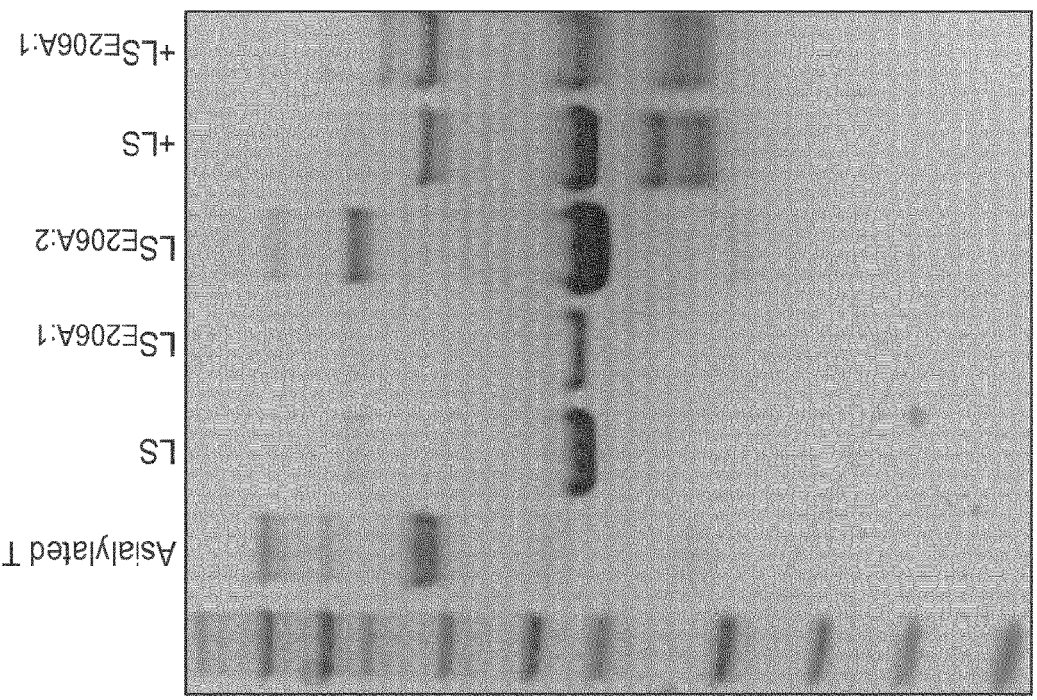

Incubation for 24 hours at a 1:1 (wt:wt) ratio for LSE206A:asialylated O-glycoprotein resulted in a significant hydrolysis of the substrate, though not to the same extent as wild type LS (FIG. 10A). By contrast, the double-mutant LSH205A/E206A did not produce any evidence of hydrolysis even at 15:1 (wt:wt) ratios for the enzyme: O-glycoprotein after overnight incubation (FIG. 10B), suggesting that the enzyme was completely inactive with the addition of the second mutation.

2.2.2 Double Mutant Specifically Binds O-glycoproteins

To assess binding to different proteins, immobilized $LS_{H205A/E206A}$ (50 µl resin) (prepared using the same protocol as Example 1) was equilibrated in PBS, after which 50

µg of different samples of proteins were added in a concentration of 0.5 mg/mL and incubated with end-over-end rotation for 2 hours at room temperature. The flowthrough was collected through centrifugation (200 g, 1 min) and the resin washed 3× with 350 µl PBS. Bound proteins were eluted by two sequential 5 minutes incubations with 50 µl 8 M Urea followed by centrifugation (1000 g, 1 min). All samples were loaded in equal volumes. Starting/loading material, flowthrough, and eluate were assesed by SDS-PAGE.

In the first experiment (see FIG. 11A), glycosylated or non-glycosylated proteins were pretreated with either a sialidase mix (Am0707:Am1757), or with a combination of the sialidase mix and a *Streptococcus oralis* Endo-α-N-acetyl-galactosaminidase (e.g. an O-glycosidase) before being incubated with the resin, washed, and eluted. Pretreatment of the samples (Sialidase mixture+/−O-glycosidase) was done in accordance with the manufacturer's instructions. Only proteins with O-glycans bound to the resin, with an increased affinity in the absence of sialic acids. The presence of O-glycans was imperative for any binding to take place, as shown by the lack of interaction after treatment with O-glycosidase.

In the second experiment (see FIG. 11B), a mix of N-glycosylated, O-glycosylated and non-glycosylated proteins was incubated with LS double mutant resin. Only O-glycosylated proteins (TNFαR and ApoE) were bound to the matrix and eluted with 8 M urea. N-glycosylated (aflibercept, AGP (alpha-1-acid glycoprotein), Fc domain of IgG (IgG Fc) and non-glycosylated (BSA) did not bind to the LS double mutant resin and were found in the flow through. Thus the double mutant resin specifically binds to only O-glycosylated proteins when a sample contains a mixture of N-, O- and non-glycosylated proteins.

In the third experiment (see FIG. 11C), a mix of N-glycosylated and non-glycosylated proteins was incubated with LS double mutant resin. There was no non-specific binding even in the absence of possible competition from O-glycoproteins (none are present). No proteins were found in the eluate. Thus the double mutant resin does not bind to proteins lacking O-glycans.

Figure 12A:
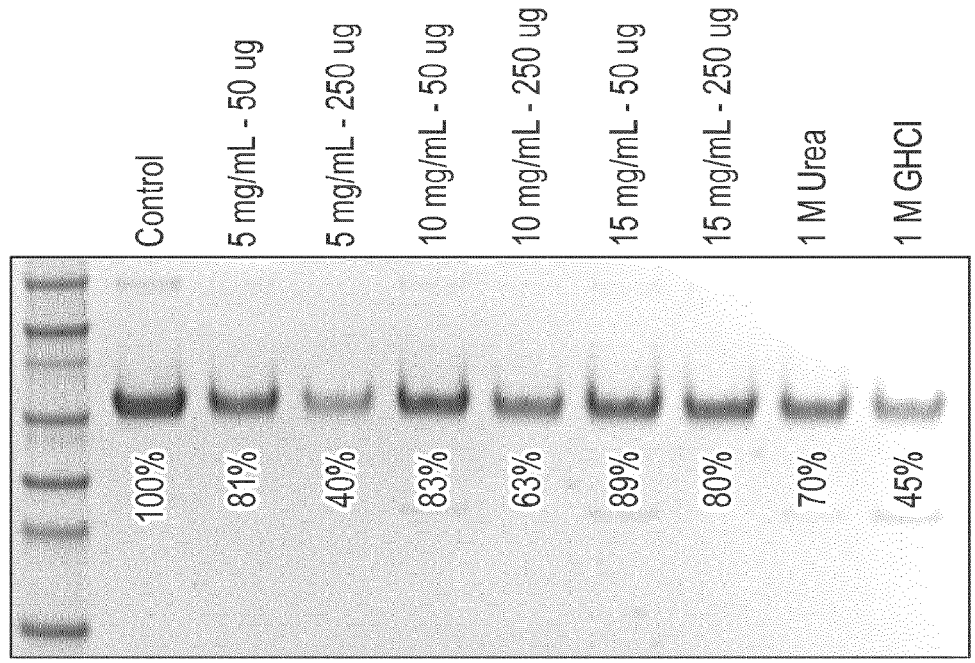
Figure 12B:
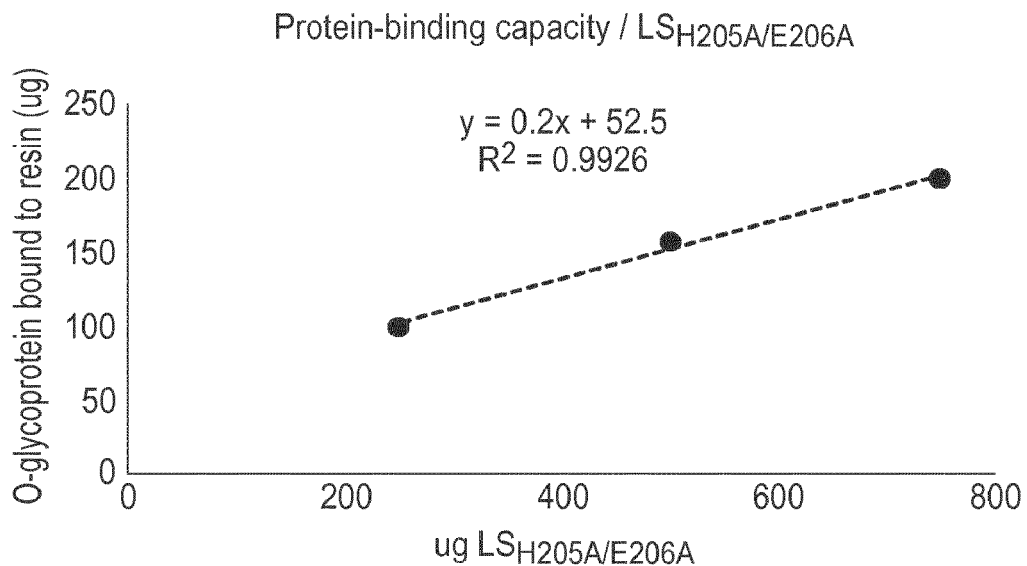

2.2.3 Double Mutant can be Immobilized on Resin at Different Concentrations to Enhance Capacity To investigate the ability to improve the capacity of the immobilized double-mutant resin to bind more O-glycosylated proteins, different concentrations of double mutant (5-15 mg/mL) were used during immobilisation on resin. A representative gel is shown in FIG. 12A. The % shown is the level of binding relative to positive control and was determined by densitometry analysis of the gel. The results are shown in the graph in FIG. 12B. A dose-dependent increase in capacity with higher O-glycoprotein binding capacity was seen when using a higher concentration of double mutant during immobilization. Further experiments continued using 15 mg/mL of immobilized double mutant. Further, a high degree of O-glycoprotein binding was maintained even in the presence of 1 M Urea and 1 M GHCl, even though the latter significantly reduced binding efficiency.

2.2.4 the Affinity Purification Ability of the Double Mutant is ~3 mg glycoprotein/mL Resin In order to specifically investigate the ability of the double-mutant resin to affinity purify O-glycoproteins, as well as the impact of sample concentration on this ability, different quantities and concentrations of asialylated etanercept were added to the resin. An individual column (containing 50 µl of double mutant resin) had a capacity of binding around 150 µg O-glycoprotein, i.e. 3 mg O-glycoprotein/mL resin). FIG. 13 shows a representative gel.

2.2.5 the Binding of O-glycoproteins to Double-Mutant is not Significantly Affected by Ionic Strength or Buffer Volume/Type, and Works Over a Broad pH Range Sample proteins were allowed to bind to double-mutant resin for 2 hours at room temperature with end-over-end rotation under a range of different conditions to test the effect of ionic strength, buffer volume/type and pH on the binding ability of the resin. In each case, the resin was then washed three times with its respective binding buffer (350 µl) and then eluted with the addition of 8 M Urea (50 µl, 5 min incubation; 2 repeats). All samples were then analysed by SDS-PAGE.

In a first experiment (see FIG. 14A), to investigate the stability of the interaction in buffers with varying ionic strength, the sample consisted of asialylated etanercept, which was incubated with double-mutant-resin in 0-4 M NaCl, as well as performing all washing steps with the respective concentration of NaCl. Addition of NaCl did not significantly affect the binding of asialylated etanercept.

In a second experiment (see FIG. 14B), the sample consisted of asialylated etanercept in a range of different volumes of PBS. Wash steps used PBS. Varying the substrate volume between 100-300 µl did not affect the efficiency significantly.

In a third experiment (see FIGS. 14C and D), the sample consisted of asialylated etanercept and BSA in different buffers (100 mM sodium acetate, 50 mM sodium phosphate and 50 mM Tris) at different pHs (pH 4-9). Wash steps used matching buffers. pH 6-8 was found to work best whereas pH 4 did not work at all and pH 9 slightly less efficiently than pH 8. BSA, which does not contain any O-glycans, did not bind to the resin under any of the binding conditions.

2.2.6 Urea and SDS can Elute Affinity-Bound O-glycoproteins

Figure 15A:
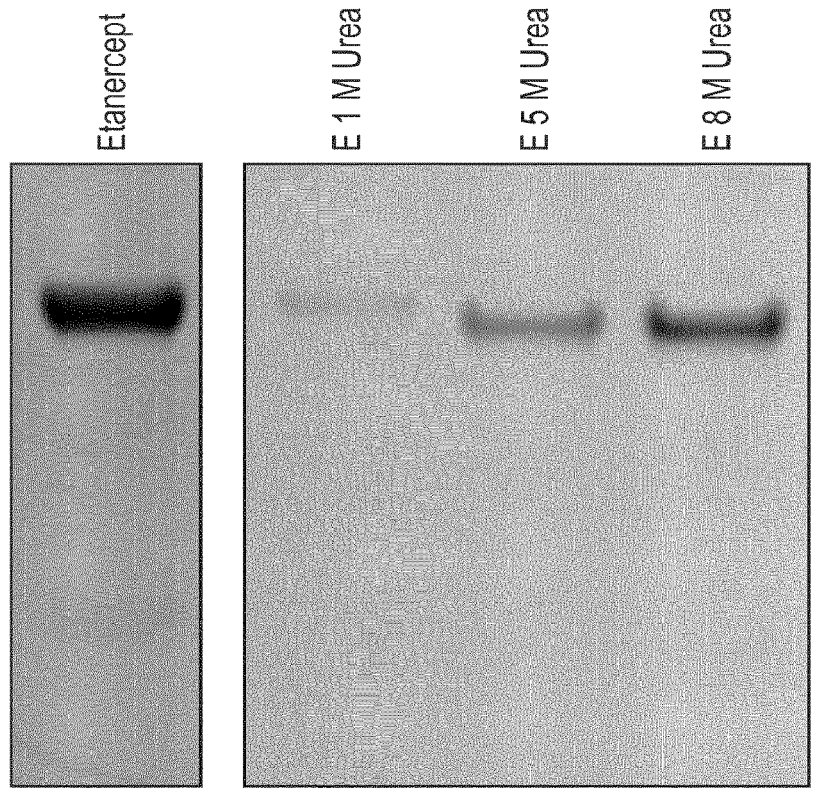
Figure 15B:
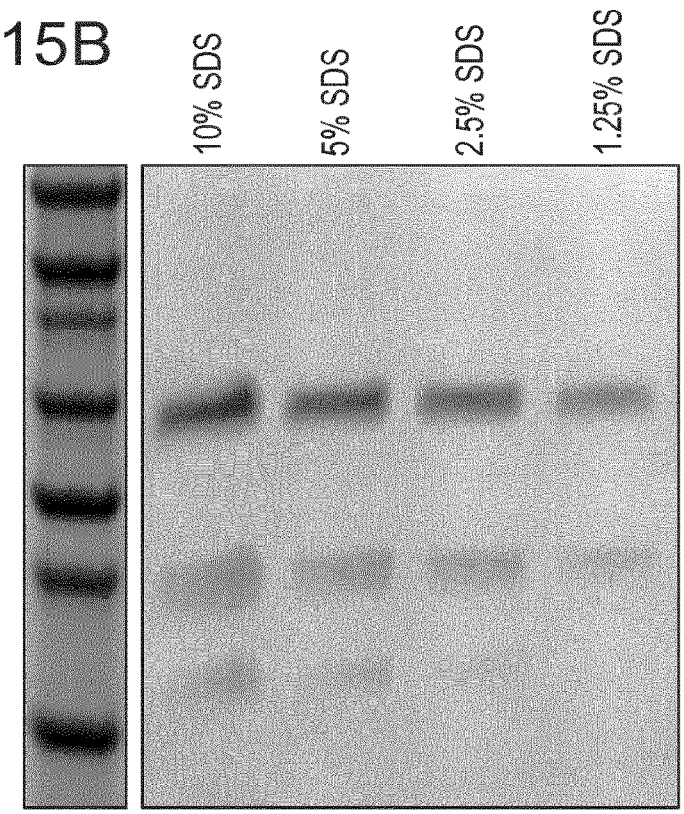

Based on the high affinity between the double mutant and its O-glycoprotein substrate, the inventors investigated different means to elute the bound protein from the resin, not based on ionic strength. Urea had a dose dependent elution, with close to 100% elution with the usage of 8 M Urea (FIG. 15A). High concentrations of SDS (eg 5-10%) also eluted most of the bound protein (FIG. 15B). However, since many downstream applications are sensitive to the presence of detergents, use of high levels Urea is likely to be of more practical utility for non-enzymatic release of bound proteins/peptides.

2.2.7 Wildtype LS can be Used to Elute Double-Mutant-Bound O-glycoproteins

The inventors speculated that the addition of LS to double-mutant-bound proteins may result in a release thereof, and thus not necessitate the addition of urea for elution. Both abatacept and etanercept could be hydrolyzed and eluted from the double-mutant-resin by LS in 6 h but had a slightly more complete elution after 24 h (FIG. 16A). Addition of urea afterwards showed that very little O-glycoprotein remained attached to the affinity matrix, demonstrating that the LS elution strategy was highly efficient.

Etanercept eluted with LS was also subjected to mass spec analysis (LC/MS and MS/MS). Identified peptides (FIG. 16B.1) were consistent with those generated in a LS digestion of etanercept (FIG. 16B.2). Additional MS data from this experiment is shown in the following table:

| Row | OK | Cmpd. | m/z meas. | Mr calc. | z | Δ m/z [ppm] | RMS90 [ppm] |
|---|---|---|---|---|---|---|---|
| 1 | TRUE | 1901 | 392.18578 | 782.3545447 | 2 | 3.139355727 | 39.5628229 |
| 2 | TRUE | 1240 | 460.24964 | 459.2441464 | 1 | -3.873732048 | 6.970140396 |
| 3 | TRUE | 2395 | 593.93513 | 1778.79071 | 3 | -4.012614897 | 37.85883109 |
| 4 | TRUE | 1019 | 598.28693 | 2986.418959 | 5 | -6.916951725 | 23.18052633 |
| 5 | TRUE | 1388 | 642.65448 | 1924.956428 | 3 | -7.685331295 | 12.36799202 |
| 6 | TRUE | 2169 | 672.31437 | 1342.621401 | 2 | -5.364932116 | 7.267732308 |
| 7 | TRUE | 2169 | 672.31437 | 1342.621401 | 2 | -5.364932116 | 7.267732308 |
| 8 | TRUE | 1666 | 695.85597 | 1389.70747 | 2 | -7.245075789 | 13.08730439 |
| 9 | TRUE | 1887 | 745.4213 | 744.4170254 | 1 | -4.027105599 | 40.39538537 |
| 10 | TRUE | 2308 | 846.8813 | 1691.758682 | 2 | -6.278826744 | 10.77131727 |
| 11 | TRUE | 1636 | 878.42107 | 1754.839667 | 2 | -6.875687278 | 9.154478723 |
| 12 | TRUE | 2298 | 895.05953 | 2682.161633 | 3 | -1.814552481 | 8.770132859 |
| 13 | TRUE | 2048 | 898.39499 | 1794.785625 | 2 | -5.675814522 | 10.69492018 |
| 14 | TRUE | 2319 | 924.06736 | 2769.193661 | 3 | -4.837599076 | 9.79089835 |
| 15 | TRUE | 2299 | 1072.96596 | 2143.922906 | 2 | -2.58127791 | 10.42173435 |
| 16 | TRUE | 1315 | 1189.55981 | 2377.120652 | 2 | -6.550738429 | 9.551870744 |
| 17 | TRUE | 1325 | 1189.55981 | 2377.120652 | 2 | -6.550738429 | 9.851027886 |
| 18 | TRUE | 2377 | 1219.18407 | 3654.552682 | 3 | -6.097374291 | 9.225746116 |

| Row | Int. | Scores | Range |
|---|---|---|---|
| 1 | 100030 | 20.3 (D.metascore: 20.3, D.btScore: 4.0, D.fragCov: 50.0, D.intCov: 8.2) | 457-459 |
| 2 | 29654 | 23.0 (D.metascore: 23.0, D.btScore: 0.0, D.fragCov: 12.5, D.intCov: 42.3) | 182-185 |
| 3 | 30476 | 31.2 (D.metascore: 31.2, D.btScore: 127.0, D.fragCov: 40.0, D.intCov: 24.3) | 216-225 |
| 4 | 219206 | 26.5 (D.metascore: 26.5, D.btScore: 265.0, D.fragCov: 33.3, D.intCov: 21.1) | 184-204 |
| 5 | 655550 | 23.9 (D.metascore: 23.9, D.btScore: 136.0, D.fragCov: 46.7, D.intCov: 12.3) | 184-198 |
| 6 | 374698 | 36.2 (D.metascore: 36.2, D.btScore: 61.0, D.fragCov: 33.3, D.intCov: 39.2) | 217-225 |
| 7 | 374698 | 36.2 (D.metascore: 36.2, D.btScore: 61.0, D.fragCov: 33.3, D.intCov: 39.2) | 217-225 |
| 8 | 39488 | 26.9 (D.metascore: 26.9, D.btScore: 12.0, D.fragCov: 35.7, D.intCov: 20.3) | 186-199 |

-continued

| | | | |
|---|---|---|---|
| 9 | 18900 | 66.8 (D.metascore: 66.8, D.btScore: 191.0, D.fragCov: 92.9, D.intCov: 48.1) | 1-7 |
| 10 | 108010 | 22.4 (D.metascore: 22.4, D.btScore: 13.0, D.fragCov: 22.2, D.intCov: 22.5) | 217-225 |
| 11 | 275854 | 29.6 (D.metascore: 29.6, D.btScore: 260.0, D.fragCov: 39.3, D.intCov: 22.3) | 186-199 |
| 12 | 30586 | 24.2 (D.metascore: 24.2, D.btScore: 509.0, D.fragCov: 28.1, D.intCov: 20.8) | 216-231 |
| 13 | 48978 | 35.0 (D.metascore: 35.0, D.btScore: 125.0, D.fragCov: 35.0, D.intCov: 35.0) | 216-225 |
| 14 | 38966 | 23.7 (D.metascore: 23.7, D.btScore: 253.0, D.fragCov: 23.5, D.intCov: 23.8) | 216-232 |
| 15 | 29176 | 20.1 (D.metascore: 20.1, D.btScore: 29.0, D.fragCov: 25.0, D.intCov: 16.2) | 216-225 |
| 16 | 2495538 | 23.1 (D.metascore: 23.1, D.btScore: 535.0, D.fragCov: 59.4, D.intCov: 9.0) | 184-199 |
| 17 | 182236 | 22.9 (D.metascore: 22.9, D.btScore: 4096.0, D.fragCov: 43.8, D.intCov: 12.0) | 184-199 |
| 18 | 360318 | 21.1 (D.metascore: 21.1, D.btScore: 33.0, D.fragCov: 22.2, D.intCov: 20.0) | 208-225 |

| Row | #Cmpds. | P | Sequence | Modifications | Protein |
|---|---|---|---|---|---|
| 1 | 1 | 0 | Y.TQK.S (SEQ ID NO: 67) | Acetyl: 1; Hex(1)HexNAc(1): 1 | Etanercept |
| 2 | 1 | 1 | T.SPTR.S (SEQ ID NO: 68) | | Etanercept |
| 3 | 5 | 2 | P.STSFLLPMGP.S (SEQ ID NO: 69) | Hex(1)HexNAc(1): 1, 2 | Etanercept |
| 4 | 13 | 4 | P.TRSMAPGAVHLP QPVSTRSQH.T (SEQ ID NO: 70) | Hex(1)HexNAc(1): 16, 17 | Etanercept |
| 5 | 6 | 1 | P.TRSMAPGAVHLPQPV.S (SEQ ID NO: 71) | Hex(1)HexNAc(1): 3 | Etanercept |
| 6 | 4 | 1 | S.TSFLLPMGP.S (SEQ ID NO: 72) | Oxidation: 7; Hex(1)HexNAc(1): 2 | Etanercept |
| 7 | 4 | 1 | S.TSFLLPMGP.S (SEQ ID NO: 72) | Oxidation: 7; Hex(1)HexNAc(1): 1 | Etanercept |

-continued

| | | | | | |
|---|---|---|---|---|---|
| 8 | 2 | 1 | R.SMAPGAVHLPQPVS.T (SEQ ID NO: 73) | | Etanercept |
| 9 | 5 | 0 | -LPAQVAF.T (SEQ ID NO: 74) | | Etanercept |
| 10 | 2 | 1 | S.TSFLLPMGP.S (SEQ ID NO: 72) | Hex(1)HexNAc(1): 1, 2 | Etanercept |
| 11 | 5 | 1 | R.SMAPGAVHLPQPVS.T (SEQ ID NO: 73) | Hex(1)HexNAc(1): 14 | Etanercept |
| 12 | 2 | 3 | P.STSFLLPMGPSPPAEG.S (SEQ ID NO: 75) | Hex(1)HexNAc(1): 1, 2, 3 | Etanercept |
| 13 | 10 | 2 | P.STSFLLPMGP.S (SEQ ID NO: 69) | Oxidation: 8; Hex(1)HexNAc(1): 1, 2 | Etanercept |
| 14 | 3 | 4 | P.STSFLLPMGPSPPAEGS.T (SEQ ID NO: 76) | Hex(1)HexNAc(1): 1, 2, 3 | Etanercept |
| 15 | 5 | 2 | P.STSFLLPMGP.S (SEQ ID NO: 69) | Hex(1)HexNAc(1): 1, 2, 3 | Etanercept |
| 16 | 19 | 2 | P.TRSMAPGAVHLPQPVS.T (SEQ ID NO: 77) | Hex(1)HexNAc(1): 3, 16 | Etanercept |
| 17 | 19 | 2 | P.TRSMAPGAVHLPQPVS.T (SEQ ID NO: 77) | Hex(1)HexNAc(1): 1, 3 | Etanercept |
| 18 | 8 | 5 | P.TPEPSTAPSTSFLLPMGP.S (SEQ ID NO: 78) | Hex(1)HexNAc(1): 15, 6, 9, 10, 11 | Etanercept |

2.2.8 Double Mutant can be Used to Affinity-Purify O-glycoproteins from Complex Samples As a proof of concept that the system can function as a general affinity matrix for O-glycosylated proteins, not only in simplified systems but in complex media, the inventors investigated the ability of the double-mutant to purify O-glycoproteins from human serum. Human serum mainly consists of non-glycosylated (BSA) and N-glycosylated (IgG) proteins, with only a small fraction of the total serum proteome being O-glycosylated.

Figure 17C:
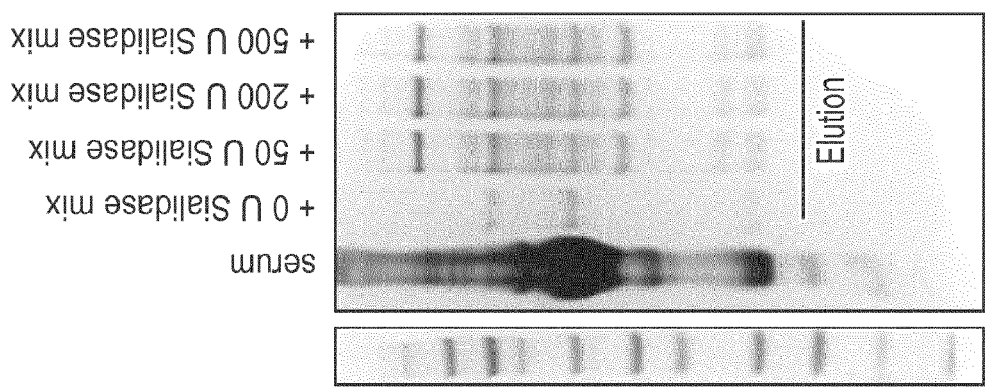
Figure 17B:
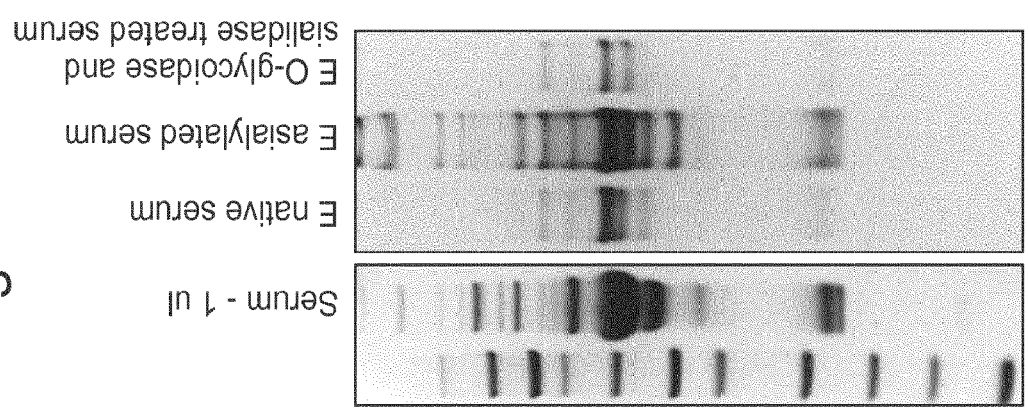
Figure 17A:
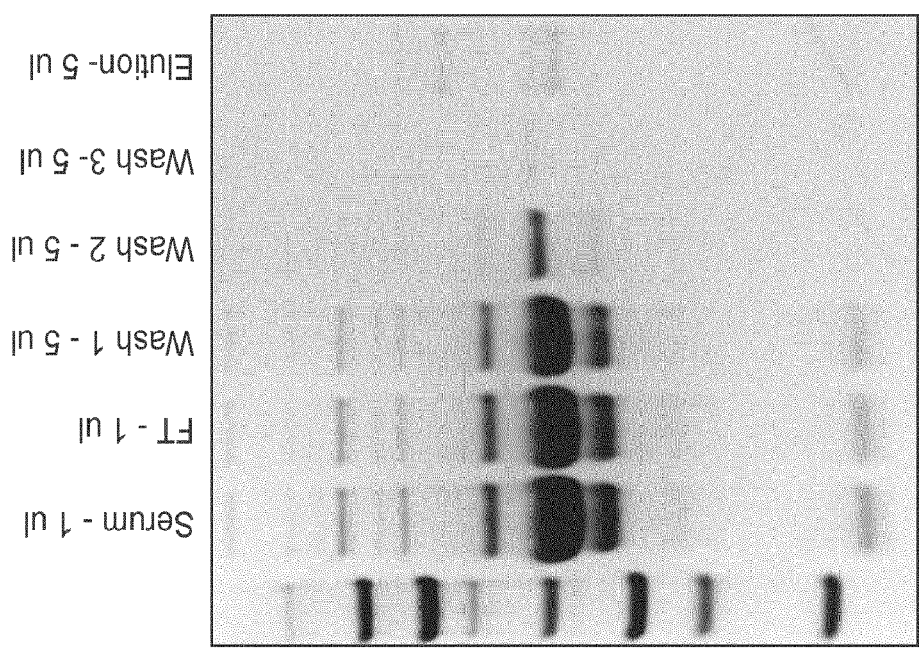

Applying 20 µl sialidase treated serum (ca 1.2 mg protein) to a 50 µl immobilized double-mutant resin column allowed the removal of almost all of the non-glycosylated and N-glycosylated proteins, while eluting a few selected proteins (FIG. 17A). By adding higher quantities of serum (e.g. 2.5 mg protein) with or without pre-treatment of sialidases and O-glycosidases it was demonstrated that the interaction is dependent on O-glycans and removal of terminal sialic acids (FIG. 17B). Further, it was concluded that pre-treatment with sialidases significantly increased the amount of bound O-glycoproteins as compared to non-sialidase-treated samples. Addition of 50 U sialidase mix (Am0707:Am1757) was sufficient to improve the amount of affinity purified O-glycoproteins (FIG. 17C).

Figure 18A:
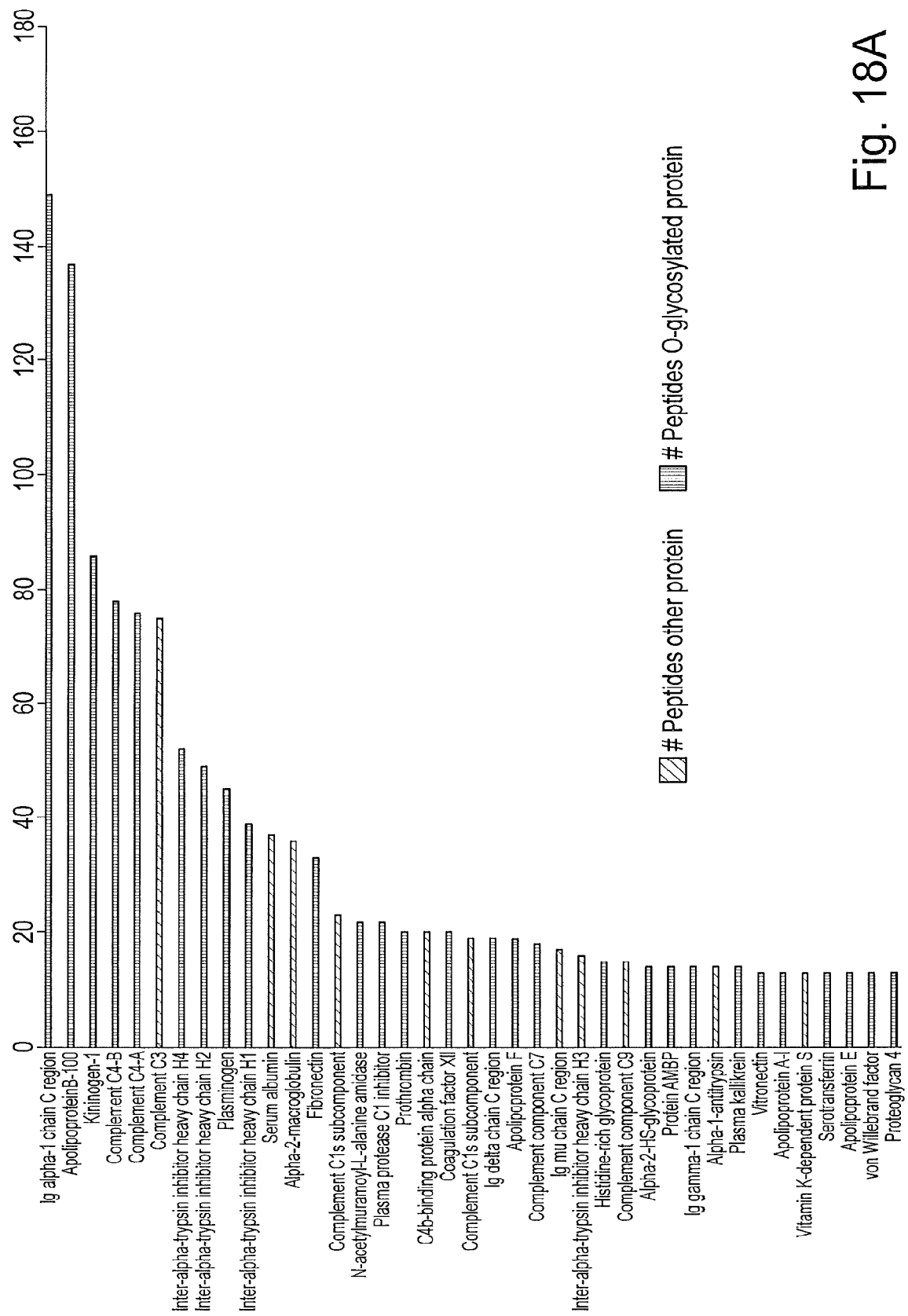

By analysis in mass spectrometry the vast majority of the affinity purified serum proteins can be annotated as O-glycosylated proteins (see FIG. 18A, and the names in bold-itallics in the following table). The number of identified O-glycoprotein peptides in relation to non-O-glycoprotein peptides could be affected by different stringencies in the washing steps, both in terms of total number of identified peptides (FIG. 18B) as well as on the ratio O-glycoprotein peptides vs non-O-glycoprotein peptides (FIG. 18C). Thus it is clear that the affinity resin is highly efficient in its ability to specifically and selectively affinity purify and enrich O-glycoproteins. Additional MS data from this experiment is shown in the following table.

| Row | OK | Protein | MW [kDa] |
|---|---|---|---|
| 1 | TRUE | Ig alpha-1 chain C region OS = Homo sapiens GN = IGHA1 PE = 1 SV = 2 | 37.6 |
| 2 | TRUE | Apolipoprotein B-100 OS = Homo sapiens GN = APOB PE = 1 SV = 2 | 515.3 |
| 3 | TRUE | Kininogen-1 OS = Homo sapiens GN = KNG1 PE = 1 SV = 2 | 71.9 |
| 4 | TRUE | Complement C4-B OS = Homo sapiens GN = C4B PE = 1 SV = 2 | 192.6 |
| 5 | TRUE | Complement C4-A OS = Homo sapiens GN = C4A PE = 1 SV = 2 | 192.7 |
| 6 | TRUE | Complement C3 OS = Homo sapiens GN = C3 PE = 1 SV = 2 | 187 |
| 7 | TRUE | Inter-alpha-trypsin inhibitor heavy chain H4 OS = Homo sapiens GN = ITIH4 PE = 1 SV = 4 | |
| 8 | TRUE | Inter-alpha-trypsin inhibitor heavy chain H2 OS = Homo sapiens GN = ITIH2 PE = 1 SV = 2 | 106.4 |
| 9 | TRUE | Plasminogen OS = Homo sapiens GN = PLG PE = 1 SV = 2 | 90.5 |
| 10 | TRUE | Inter-alpha-trypsin inhibitor heavy chain H1 OS = Homo sapiens GN = ITIH1 PE = 1 SV = 3 | 101.3 |
| 11 | TRUE | *Serum albumin* OS = Homo sapiens GN = ALB PE = 1 SV = 2 | 69.3 |
| 12 | TRUE | Alpha-2-macroglobulin OS = Homo sapiens GN = A2M PE = 1 SV = 3 | 163.2 |

-continued

| | | | |
|---|---|---|---|
| 13 | TRUE | Fibronectin OS = *Homo sapiens* GN = FN1 PE = 1 SV = 4 | 262.5 |
| 14 | TRUE | Complement C1s subcomponent OS = *Homo sapiens* GN = C1S PE = 1 SV = 1 | 76.6 |
| 15 | TRUE | N-acetylmuramoyl-L-alanine amidase OS = *Homo sapiens* GN = PGLYRP2 PE = 1 SV = 1 | 62.2 |
| 16 | TRUE | Plasma protease C1 inhibitor OS = *Homo sapiens* GN = SERPING1 PE = 1 SV = 2 | 55.1 |
| 17 | TRUE | Prothrombin OS = *Homo sapiens* GN = F2 PE = 1 SV = 2 | 70 |
| 18 | TRUE | C4b-binding protein alpha chain OS = *Homo sapiens* GN = C4BPA PE = 1 SV = 2 | 67 |
| 19 | TRUE | Coagulation factor XII OS = *Homo sapiens* GN = F12 PE = 1 SV = 3 | 67.7 |
| 20 | TRUE | Complement C1r subcomponent OS = *Homo sapiens* GN = C1R PE = 1 SV = 2 | 80.1 |
| 21 | TRUE | Ig delta chain C region OS = *Homo sapiens* GN = IGHD PE = 1 SV = 2 | 42.2 |
| 22 | TRUE | Apolipoprotein F OS = *Homo sapiens* GN = APOF PE = 1 SV = 2 | 35.4 |
| 23 | TRUE | Complement component C7 OS = *Homo sapiens* GN = C7 PE = 1 SV = 2 | 93.5 |
| 24 | TRUE | Ig mu chain C region OS = *Homo sapiens* GN = IGHM PE = 1 SV = 3 | 49.3 |
| 25 | TRUE | Inter-alpha-trypsin inhibitor heavy chain H3 OS = *Homo sapiens* GN = ITIH3 PE = 1 SV = 2 | 99.8 |
| 26 | TRUE | Histidine-rich glycoprotein OS = *Homo sapiens* GN = HRG PE = 1 SV = 1 | 59.5 |
| 27 | TRUE | Complement component C9 OS = *Homo sapiens* GN = C9 PE = 1 SV = 2 | 63.1 |
| 28 | TRUE | Alpha-2-HS-glycoprotein OS = *Homo sapiens* GN = AHSG PE = 1 SV = 1 | 39.3 |
| 29 | TRUE | Protein AMBP OS = *Homo sapiens* GN = AMBP PE = 1 SV = 1 | 39 |
| 30 | TRUE | Ig gamma-1 chain C region OS = *Homo sapiens* GN = IGHG1 PE = 1 SV = 1 | 36.1 |
| 31 | TRUE | Alpha-1-antitrypsin OS = *Homo sapiens* GN = SERPINA1 PE = 1 SV = 3 | 46.7 |
| 32 | TRUE | Plasma kallikrein OS = *Homo sapiens* GN = KLKB1 PE = 1 SV = 1 | 71.3 |
| 33 | TRUE | Vitronectin OS = *Homo sapiens* GN = VTN PE = 1 SV = 1 | 54.3 |
| 34 | TRUE | Apolipoprotein A-1 OS = *Homo sapiens* GN = APOA1 PE = 1 SV = 1 | 30.8 |
| 35 | TRUE | Vitamin K-dependent protein S OS = *Homo sapiens* GN = PROS1 PE = 1 SV = 1 | 75.1 |
| 36 | TRUE | Serotransferrin OS = *Homo sapiens* GN = TF PE = 1 SV = 3 | 77 |
| 37 | TRUE | Apolipoprotein E OS = *Homo sapiens* GN = APOE PE = 1 SV = 1 | 36.1 |
| 38 | TRUE | von Willebrand factor OS = *Homo sapiens* GN = VWF PE = 1 SV = 4 | 309.1 |
| 39 | TRUE | Proteoglycan 4 OS = *Homo sapiens* GN = PRG4 PE = 1 SV = 2 | 151 |

| Row | pI | #Peptides | SC [%] | Scores | RMS90 [ppm] |
|---|---|---|---|---|---|
| 1 | 6.1 | 149 | 75.1 | 1239.4 (M.expect: 0.0, M.score: 1239.4, M.siglimit: 38.0) | 5.46 |
| 2 | 6.6 | 137 | 41.2 | 7043.5 (M.expect: 0.0, M.score: 7043.5, M.siglimit: 38.0) | 6.02 |
| 3 | 6.3 | 86 | 45.7 | 1638.5 (M.expect: 0.0, M.score: 1638.5, M.siglimit: 38.0) | 5.49 |
| 4 | 6.9 | 78 | 63.3 | 4951.3 (M.expect: 0.0, M.score: 4951.3, M.siglimit: 38.0) | 6.46 |
| 5 | 6.7 | 76 | 61.3 | 4468.7 (M.expect: 0.0, M.score: 4468.7, M.siglimit: 38.0) | 6.12 |
| 6 | 6 | 75 | 64.1 | 4596.8 (M.expect: 0.0, M.score: 4596.8, M.siglimit: 38.0) | 6.13 |
| 7 | 6.5 | 52 | 56.9 | 2389.7 (M.expect: 0.0, M.score: 2389.7, M.siglimit: 38.0) | 6.29 |
| 8 | 6.4 | 49 | 50.4 | 2175.2 (M.expect: 0.0, M.score: 2175.2, M.siglimit: 38.0) | 7.02 |
| 9 | 7 | 45 | 67.3 | 2752.5 (M.expect: 0.0, M.score: 2752.5, M.siglimit: 38.0) | 5.54 |
| 10 | 6.3 | 39 | 43.8 | 1838.3 (M.expect: 0.0, M.score: 1838.3, M.siglimit: 38.0) | 5.16 |
| 11 | 5.9 | 37 | 63.7 | 2350.1 (M.expect: 0.0, M.score: 2350.1, M.siglimit: 38.0) | 5.59 |
| 12 | 6 | 36 | 38.1 | 1970.3 (M.expect: 0.0, M.score: 1970.3, M.siglimit: 38.0) | 5.67 |
| 13 | 5.5 | 33 | 25.3 | 1632.8 (M.expect: 0.0, M.score: 1632.8, M.siglimit: 38.0) | 5.58 |
| 14 | 4.8 | 23 | 46.1 | 1454.6 (M.expect: 0.0, M.score: 1454.6, M.siglimit: 38.0) | 6.01 |
| 15 | 7.3 | 22 | 56.4 | 1288.8 (M.expect: 0.0, M.score: 1288.8, M.siglimit: 38.0) | 5.72 |
| 16 | 6.1 | 22 | 46.2 | 1166.8 (M.expect: 0.0, M.score: 1166.8, M.siglimit: 38.0) | 6.15 |
| 17 | 5.6 | 20 | 43.4 | 1158.1 (M.expect: 0.0, M.score: 1158.1, M.siglimit: 38.0) | 6.13 |
| 18 | 7.2 | 20 | 51.4 | 1111.9 (M.expect: 0.0, M.score: 1111.9, M.siglimit: 38.0) | 5.13 |
| 19 | 8 | 20 | 39.7 | 691.9 (M.expect: 0.0, M.score: 691.9, M.siglimit: 38.0) | 5.03 |
| 20 | 5.8 | 19 | 39.6 | 1097.7 (M.expect: 0.0, M.score: 1097.7, M.siglimit: 38.0) | 6.07 |
| 21 | 8.1 | 19 | 46.9 | 687.5 (M.expect: 0.0, M.score: 687.5, M.siglimit: 38.0) | 4.87 |
| 22 | 5.4 | 19 | 43.3 | 344.0 (M.expect: 0.0, M.score: 344.0, M.siglimit: 38.0) | 7.71 |
| 23 | 6.1 | 18 | 38.3 | 1100.7 (M.expect: 0.0, M.score: 1100.7, M.siglimit: 38.0) | 5.73 |
| 24 | 6.3 | 17 | 50.9 | 1159.0 (M.expect: 0.0, M.score: 1159.0, M.siglimit: 38.0) | 5.25 |
| 25 | 5.5 | 16 | 28.3 | 747.2 (M.expect: 0.0, M.score: 747.2, M.siglimit: 38.0) | 5.8 |
| 26 | 7.1 | 15 | 35.4 | 964.5 (M.expect: 0.0, M.score: 964.5, M.siglimit: 38.0) | 5.33 |
| 27 | 5.4 | 15 | 34.3 | 876.5 (M.expect: 0.0, M.score: 876.5, M.siglimit: 38.0) | 5.86 |
| 28 | 5.4 | 14 | 46 | 941.9 (M.expect: 0.0, M.score: 941.9, M.siglimit: 38.0) | 5.78 |
| 29 | 5.9 | 14 | 55.4 | 886.3 (M.expect: 0.0, M.score: 886.3, M.siglimit: 38.0) | 6.06 |
| 30 | 8.5 | 14 | 60.3 | 825.9 (M.expect: 0.0, M.score: 825.9, M.siglimit: 38.0) | 6.04 |
| 31 | 5.4 | 14 | 39 | 740.9 (M.expect: 0.0, M.score: 740.9, M.siglimit: 38.0) | 6.02 |
| 32 | 8.6 | 14 | 26 | 647.7 (M.expect: 0.0, M.score: 647.7, M.siglimit: 38.0) | 5.62 |
| 33 | 5.6 | 13 | 37 | 752.2 (M.expect: 0.0, M.score: 752.2, M.siglimit: 38.0) | 5.1 |
| 34 | 5.6 | 13 | 46.8 | 723.0 (M.expect: 0.0, M.score: 723.0, M.siglimit: 38.0) | 5.57 |
| 35 | 5.5 | 13 | 27.7 | 676.0 (M.expect: 0.0, M.score: 676.0, M.siglimit: 38.0) | 6.18 |
| 36 | 6.8 | 13 | 22.9 | 544.9 (M.expect: 0.0, M.score: 544.9, M.siglimit: 38.0) | 6.02 |
| 37 | 5.6 | 13 | 45.1 | 535.3 (M.expect: 0.0, M.score: 535.3, M.siglimit: 38.0) | 5.73 |
| 38 | 5.3 | 13 | 6.3 | 505.5 (M.expect: 0.0, M.score: 505.5, M.siglimit: 38.0) | 5.52 |
| 39 | 9.5 | 13 | 5.6 | 214.2 (M.expect: 0.0, M.score: 214.2, M.siglimit: 38.0) | 4.7 |

2.2.9 Immobilized Double-Mutant also Binds to Shorter O-glycopeptides

A series of experiments was performed to demonstrate the specificity of the LS double mutant also for O-glycopeptides. In the first experiment, a mix of an O-glycosylated peptide (glycodrosocin (GD)=GKPRPYSPRPTSHPRPIRV (SEQ ID NO: 47) with a core 1 O-glycan on the threonine) and several non-glycosylated peptides (H2686, H4062 H8390 and insulin oxidized beta chain (IOB)) was incubated with LS double mutant resin. (H2686=YIYGSFK (SEQ ID

NO: 48), H4062=KKLVFFA (SEQ ID NO: 49), H8390=FLPLILGKLVKGLL (SEQ ID NO: 50)).

Figure 19A:
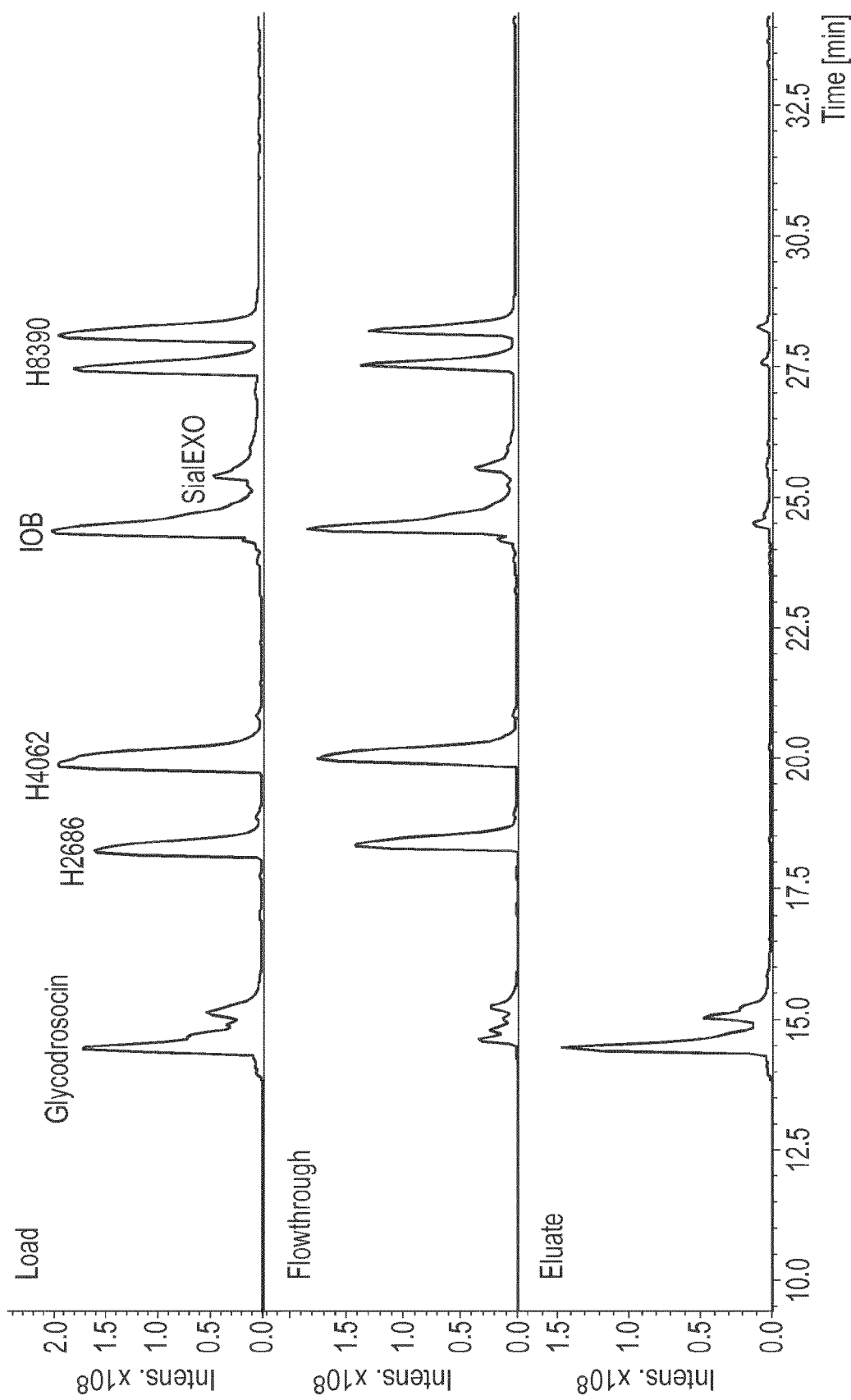
Figure 19B:
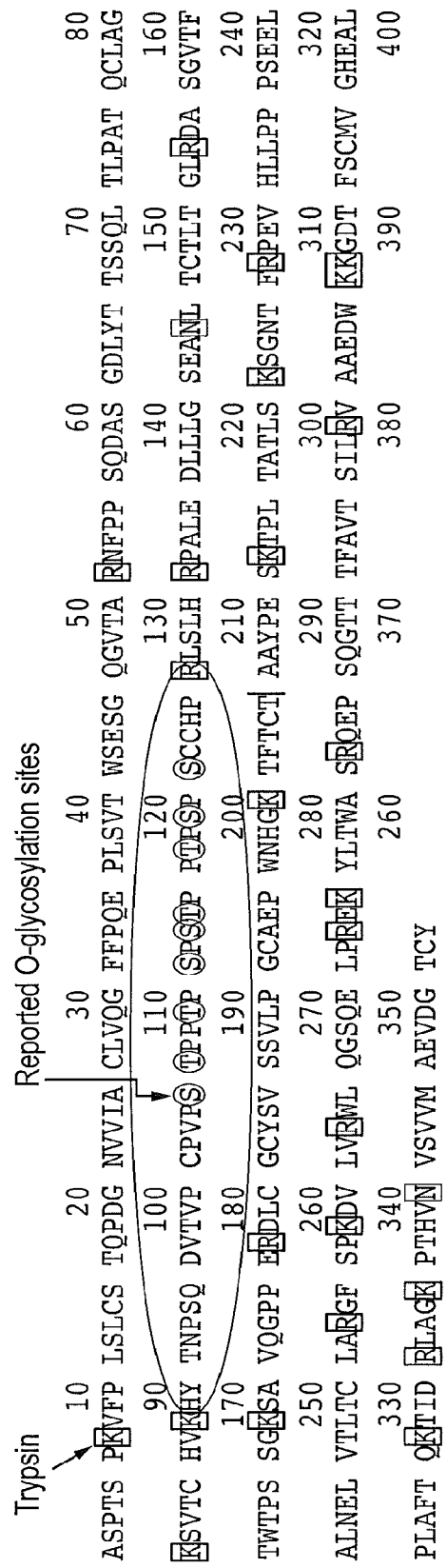

The peptide mix was allowed to bind to 50 µl immobilized double-mutant resin for 2 hours at room temperature with end-over-end rotation. The resin was washed five times with binding buffer (300 µl) and then eluted with the addition of 8 M Urea. The peptides in load, flow through and eluate were analyzed with LC/MS. Separation was performed on a RP-LC C18 column (Advance BioPeptide Map 2.1×100 2.7 µm from Agilent) and detected with ESI-Q-TOF Bruker Impact II. The results are shown in FIG. 19A. Glycodrosocin, the only peptide in the mix containing an O-GalNAc-Gal, was predominantly found in the eluted fraction and the non-glycosylated peptides in the flow-through fraction In the second experiment, it was investigated whether the LS double-mutant could enrich O-glycosylated peptides from a tryptic protein digest (e.g a different type of peptide mix). IgA was chosen as the target for digest. Based on the trypsin sites and reported O-glycosylation sites in IgA, a trypsin digest should result in only a single O-glycosylated peptide corresponding to positions 89-126 of IgA (see schematic diagram in FIG. 19B). To create the tryptic digest, IgA was mixed with urea to 6M and DTT to 5 mM followed by incubation at 37° C. for 1 h. IAM was added to 15 mM followed by incubation at room temperature for 30 min in the dark. The sample was then buffer exchanged to 50 mM Tris, pH 8.0 on Zeba spin 7000 K column. Trypsin was then added at 1:20 followed by incubation at 37° C. overnight. Trypsin inhibitor 1 mg/mg was added followed by incubation at room temperature for 20 min. Sialidase mix and NaCl were added to the resulting tryptic digest. The mix was allowed to bind to the resin for 2 h at room temperature with end-over-end rotation. The resin was washed ten times with PBS buffer (300 µl) and then eluted with the addition of 8 M Urea (50 µl, 2 min, 2 repeats).

Peptides of the load, flowthrough and eluate were separated and analysed using RP-LC MSMS on a C18 column (Advance BioPeptide Plus 2.1×150 mm 2.7 µm from Agilent Technologies) in a 0.1% FA in MQ: 0.1% FA in 95% ACN gradient at 45° C. and a flow of 0.2 ml/min. Detection was on an ESI-Q-TOF Bruker Impact II instrument. The results are shown in FIG. 19C. O-glycosylated peptide 89-126 were significantly enriched in the eluate and the specific O-glycopeptide 89-126 was identified with intact mass.

2.2.10 Immobilized Double-Mutant Compares Favorably to Other O-glycoprotein Binding Matrixes The inventors evaluated the ability of the double-mutant to affinity purify O-glycoprotein as compared to other commercially available O-glycoprotein binding matrices, specifically the lectins Peanut agglutinin (PNA), and *Vicia villosa* lectin (VVA). Etanercept and asialylated etanercept were used as model substrates.

Figure 20A:
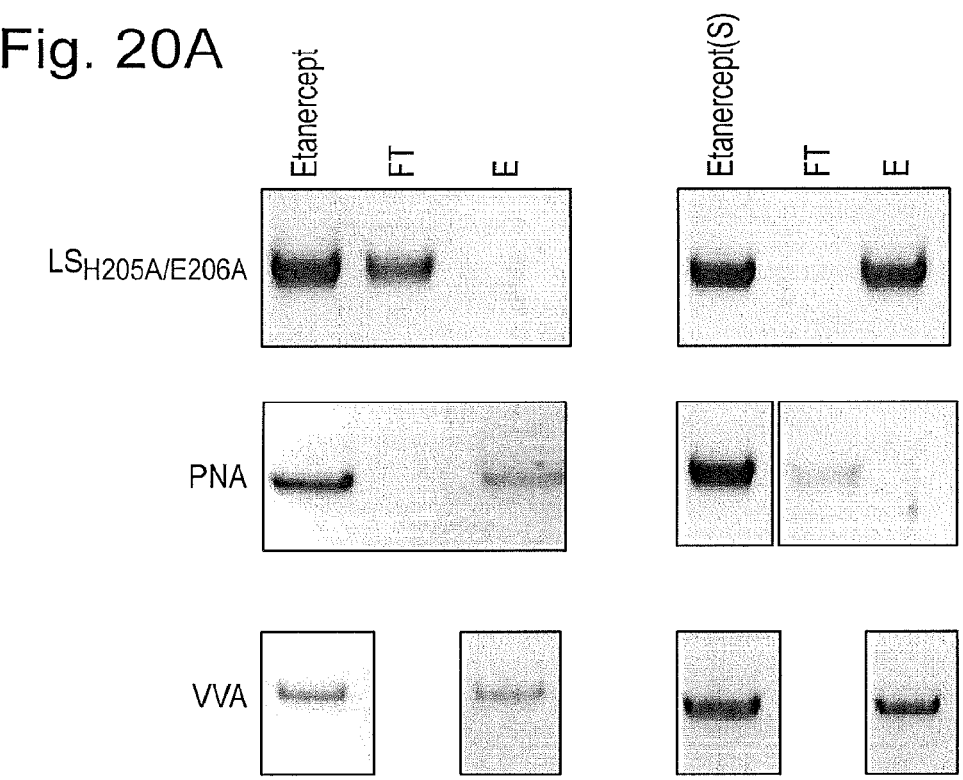
Figure 20B:
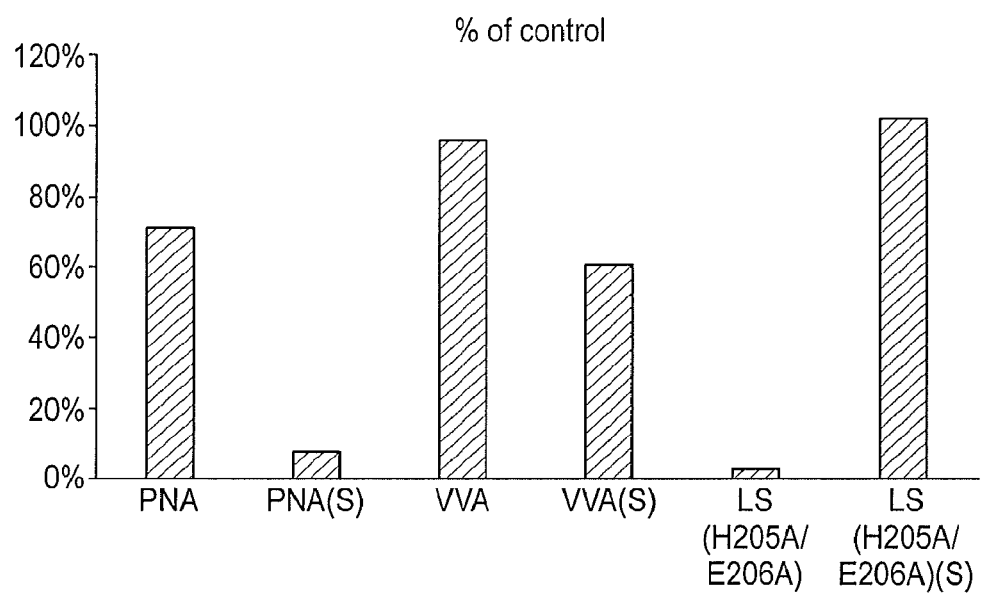

50 µg substrate was added in PBS (PNA and LS double mutant) or lectin binding buffer (VVA) to 50 µl volume of different immobilized lectin or LS double-mutant resins pre-equilibrated in the respective buffers (total 100 µl). (Lectin binding buffer is 20 mM Tris-HCl pH 7.4, 150 mM NaCl, 1 mM each of MgCl2, CaCl2, ZnCl2, and MnCl2). The substrate was allowed to interact with the resins with end-over-end-mixture for 2 h at room temperature. Non-bound proteins were washed away (100 g, 1 min; 3×) with PBS or lectin binding buffer, respectively. The resins were dried by centrifugation (1000 g, 1 min). Bound proteins were eluted with the addition of 8 M urea (for PNA and LS double mutant resins) or VVA elution buffer according to manufacturer (for VVA resin) (50 µl, 5 min treatment before centrifugation 1000 g 1 min; 2×) and both flow through (FT) and eluate (E) were analyzed on SDS-PAGE. 1.5 µg substrate was added to each gel (e.g. 3 µl) as a positive control and a densitometric analysis was performed to evaluate the efficiency of the resins, relative to the 1.5 µg loaded substrate which has assumed 100% efficiency. Representative gels for etanercept and asialylated etanercept (Etanercept S) are shown in FIG. 20A. The results of the densitometric analysis are shown in FIG. 20B. LSH205A/E206A double mutant performs at least as well as the best performing commercial lectin for efficiency of purification of asialylated substrate.

```
Sequences
                                                                    SEQ ID NO: 1
EVTVPDALKDRIALKKTARQLNIVYFLGSDTEPVPDYERRLSELLLYLQQFYGKEMQRHGYGARSFGLDIKSP

GRVNIIEYKAKNPAAHYPYENGGGWKAAQELDEFFKAHPDRKKSQHTLIIMPTWNDEKNGPDNPGGVPFYGMG

RNCFALDYPAFDIKHLGQKTREGRLLTKWYGGMAHELGHGLNLPHNHQTASDGKKYGTALMGSGNYTFGTSPT

FLTPASCALLDACEVFSVTPSQQFYEGKPEVEVGDVAISFKGDQILVSGNYKSPQTVKALNVYIQDPPYAVNQ

DYDAVSFSRRLGKKSGKFSMKIDKKELEGLNNNEFRISLMFILANGLHMQKHFTFHWDALQDYRDGSKS

SEQ ID NO: 2
MEVTVPDALKDRIALKKTARQLNIVYFLGSDTEPVPDYERRLSELLLYLQQFYGKEMQRHGYGARSFGLDIKS

PGRVNIIEYKAKNPAAHYPYENGGGWKAAQELDEFFKAHPDRKKSQHTLIIMPTWNDEKNGPDNPGGVPFYGM

GRNCFALDYPAFDIKHLGQKTREGRLLTKWYGGMAHELGHGLNLPHNHQTASDGKKYGTALMGSGNYTFGTSP

TFLTPASCALLDACEVFSVTPSQQFYEGKPEVEVGDVAISFKGDQILVSGNYKSPQTVKALNVYIQDPPYAVN

QDYDAVSFSRRLGKKSGKFSMKIDKKELEGLNNNEFRISLMFILANGLHMQKHFTFHWDALQDYRDGSKSGSG

HHHHHH

SEQ ID NO: 3
ATGGAAGTCACTGTGCCGGACGCCCTGAAAGATCGCATCGCGCTGAAGAAAACCGCTCGTCAGCTGAATATCG

TCTACTTCCTGGGTTCTGATACCGAACCGGTTCCGGACTACGAGCGCCGTCTGAGCGAGCTGCTGTTGTATCT

GCAGCAATTCTATGGTAAAGAAATGCAGCGCCATGGCTATGGCGCACGCAGCTTTGGTCTGGACATTAAGTCA
```

-continued

```
CCGGGTCGTGTGAACATTATCGAGTACAAAGCGAAGAACCCGGCAGCGCATTACCCGTATGAGAATGGTGGCG

GCTGGAAAGCTGCACAAGAACTGGACGAATTTTTCAAGGCCCATCCAGACCGCAAGAAAAGCCAGCACACCCT

GATCATCATGCCTACCTGGAATGATGAGAAAAATGGTCCTGACAATCCGGGTGGCGTTCCGTTCTATGGTATG

GGTCGTAATTGTTTTGCGTTGGACTACCCGGCGTTTGATATCAAGCACCTGGGTCAGAAAACGCGTGAGGGTC

GTCTGCTGACGAAATGGTACGGTGGCATGGCGCACGAACTGGGCCACGGCCTGAATCTGCCGCACAATCACCA

GACCGCGAGCGATGGCAAGAAATATGGCACCGCCCTGATGGGTAGCGGCAACTACACGTTCGGTACCAGCCCG

ACGTTCCTGACCCCGGCGAGCTGTGCGCTGCTGGATGCCTGCGAAGTGTTCAGCGTTACCCCGAGCCAACAGT

TTTATGAGGGTAAGCCAGAAGTCGAGGTTGGTGATGTTGCAATTTCCTTCAAGGGTGATCAAATCTTGGTCAG

CGGTAACTACAAGAGCCCGCAAACCGTGAAAGCTCTGAACGTTTACATTCAGGATCCGCCGTACGCCGTGAAC

CAAGACTACGATGCAGTGAGCTTTAGCCGTCGTCTGGGCAAAAAGTCCGGTAAGTTTAGCATGAAGATTGACA

AAAAAGAACTGGAAGGCCTGAATAACAACGAATTCCGTATTTCCTTGATGTTCATTCTGGCAAACGGCTTACA

CATGCAGAAGCACTTTACGTTTCACTGGGATGCGCTGCAAGACTACCGTGACGGTAGCAAATCTGGTTCGGGT

CATCATCACCACCATCACTGA
```

SEQ ID NO: 4

MLKRLLSAFFSLFFLGAASGTSFAEVTVPDALKDRIALKKTARQLNIVYFLGSDTEPVPDYERRLSELLLYLQ

QFYGKEMQRHGYGARSFGLDIKSPGRVNIIEYKAKNPAAHYPYENGGGWKAAQELDEFFKAHPDRKKSQHTLI

IMPTWNDEKNGPDNPGGVPFYGMGRNCFALDYPAFDIKHLGQKTREGRLLTKWYGGMAHELGHGLNLPHNHQT

ASDGKKYGTALMGSGNYTFGTSPTFLTPASCALLDACEVFSVTPSQQFYEGKPEVEVGDVAISFKGDQILVSG

NYKSPQTVKALNVYIQDPPYAVNQDYDAVSFSRRLGKKSGKFSMKIDKKELEGLNNNEFRISLMFILANGLHM

QKHFTFHWDALQDYRDGSKS (signal sequence underlined)

SEQ ID NO: 5

EVTVPDALKDRIALKKTARQLNIVYFLGSDTEPVPDYERRLSELLLYLQQFYGKEMQRHGYGARSFGLDIKSP

GRVNIIEYKAKNPAAHYPYENGGGWKAAQELDEFFKAHPDRKKSQHTLIIMPTWNDEKNGPDNPGGVPFYGMG

RNCFALDYPAFDIKHLGQKTREGRLLTKWYGGMAHALGHGLNLPHNHQTASDGKKYGTALMGSGNYTFGTSPT

FLTPASCALLDACEVFSVTPSQQFYEGKPEVEVGDVAISFKGDQILVSGNYKSPQTVKALNVYIQDPPYAVNQ

DYDAVSFSRRLGKKSGKFSMKIDKKELEGLNNNEFRISLMFILANGLHMQKHFTFHWDALQDYRDGSKS

SEQ ID NO: 6

MEVTVPDALKDRIALKKTARQLNIVYFLGSDTEPVPDYERRLSELLLYLQQFYGKEMQRHGYGARSFGLDIKS

PGRVNIIEYKAKNPAAHYPYENGGGWKAAQELDEFFKAHPDRKKSQHTLIIMPTWNDEKNGPDNPGGVPFYGM

GRNCFALDYPAFDIKHLGQKTREGRLLTKWYGGMAHALGHGLNLPHNHQTASDGKKYGTALMGSGNYTFGTSP

TFLTPASCALLDACEVFSVTPSQQFYEGKPEVEVGDVAISFKGDQILVSGNYKSPQTVKALNVYIQDPPYAVN

QDYDAVSFSRRLGKKSGKFSMKIDKKELEGLNNNEFRISLMFILANGLHMQKHFTFHWDALQDYRDGSKSGSG

HHHHHH

SEQ ID NO: 7

```
ATGGAAGTCACTGTGCCGGACGCCCTGAAAGATCGCATCGCGCTGAAGAAAACCGCTCGTCAGCTGAATATCG

TCTACTTCCTGGGTTCTGATACCGAACCGGTTCCGGACTACGAGCGCGTCTGAGCGAGCTGCTGTTGTATCT

GCAGCAATTCTATGGTAAAGAAATGCAGCGCCATGGCTATGGCGCACGCAGCTTTGGTCTGGACATTAAGTCA

CCGGGTCGTGTGAACATTATCGAGTACAAAGCGAAGAACCCGGCAGCGCATTACCCGTATGAGAATGGTGGCG

GCTGGAAAGCTGCACAAGAACTGGACGAATTTTTCAAGGCCCATCCAGACCGCAAGAAAAGCCAGCACACCCT

GATCATCATGCCTACCTGGAATGATGAGAAAAATGGTCCTGACAATCCGGGTGGCGTTCCGTTCTATGGTATG

GGTCGTAATTGTTTTGCGTTGGACTACCCGGCGTTTGATATCAAGCACCTGGGTCAGAAAACGCGTGAGGGTC

GTCTGCTGACGAAATGGTACGGTGGCATGGCGCACGCGCTGGGCCACGGCCTGAATCTGCCGCACAATCACCA

GACCGCGAGCGATGGCAAGAAATATGGCACCGCCCTGATGGGTAGCGGCAACTACACGTTCGGTACCAGCCCG
```

-continued

```
ACGTTCCTGACCCCGGCGAGCTGTGCGCTGCTGGATGCCTGCGAAGTGTTCAGCGTTACCCCGAGCCAACAGT

TTTATGAGGGTAAGCCAGAAGTCGAGGTTGGTGATGTTGCAATTTCCTTCAAGGGTGATCAAATCTTGGTCAG

CGGTAACTACAAGAGCCCGCAAACCGTGAAAGCTCTGAACGTTTACATTCAGGATCCGCCGTACGCCGTGAAC

CAAGACTACGATGCAGTGAGCTTTAGCCGTCGTCTGGGCAAAAAGTCCGGTAAGTTTAGCATGAAGATTGACA

AAAAAGAACTGGAAGGCCTGAATAACAACGAATTCCGTATTTCCTTGATGTTCATTCTGGCAAACGGCTTACA

CATGCAGAAGCACTTTACGTTTCACTGGGATGCGCTGCAAGACTACCGTGACGGTAGCAAATCTGGTTCGGGT

CATCATCACCACCATCACTGA
```

SEQ ID NO: 8

GMAHELGHGL (metalloprotease motif)

SEQ ID NO: 9

MKNLLFALLTGSFCCCYAQQKAAPVPEPEVVATPPADAGRGLIRVDSREIRHYSGTRKEPDYLVSRDNGKTWE
MKAAPAGYPPNYGGIPKESPAIVRNPLTREFIRVQPIGGFVFLSRGGLDGKWLAVTNDGKLEEDWKDPEKRKN
LKKLGGIMRTPVFVNKGRRVIVPFHNMGGGTKFHISDDGGLTWHVSRNGVTSPRHEARPPHQGVRWFNNAVEA
TVLEMKDGTLWALARTSQDQAWQAFSKDYGETWSKPEPSRFFGTLTMNTLGRLDDGTIVSLWTNTMALPENAT
AGNGTWEDVFTNRDSHHIAMSGDEGKTWYGFREIILDEHRNHPGYATLDGPEDRGKHQSEMVQLDKNRILISL
GQHKNHRRLVIVDRRWVGAKTRATQTGKDLDSQWTIHTYIPQKKGHCSYNRKPSAELVQDPSGGTKKVLQIKR
LDDPELVNEKSNVDYRNGGATWNFPNGTTGLVKFRFRVVDGEQADDSGLQVSLTDRLFNACDSTTKDYALFTF
PIRLKPAPHLLLGMKKVPFTPGAWHEISLLWQGGQAVVSLDGKKAGTLKMANKSPNGASYIHFISTGSQPDAG
ILLDTVNARVK (signal sequence underlined)

SEQ ID NO: 10

QQKAAPVPEPEVVATPPADAGRGLIRVDSREIRHYSGTRKEPDYLVSRDNGKTWEMKAAPAGYPPNYGGIPKE
SPAIVRNPLTREFIRVQPIGGFVFLSRGGLDGKWLAVTNDGKLEEDWKDPEKRKNLKKLGGIMRTPVFVNKGR
RVIVPFHNMGGGTKFHISDDGGLTWHVSRNGVTSPRHEARPPHQGVRWFNNAVEATVLEMKDGTLWALARTSQ
DQAWQAFSKDYGETWSKPEPSRFFGTLTMNTLGRLDDGTIVSLWTNTMALPENATAGNGTWEDVFTNRDSHHI
AMSGDEGKTWYGFREIILDEHRNHPGYATLDGPEDRGKHQSEMVQLDKNRILISLGQHKNHRRLVIVDRRWVG
AKTRATQTGKDLDSQWTIHTYIPQKKGHCSYNRKPSAELVQDPSGGTKKVLQIKRLDDPELVNEKSNVDYRNG
GATWNFPNGTTGLVKFRFRVVDGEQADDSGLQVSLTDRLFNACDSTTKDYALFTFPIRLKPAPHLLLGMKKVP
FTPGAWHEISLLWQGGQAVVSLDGKKAGTLKMANKSPNGASYIHFISTGSQPDAGILLDTVNARVK

SEQ ID NO: 11

MQQKAAPVPEPEVVATPPADAGRGLIRVDSREIRHYSGTRKEPDYLVSRDNGKTWEMKAAPAGYPPNYGGIPK
ESPAIVRNPLTREFIRVQPIGGFVFLSRGGLDGKWLAVTNDGKLEEDWKDPEKRKNLKKLGGIMRTPVFVNKG
RRVIVPFHNMGGGTKFHISDDGGLTWHVSRNGVTSPRHEARPPHQGVRWFNNAVEATVLEMKDGTLWALARTS
QDQAWQAFSKDYGETWSKPEPSRFFGTLTMNTLGRLDDGTIVSLWTNTMALPENATAGNGTWEDVFTNRDSHH
IAMSGDEGKTWYGFREIILDEHRNHPGYATLDGPEDRGKHQSEMVQLDKNRILISLGQHKNHRRLVIVDRRWV
GAKTRATQTGKDLDSQWTIHTYIPQKKGHCSYNRKPSAELVQDPSGGTKKVLQIKRLDDPELVNEKSNVDYRN
GGATWNFPNGTTGLVKFRFRVVDGEQADDSGLQVSLTDRLFNACDSTTKDYALFTFPIRLKPAPHLLLGMKKV
PFTPGAWHEISLLWQGGQAVVSLDGKKAGTLKMANKSPNGASYIHFISTGSQPDAGILLDTVNARVKGSGLEH
HHHHH

SEQ ID NO: 12

MTWLLCGRGKWNKVKRMMNSVFKCLMSAVCAVALPAFGQEEKTGFPTDRAVTVFSAGEGNPYASIRIPALLSI
GKGQLLAFAEGRYKNTDQGENDIIMSVSKNGGKTWSRPRAIAKAHGATFNNPCPVYDAKTRTVTVVFQRYPAG
VKERQPNIPDGWDDEKCIRNFMIQSRNGGSSWTKPQEITKTTKRPSGVDIMASGPNAGTQLKSGAHKGRLVIP
MNEGPFGKWVISCIYSDDGGKSWKLGQPTANMKGMVNETSIAETDNGGVVMVARHWGAGNCRRIAWSQDGGET

-continued

WGQVEDAPELFCDSTQNSLMTYSLSDQPAYGGKSRILFSGPSAGRRIKGQVAMSYDNGKTWPVKKLLGEGGFA
YSSLAMVEPGIVGVLYEENQEHIKKLKFVPITMEWLTDGEDTGLAPGKKAPVLK (signal sequence
underlined)

SEQ ID NO: 13

QEEKTGFPTDRAVTVFSAGEGNPYASIRIPALLSIGKGQLLAFAEGRYKNTDQGENDIIMSVSKNGGKTWSRP
RAIAKAHGATFNNPCPVYDAKTRTVTVVFQRYPAGVKERQPNIPDGWDDEKCIRNFMIQSRNGGSSWTKPQEI
TKTTKRPSGVDIMASGPNAGTQLKSGAHKGRLVIPMNEGPFGKWVISCIYSDDGGKSWKLGQPTANMKGMVNE
TSIAETDNGGVVMVARHWGAGNCRRIAWSQDGGETWGQVEDAPELFCDSTQNSLMTYSLSDQPAYGGKSRILF
SGPSAGRRIKGQVAMSYDNGKTWPVKKLLGEGGFAYSSLAMVEPGIVGVLYEENQEHIKKLKFVPITMEWLTD
GEDTGLAPGKKAPVLK

SEQ ID NO: 14

MQEEKTGFPTDRAVTVFSAGEGNPYASIRIPALLSIGKGQLLAFAEGRYKNTDQGENDIIMSVSKNGGKTWSR
PRAIAKAHGATFNNPCPVYDAKTRTVTVVFQRYPAGVKERQPNIPDGWDDEKCIRNFMIQSRNGGSSWTKPQE
ITKTTKRPSGVDIMASGPNAGTQLKSGAHKGRLVIPMNEGPFGKWVISCIYSDDGGKSWKLGQPTANMKGMVN
ETSIAETDNGGVVMVARHWGAGNCRRIAWSQDGGETWGQVEDAPELFCDSTQNSLMTYSLSDQPAYGGKSRIL
FSGPSAGRRIKGQVAMSYDNGKTWPVKKLLGEGGFAYSSLAMVEPGIVGVLYEENQEHIKKLKFVPITMEWLT
DGEDTGLAPGKKAPVLKGSGLEHHHHHH

O-glycosidase from *S. oralis*

SEQ ID NO: 15

MDKRFFEKRCKFSIRKFTLGVASVMIGATFFAASPVLADQARVGSTDNLPSELADLDKKASDEGHDFDKEAAA
QNPGSAETTEGPQTEEELLAQEKEKSEKPSNLPKELEDKLEKAEDNGREVDKDQLAQDTGKLVPEDVAKTTNG
ELNYGATVKIKTPSGEGSGIVVAKDLVLTVSHNFIKDSQEGNIRKVVDNDQGDGDIYSISYPGLPDVKFSKKD
IIHWDREGYLKGFKNDLALVRLRTVLENTPVEVTKKPVVKKIGDKLHVFGYPEGKLNPIVNTTVDFAEPYGEG
VQQGIGYQGGKPGASGGGIFDTEGKLVGVHQNGVVGKRSGGILFSPAQLKWIQDHMQGISSVKPADLEEKEKPA
EEKPKEDKPAAAKPETPKAVTPEWQTVANKEQQGTVTIREEKGVRYNQLSSTAQNDNDGKPALFEKQGLTVDA
NGNATVDLTFKDDSEKGKSRFGVFLKFKDTKNNVFVGYDQGGWFWEYKTPGNSTWYKGNRVAAPEPGSVNRLS
ITLKSDGQLNASNNDVNLFDTVTLPGAVNENLKNEKKILLKAGTYSNDRTVVSVKTDNQEGVKADDTPAQKET
GPAVDDSKVTYDTIQSKVLKAVIDQAFPRVKEYTLNGHTLPGQVQQFNQVFINNHRITPEVTYKKINETTAEY
LMKLRDDAHLINAEMTVRLQVVDNQLHFDVTKIVNHNQVTPGQKIDDERKLLSTISFLGNALVSVSSDQAGAK
FDGATMSNNTHVSGDDHIDVTNPMKDLAKGYMYGFVSTDKLAAGVWSNSQNSYGGGSNDWTRLTAYKETVGNA
NYVGIHSSEWQWEKAYKGIVFPEYTKELPSAKVVITEDANADNKVDWQDGAIAYRSIMNNPQGWEKVKDITAY
RIAMNFGSQAQNPFLMTLDGIKKINLHTDGLGQGVLLKGYGSEGHDSGHLNYADIGKRIGGVEDFKTLIEKAK
KYGAHLGIHVNASETYPESKYFNENILRKNPDGSYSYGWNWLDQGINIDAAYDLAHGRLARWEDLKKKLGEGL
DFIYVDVWGNGQSGDNGAWATHVLAKEINKQGWRFAIEWGHGGEYDSTFQHWAADLTYGGYTNKGINSAITRF
IRNHQKDSWVGDYRSYGGAANYPLLGGYSMKDFEGWQGRSDYNGYVTNLFAHDVMTKYFQHFTVSKWENGTPV
TMTDNGSTYKWTPEMKVELVDAAGNKVVVTRKSNDVNSPQYRERTVTLNGRVIQDGSAYLTPWNWDANGKKLP
TEKEKMYYFNTQAGATTWTLPSDWANSKVYLYKLTDQGKTEEQELTVTDGKITLDLLANQPYVLYRSKQTNPE
MSWSEGMHIYDQGFNSGTLKHWTISGDASKAEIVKSQGANEMLRIQGNKSKVSLTQKLTGLKPNTKYAVYVGV
DNRSNAKASITVNTGEKEVTTYTNKSLALNYIKAYAHNNRRENATVDDTSYFQNMYAFFTTGSDVSNVTLTLS
REAGDEATYFDEIRTFENNSSMYGDKHDTGQGTFKQDFENVAQGIFPFVVGGVEGVEDNRTHLSEKHDPYTQR
GWNGKKVDDVIEGNWSLKTNGLVSRRNLVYQTIPQNFRFEAGKTYRVTFEYEAGSDNTYAFVVGKGEFQSGRR
GTQASNLEMHELPNTWTDSKKAKKVTFLVTGAETGDTWVGIYSTGNASNTRGDAGGNANFRGYNDFMMDNLQI
EEITLTGKMLTENALKNYLPTVAMTNYTKESMDALKEAVFNLSQADDDISVEEARAEIAKIEALKNALVQKKT

ALVAEDFESLDAPAQPGEGLENAFDGNVSSLWHTSWNGGDVGKPATMVLKEPTEITGLRYVPRASDSNGNLRD
VKLVVTDESGKEHTFNVTDWPNNNKPKDIDFGKTIKAKKIVLTGTKTYGDGGDKYQSAAELIFTRPQVAETPL
DLSGYEAALAKAQKLTDKDNQEEVASVQASMKYATDNHLLTERMVAYFADYLNQLKDSATKPDAPTSSKGEEQ
PPVLDVPEFKGGVNATEAAVHEVPEFKGGVNAVQALVHELPEYKGGANAVLAAANEVPEYKGGANAVEALVNE
KPAYTGVLATAGDQAAPTVEKPEYPLTPSPVADTKTPGAKDEEKLPATGEHSSEVALFLASVSIALSAAVLAT
KRKEEGSGLEHHHHHH

E206A_forward primer

SEQ ID NO: 16

ATGGCGCACGC GCTGGGCCACG

E206A_reverse primer

SEQ ID NO: 17

GCCACCGTAC CATTTCGTC

EPO

SEQ ID NO: 18

APPRLICDSRVLERYLLEAKEAEDITTGCAEHCSLDENITVPDTKVDFYAWKRMEVGQQAVEVWQGLALLSEA
VLRGQALLVNSSQPWEPLQLHVDKAVSGLRSLTTLLRALGAQKEAISPPDAASAAPLRTITADTFRKLFRVYS
NFLRGKLKLYTGEACRTGDR
(Notes: predicted O-glycan bearing Serine is underlined; C terminal Arginine
is commonly truncated during expression)

SEQ ID NO: 20

EVTVPDALKDRIALKKTARQLNIVYFLGSDTEPVPDYERRLSELLLYLQQFYGKEMQRHGYARSFGLDIKSP
GRVNIIEYKAKNPAAHYPYENGGGWKAAQELDEFFKAHPDRKKSQHTLIIMPTWNDEKNGPDNPGGVPFYGMG
RNCFALDYPAFDIKHLGQKTREGRLLTKWYGGMAAALGHGLNLPHNHQTASDGKKYGTALMGSGNYTFGTSPT
FLTPASCALLDACEVFSVTPSQQFYEGKPEVEVGDVAISFKGDQILVSGNYKSPQTVKALNVYIQDPPYAVNQ
DYDAVSFSRRLGKKSGKFSMKIDKKELEGLNNNEFRISLMFILANGLHMQKHFTFHWDALQDYRDGSKS

SEQ ID NO: 21

MEVTVPDALKDRIALKKTARQLNIVYFLGSDTEPVPDYERRLSELLLYLQQFYGKEMQRHGYARSFGLDIKS
PGRVNIIEYKAKNPAAHYPYENGGGWKAAQELDEFFKAHPDRKKSQHTLIIMPTWNDEKNGPDNPGGVPFYGM
GRNCFALDYPAFDIKHLGQKTREGRLLTKWYGGMAAALGHGLNLPHNHQTASDGKKYGTALMGSGNYTFGTSP
TFLTPASCALLDACEVFSVTPSQQFYEGKPEVEVGDVAISFKGDQILVSGNYKSPQTVKALNVYIQDPPYAVN
QDYDAVSFSRRLGKKSGKFSMKIDKKELEGLNNNEFRISLMFILANGLHMQKHFTFHWDALQDYRDGSKSGSG
HHHHHH

SEQ ID NO: 22

ATGGAAGTCACTGTGCCGGACGCCCTGAAAGATCGCATCGCGCTGAAGAAAACCGCTCGTCAGCTGAATATCG
TCTACTTCCTGGGTTCTGATACCGAACCGGTTCCGGACTACGAGCGCCGTCTGAGCGAGCTGCTGTTGTATCT
GCAGCAATTCTATGGTAAAGAAATGCAGCGCCATGGCTATGCGCACGCAGCTTTGGTCTGGACATTAAGTCA
CCGGGTCGTGTGAACATTATCGAGTACAAAGCGAAGAACCCGGCAGCGCATTACCCGTATGAGAATGGTGGCG
GCTGGAAAGCTGCACAAGAACTGGACGAATTTTTCAAGGCCCATCCAGACCGCAAGAAAAGCCAGCACACCCT
GATCATCATGCCTACCTGGAATGATGAGAAAAATGGTCCTGACAATCCGGGTGGCGTTCCGTTCTATGGTATG
GGTCGTAATTGTTTTGCGTTGGACTACCCGGCGTTTGATATCAAGCACCTGGGTCAGAAAACGCGTGAGGGTC
GTCTGCTGACGAAATGGTACGGTGGCATGGCGGCCGCGCTGGGCCACGGCCTGAATCTGCCGCACAATCACCA
GACCGCGAGCGATGGCAAGAAATATGGCACCGCCCTGATGGGTAGCGGCAACTACACGTTCGGTACCAGCCCG
ACGTTCCTGACCCCGGCGAGCTGTGCGCTGCTGGATGCCTGCGAAGTGTTCAGCGTTACCCCGAGCCAACAGT
TTTATGAGGGTAAGCCAGAAGTCGAGGTTGGTGATGTTGCAATTTCCTTCAAGGGTGATCAAATCTTGGTCAG
CGGTAACTACAAGAGCCCGCAAACCGTGAAAGCTCTGAACGTTTACATTCAGGATCCGCCGTACGCCGTGAAC
CAAGACTACGATGCAGTGAGCTTTAGCCGTCGTCTGGGCAAAAAGTCCGGTAAGTTTAGCATGAAGATTGACA

```
AAAAAGAACTGGAAGGCCTGAATAACAACGAATTCCGTATTTCCTTGATGTTCATTCTGGCAAACGGCTTACA

CATGCAGAAGCACTTTACGTTTCACTGGGATGCGCTGCAAGACTACCGTGACGGTAGCAAATCTGGTTCGGGT

CATCATCACCACCATCACTGA
```

SEQ ID NO: 23

GMAHALGHGL
(disrupted metalloprotease motif)

SEQ ID NO: 24

GMAAELGHGL
(disrupted metalloprotease motif)

SEQ ID NO: 25

GMAAALGHGL
(disrupted metalloprotease motif)

SEQ ID 26

*Pseudomonas aeruginosa*
PAO1 (native sequence with removed signal
sequence)
```
ATQEEILDAALVSGDSSQLTDSHLVALRLQQQVERIRQTRTQLLDGLYQNLSQAYDPGAASMWVLPANPDNTL

PFLIGDKGRVLASLSLEAGGRGLAYGTNVLTQLSGTNAAHAPLLKRAVQWLVNGDPGAATAKDFKVSVVGVDK

TAALNGLKSAGLQPADAACNALTDASCASTSKLLVLGNGASAASLSATVRARLQAGLPILFVHTNGWNQSSTG

QQILAGLGLQEGPYGGNYWDKDRVPSSRTRTRSVELGGAYGQDPALVQQIVDGSWRTDYDWSKCTSYVGRTTC

DDVPGLSDFSKRVDVLKGALDAYNQKAQNLFALPGTTSLRLWLLWADAVRQNIRYPMDKAADTARFQETFVAD

AIVGYVREAGAAQKELGSYAGQRQQSMPVSGSEETLTLTLPSAQGFTAIGRMAAPGKRLSIRIEDAGQASLAV

GLNTQRIGSTRLWNTRQYDRPRFLKSPDIKLQANQSVALVSPYGGLLQLVYSGATPGQTVTVKVTGAASQPFL

DIQPGEDSSQAIADFIQALDADKADWLEIRSGSVEVHAKVEKVRGSIDKDYGGDVQRFIRELNEVFIDDAYTL

AGFAIPNQAKTPAIQQECAARGWDCDSETLHKLPGTQHINVDQYAQCGGGCSGNPYDQTWGLNPRGWGESHEL

GHNLQVNRLKVYGGRSGEISNQIFPLHKDWRVLREFGQNLDDTRVNYRNAYNLIVAGRAEADPLAGVYKRLWE

DPGTYALNGERMAFYTQWVHYWADLKNDPLQGWDIWTLLYLHQRQVDKSDWDANKAALGYGTYAQRPGNSGDA

SSTDGNDNLLLGLSWLTQRDQRPTFALWGIRTSAAAQAQVAAYGFAEQPAFFYANNRTNEYSTVKLLDMSQGS

PAWPFP
```
Metalloprotease motif underlined.

Bacteroides thetaiotaomicron VPI-5482
(native sequence with removed signal sequence)

SEQ ID 27

```
DKWEKEFRIRSYEPYSNIAEWADKLMTKKYSDLDNPTGISVKAGDDIIVLVGDTYGQNISMQCIWETGTEYKQ

TASSGDVYMLNPGVNKLTMKGEGQLFVMYNTELTSNTAKPIKIHIPLGSGTVNGFFDLKEHKTDEKYAELLKK

STHKYFCIRGEKIMFYFHRNKLLEYVPNNILSAIHLWDNIVGWQQELMGIDDVRPSQVNNHLFAISPEGSYMW

ASDYQIGFVYTYLGNILLEDNVMAAEDNAWGPAHEIGHVHQAAINWASSTESSNNLFSNFIIYKLGKYKSRGN

GLGSVATARYANGQAWYNMGDATHQNEDTETHMRMNWQLWIYYHRCEYKTDFWQTLFKLMREVNMTEGEDPGK

KQLEFAKMASKAANQNLTDFFEMWGFFEPVNTTIEQYGTYKYYVSDAMIREAKEYMAQFPAPKHAFQYIEDRK

KSEFPSNDYRYSAVGDVGYYTQFKENQKIIKAITAELAGRKVSIQNGDEAVAFELRENDENGKLLYFSTFTTF

EIPSSILMVNAKLYAVQADGKRILL
```
Metalloprotease motif underlined.

*Clostridium perfringens* (native sequence
with removed signal sequence)

SEQ ID NO: 28

```
VLELEMRGDSISEA

-continued

TRITDQNIWENNTYPKVGLDDYSNNELYNKADSTHLAQLAPLWQLYLYDNTFYGKFERQFRERDFGNKNREDI

YKSWVVAASDAMELDLTEFFARHGIRVDDKVKEDLAKYPKPDKKIYYLNDLAMNYKGDGFTENAKVSVSTSGS

NGNIKLSFSVDDENKDNILGYEIRRDGKYVGFTSNDSFVDTKSNLDEDGVYVVTPYDRKLNTLNPIEVN
Metalloprotease motif underlined.

*Pseudomonas aeruginosa*
PAO1 (N-term Met, C-term linker/tag)

SEQ ID NO: 29

MATQEEILDAALVSGDSSQLTDSHLVALRLQQQVERIRQTRTQLLDGLYQNLSQAYDPGAASMWVLPANPDNT

LPFLIGDKGRVLASLSLEAGGRGLAYGTNVLTQLSGTNAAHAPLLKRAVQWLVNGDPGAATAKDFKVSVVGVD

KTAALNGLKSAGLQPADAACNALTDASCASTSKLLVLGNGASAASLSATVRARLQAGLPILFVHTNGWNQSST

GQQILAGLGLQEGPYGGNYWDKDRVPSSRTRTRSVELGGAYGQDPALVQQIVDGSWRTDYDWSKCTSYVGRTT

CDDVPGLSDFSKRVDVLKGALDAYNQKAQNLFALPGTTSLRLWLLWADAVRQNIRYPMDKAADTARFQETFVA

DAIVGYVREAGAAQKELGSYAGQRQQSMPVSGSEETLTLTLPSAQGFTAIGRMAAPGKRLSIRIEDAGQASLA

VGLNTQRIGSTRLWNTRQYDRPRFLKSPDIKLQANQSVALVSPYGGLLQLVYSGATPGQTVTVKVTGAASQPF

LDIQPGEDSSQAIADFIQALDADKADWLEIRSGSVEVHAKVEKVRGSIDKDYGGDVQRFIRELNEVFIDDAYT

LAGFAIPNQAKTPAIQQECAARGWDCDSETLHKLPGTQHINVDQYAQCGGGCSGNPYDQTWGLNPRGWGESHE

LGHNLQVNRLKVYGGRSGEISNQIFPLHKDWRVLREFGQNLDDTRVNYRNAYNLIVAGRAEADPLAGVYKRLW

EDPGTYALNGERMAFYTQWVHYWADLKNDPLQGWDIWTLLYLHQRQVDKSDWDANKAALGYGTYAQRPGNSGD

ASSTDGNDNLLLGLSWLTQRDQRPTFALWGIRTSAAAQAQVAAYGFAEQPAFFYANNRTNEYSTVKLLDMSQG

SPAWPFPGSGHHHHHH
Metalloprotease motif underlined.

Bacteroides thetaiotaomicron VPI-5482 (N-term Met, C-term linker/tag)

SEQ ID NO: 30

MDKWEKEFRIRSYEPYSNIAEWADKLMTKKYSDLDNPTGISVKAGDDIIVLVGDTYGQNISMQCIWETGTEYK

QTASSGDVYMLNPGVNKLTMKGEGQLFVMYNTELTSNTAKPIKIHIPLGSGTVNGFFDLKEHKTDEKYAELLK

KSTHKYFCIRGEKIMFYFHRNKLLEYVPNNILSAIHLWDNIVGWQQELMGIDDVRPSQVNNHLFAISPEGSYM

WASDYQIGFVYTYLGNILLEDNVMAAEDNAWGPAHEIGHVHQAAINWASSTESSNNLFSNFIIYKLGKYKSRG

NGLGSVATARYANGQAWYNMGDATHQNEDTETHMRMNWQLWIYYHRCEYKTDFWQTLFKLMREVNMTEGEDPG

KKQLEFAKMASKAANQNLTDFFEMWGFFEPVNTTIEQYGTYKYYVSDAMIREAKEYMAQFPAPKHAFQYIEDR

KKSEFPSNDYRYSAVGDVGYYTQFKENQKITKAITAELAGRKVSIQNGDEAVAFELRENDENGKLLYFSTFTT

FEIPSSILMVNAKLYAVQADGKRILLGSGHHHHHH
Metalloprotease motif underlined.

*Clostridium perfringens* (N-term Met, C-term linker/tag)

SEQ ID NO: 31

MVLELEMRGDSISEAKKRKVWNFQDWQITGLSARAGDKITVYVDVAEGDPTPTLLYKQSLTQHGGATSFQLKP

GKNEITIPEINYESNGIPKDVIQGGDLFFTNYKSDSQKRAPKVRIEGASKYPVFILGKSDENEVMKELEAYVE

KIKAEPKTTPNIFAVSSNKSLEFVQATYALDWYKKNNKTPKYTAEQWDQYIADAMGFWGFDNSKDVNSDFNFR

IMPMVKNLSGGAFMNAGNGVIGIRPGNQDAILAANKGWGVAHELGHNFDTGGRTIVEVTNNMMPLFFESKYKT

KTRITDQNIWENNTYPKVGLDDYSNNELYNKADSTHLAQLAPLWQLYLYDNTFYGKFERQFRERDFGNKNRED

IYKSWVVAASDAMELDLTEFFARHGIRVDDKVKEDLAKYPKPDKKIYYLNDLAMNYKGDGFTENAKVSVSTSG

SNGNIKLSFSVDDENKDNILGYEIRRDGKYVGFTSNDSFVDTKSNLDEDGVYVVTPYDRKLNTLNPIEVNGSG

HHHHHH

Metalloprotease motif underlined.

*Pseudomonas aeruginosa* PAO1 (full native sequence including
signal sequence)

SEQ ID NO: 32

MSLSTTAFPSLQGENMSRSPIPRHRALLAGFCLAGALSAQAATQEEILDAALVSGDSSQLTDSHLVALRLQQQ

VERIRQTRTQLLDGLYQNLSQAYDPGAASMWVLPANPDNTLPFLIGDKGRVLASLSLEAGGRGLAYGTNVLTQ

-continued

LSGTNAAHAPLLKRAVQWLVNGDPGAATAKDFKVSVVGVDKTAALNGLKSAGLQPADAACNALTDASCASTSK

LLVLGNGASAASLSATVRARLQAGLPILFVHTNGWNQSSTGQQILAGLGLQEGPYGGNYWDKDRVPSSRTRTR

SVELGGAYGQDPALVQQIVDGSWRTDYDWSKCTSYVGRTTCDDVPGLSDFSKRVDVLKGALDAYNQKAQNLFA

LPGTTSLRLWLLWADAVRQNIRYPMDKAADTARFQETFVADAIVGYVREAGAAQKELGSYAGQRQQSMPVSGS

EETLTLTLPSAQGFTAIGRMAAPGKRLSIRIEDAGQASLAVGLNTQRIGSTRLWNTRQYDRPRFLKSPDIKLQ

ANQSVALVSPYGGLLQLVYSGATPGQTVTVKVTGAASQPFLDIQPGEDSSQAIADFIQALDADKADWLEIRSG

SVEVHAKVEKVRGSIDKDYGGDVQRFIRELNEVFIDDAYTLAGFAIPNQAKTPAIQQECAARGWDCDSETLHK

LPGTQHINVDQYAQCGGGCSGNPYDQTWGLNPRGW<u>GESHELGHNL</u>QVNRLKVYGGRSGEISNQIFPLHKDWRV

LREFGQNLDDTRVNYRNAYNLIVAGRAEADPLAGVYKRLWEDPGTYALNGERMAFYTQWVHYWADLKNDPLQG

WDIWTLLYLHQRQVDKSDWDANKAALGYGTYAQRPGNSGDASSTDGNDNLLLGLSWLTQRDQRPTFALWGIRT

SAAAQAQVAAYGFAEQPAFFYANNRTNEYSTVKLLDMSQGSPAWPFP
Uniprot accession: Q9I5W4.1
Metalloprotease motif underlined.
Signal sequence bold, underlined.

*Bacteroides thetaiotaomicron* VPI-5482 (full native sequence including
signal and other sequences)         SEQ ID NO: 33

<u>MTIKRFITNLLALFTLFTVSLA</u>CKDTEKSI*INSS*FSISEEYLT*QNLDKSSTSVQ*IPINTSMELA*QWSVSYEAN*

*WLQCSKQKTAAEGTFLRITVNENTGETKRTANIKVTSTTATYTITVNQYAKGEVIVEGDIKVTPTGGKASEHQ*

*EGQDIENTYD**GFKSTDGAAPF*HTPWGQSAKF*PVTLEYYFKGDTEIDYLIYYTRSGNGNFGKVKVYTTTNPDRS

DYTLQGEYD*FKEQNAP*SKVSFSEGIKATGIKFEVLSGLGDFVSCDEMEFYKTNTDKTLDK*QLLTVFTDITCTE

IKNNVTNEQIQALPDYFVR*IAEAVRDNTY*DKWEKEFRIRSYEPYSNIAEWADKLMTKKYSDLDNPTGISVKAG

DDIIVLVGDTYGQNISMQCIWETGTEYKQTASSGDVYMLNPGVNKLTMKGEGQLFVMYNTELTSNTAKPIKIH

IPLGSGTVNGFFDLKEHKTDEKYAELLKKSTHKYFCIRGEKIMFYFHRNKLLEYVPNNILSAIHLWDNIVGWQ

QELMGIDDVRPSQVNNHLFAISPEGSYMWASDYQIGFVYTYLGNILLEDNVMAAEDNAWG<u>PAHEIGHV</u>HQAAI

NWASSTESSNNLFSNFIIYKLGKYKSRGNGLGSVATARYANGQAWYNMGDATHQNEDTETHMRMNWQLWIYYH

RCEYKTDFWQTLFKLMREVNMTEGEDPGKKQLEFAKMASKAANQNLTDFFEMWGFFEPVNTTIEQYGTYKYYV

SDAMIREAKEYMAQFPAPKHAFQYIEDRKKSEFPSNDYRYSAVGDVGYYTQFKENQKITKAITAELAGRKVSI

QNGDEAVAFELRENDENGKLLYFSTFTTFEIPSSILMVNAKLYAVQADGKRILL
Uniprot accession: Q89ZX7.1
Metalloprotease motif underlined.
Signal sequence bold, underlined.
Other sequences removed in mature protein bold, italic.

*Clostridium perfringens* (full native sequence
including signal and

-continued

```
KVGLDDYSNNELYNKADSTHLAQLAPLWQLYLYDNTFYGKFERQFRERDFGNKNREDIYKSWVVAASDAMELD

LTEFFARHGIRVDDKVKEDLAKYPKPDKKIYYLNDLAMNYKGDGFTENAKVSVSTSGSNGNIKLSFSVDDENK

DNILGYEIRRDGKYVGFTSNDSFVDTKSNLDEDGVYVVTPYDRKLNTLNPIEVN*ALQPTLSVNP*VI*TLALGEE*

*FNEEEYIVAKDIKGNSLSESVKVKSS*N*VNTSKVGEYEVLYSLEDSKG*N*EYTKTSKVNVVSRKEYM*SDLTPKQS

SNGWGTVRKI*K*SISGGVIGLTRDGDFVDYNKGLGLHSNAEYVYDLEGKDYD*V*FESYVGVDKAMSSRPASSVIF

KVLVDGEEKFNSGVMRSTT*P*QKYVKVDV*K*NAKELKLIVNDAGDDGSSI*HASFGDAKLATLSSKPIIKGENLAY

SMDEKVDLMKGITATDIEDG*NITSKVQ*I*KSSDFVEGKSGIFTVVYSVTDSDGLTSE*CSRTIAV*TDKETQLSDL

NWKSATIGSGS*VRKDRAV*SGNQIRLLNE*DNSVETFAK*G*IGTHSYSE*IVYNSEGYDIFDTWVGI*D*RHVADKKVS

SVKFKVYVDGELKAETDVMRIDTPKKRLVVDVRNSKEIKLVVDVADNGNNWD*HADWADAKFRNLAEYDASELN

KAIEEAKKIDLNNYTEESSEALKNAI*S*KGEEALLSKI*D*KETINSALEELNKEMNSLVKVDLNAVINIPDKYLLK

SIQNQLNKTGD*I*TLGDMYSLTTLTLSGVEDLTGLENAKNIETLNKDYNEVKDLRPLSKLKKLNTI*NAQEQFIA

AGELKPSN*G*KVIGDSKVYNREGKNVAKTIRVVDKN*GNTILEQDA*K*DEFTINTKD*L*SSGLYGVHVLFEDEFGSG

VMFYLFNV*
Uniprot accession: A0A0H2YN38.1
Metalloprotease motif underlined.
Signal sequence bold, underlined.
Other sequences removed in mature protein bold, italic.
```

SEQ ID NO: 35

*Pseudomonas aeruginosa* PA01 (double mutant with removed signal sequence)
```
ATQEEILDAALVSGDSSQLTDSHLVALRLQQQVERIRQTRTQLLDGLYQNLSQAYDPGAASMWVLPANPDNTL

PFLIGDKGRVLASLSLEAGGRGLAYGTNVLTQLSGTNAAHAPLLKRAVQWLVNGDPGAATAKDFKVSVVGVDK

TAALNGLKSAGLQPADAACNALTDASCASTSKLLVLGNGASAASLSATVRARLQAGLPILFVHTNGWNQSSTG

QQILAGLGLQEGPYGGNYWDKDRVPSSRTRTRSVELGGAYGQDPALVQQIVDGSWRTDYDWSKCTSYVGRTTC

DDVPGLSDFSKRVDVLKGALDAYNQKAQNLFALPGTTSLRLWLLWADAVRQNIRYPMDKAADTARFQETFVAD

AIVGYVREAGAAQKELGSYAGQRQQSMPVSGSEETLTLTLPSAQGFTAIGRMAAPGKRLSIRIEDAGQASLAV

GLNTQRIGSTRLWNTRQYDRPRFLKSPDIKLQANQSVALVSPYGGLLQLVYSGATPGQTVTVKVTGAASQPFL

DIQPGEDSSQAIADFIQALDADKADWLEIRSGSVEVHAKVEKVRGSIDKDYGGDVQRFIRELNEVFIDDAYTL

AGFAIPNQAKTPAIQQECAARGWDCDSETLHKLPGTQHINVDQYAQCGGGCSGNPYDQTWGLNPRGWGESAAL

GHNLQVNRLKVYGGRSGEISNQIFPLHKDWRVLREFGQNLDDTRVNYRNAYNLIVAGRAEADPLAGVYKRLWE

DPGTYALNGERMAFYTQWVHYWADLKNDPLQGWDIWTLLYLHQRQVDKSDWDANKAALGYGTYAQRPGNSGDA

SSTDGNDNLLLGLSWLTQRDQRPTFALWGIRTSAAAQAQVAAYGFAEQPAFFYANNRTNEYSTVKLLDMSQGS

PAWPFP
Disrupted metalloprotease motif underlined
```

SEQ ID NO: 36

*Bacteroides thetaiotaomicron* VPI-5482 (double mutant with removed signal and other immature sequences)
```
DKWEKEFRIRSYEPYSNIAEWADKLMTKKYSDLDNPTGISVKAGDDIIVLVGDTYGQNISMQCIWETGTEYKQ

TASSGDVYMLNPGVNKLTMKGEGQLFVMYNTELTSNTAKPIKIHIPLGSGTVNGFFDLKEHKTDEKYAELLKK

STHKYFCIRGEKIMFYFHRNKLLEYVPNNILSAIHLWDNIVGWQQELMGIDDVRPSQVNNHLFAISPEGSYMW

ASDYQIGFVYTYLGNILLEDNVMAAEDNAWGPAAAIGHVHQAAINWASSTESSNNLFSNFIIYKLGKYKSRGN

GLGSVATARYANGQAWYNMGDATHQNEDTETHMRMNWQLWIYYHRCEYKTDFWQTLFKLMREVNMTEGEDPGK
```

-continued

KQLEFAKMASKAANQNLTDFFEMWGFFEPVNTTIEQYGTYKYYVSDAMIREAKEYMAQFPAPKHAFQYIEDRK

KSEFPSNDYRYSAVGDVGYYTQFKENQKIIKAITAELAGRKVSIQNGDEAVAFELRENDENGKLLYFSTFTTF

EIPSSILMVNAKLYAVQADGKRILL
Disrupted metalloprotease motif underlined

SEQ ID NO: 37

*Clostridium perfringens* (double mutant with removed signal and other immature sequences)
VLELEMRGDSISEAKKRKVWNFQDWQITGLSARAGDKITVYVDVAEGDPTPTLLYKQSLTQHGGATSFQLKPG

KNEITIPEINYESNGIPKDVIQGGDLFFTNYKSDSQKRAPKVRIEGASKYPVFILGKSDENEVMKELEAYVEK

IKAEPKTTPNIFAVSSNKSLEFVQATYALDWYKKNNKTPKYTAEQWDQYIADAMGFWGFDNSKDVNSDFNFRI

MPMVKNLSGGAFMNAGNGVIGIRPGNQDAILAANKGWGVAAALGHNFDTGGRTIVEVTNNMMPLFFESKYKTK

TRITDQNIWENNTYPKVGLDDYSNNELYNKADSTHLAQLAPLWQLYLYDNTFYGKFERQFRERDFGNKNREDI

YKSWVVAASDAMELDLTEFFARHGIRVDDKVKEDLAKYPKPDKKIYYLNDLAMNYKGDGFTENAKVSVSTSGS

NGNIKLSFSVDDENKDNILGYEIRRDGKYVGFTSNDSFVDTKSNLDEDGVYVVTPYDRKLNTLNPIEVN
Disrupted metalloprotease motif underlined

SEQ ID NO: 38

*Pseudomonas aeruginosa* PAO1 (double mutant with removed signal sequence, with N-term Met, C-term linker/tag)
MATQEEILDAALVSGDSSQLTDSHLVALRLQQQVERIRQTRTQLLDGLYQNLSQAYDPGAASMWVLPANPDNT

LPFLIGDKGRVLASLSLEAGGRGLAYGTNVLTQLSGTNAAHAPLLKRAVQWLVNGDPGAATAKDFKVSVVGVD

KTAALNGLKSAGLQPADAACNALTDASCASTSKLLVLGNGASAASLSATVRARLQAGLPILFVHTNGWNQSST

GQQILAGLGLQEGPYGGNYWDKDRVPSSRTRTRSVELGGAYGQDPALVQQIVDGSWRTDYDWSKCTSYVGRTT

CDDVPGLSDFSKRVDVLKGALDAYNQKAQNLFALPGTTSLRLWLLWADAVRQNIRYPMDKAADTARFQETFVA

DAIVGYVREAGAAQKELGSYAGQRQQSMPVSGSEETLTLTLPSAQGFTAIGRMAAPGKRLSIRIEDAGQASLA

VGLNTQRIGSTRLWNTRQYDRPRFLKSPDIKLQANQSVALVSPYGGLLQLVYSGATPGQTVTVKVTGAASQPF

LDIQPGEDSSQAIADFIQALDADKADWLEIRSGSVEVHAKVEKVRGSIDKDYGGDVQRFIRELNEVFIDDAYT

LAGFAIPNQAKTPAIQQECAARGWDCDSETLHKLPGTQHINVDQYAQCGGGCSGNPYDQTWGLNPRGWGESAA

LGHNLQVNRLKVYGGRSGEISNQIFPLHKDWRVLREFGQNLDDTRVNYRNAYNLIVAGRAEADPLAGVYKRLW

EDPGTYALNGERMAFYTQWVHYWADLKNDPLQGWDIWTLLYLHQRQVDKSDWDANKAALGYGTYAQRPGNSGD

ASSTDGNDNLLLGLSWLTQRDQRPTFALWGIRTSAAAQAQVAAYGFAEQPAFFYANNRTNEYSTVKLLDMSQG

SPAWPFPGSGHHHHHH
Disrupted metalloprotease motif underlined

*Bacteroides thetaiotaomicron* VPI-5482 (double mutant with removed signal and other sequences from immature protein, with N-term Met, C-term linker/tag)

SEQ ID NO: 39

MDKWEKEFRIRSYEPYSNIAEWADKLMTKKYSDLDNPTGISVKAGDDIIVLVGDTYGQNISMQCIWETGTEYK

QTASSGDVYMLNPGVNKLTMKGEGQLFVMYNTELTSNTAKPIKIHIPLGSGTVNGFFDLKEHKTDEKYAELLK

KSTHKYFCIRGEKIMFYFHRNKLLEYVPNNILSAIHLWDNIVGWQQELMGIDDVRPSQVNNHLFAISPEGSYM

WASDYQIGFVYTYLGNILLEDNVMAAEDNAWGPAAAIGHVHQAAINWASSTESSNNLFSNFIIYKLGKYKSRG

NGLGSVATARYANGQAWYNMGDATHQNEDTETHMRMNWQLWIYYHRCEYKTDFWQTLFKLMREVNMTEGEDPG

KKQLEFAKMASKAANQNLTDFFEMWGFFEPVNTTIEQYGTYKYYVSDAMIREAKEYMAQFPAPKHAFQYIEDR

KKSEFPSNDYRYSAVGDVGYYTQFKENQKITKAITAELAGRKVSIQNGDEAVAFELRENDENGKLLYFSTFTT
FEIPSSILMVNAKLYAVQADGKRILLGSGHHHHHH

Disrupted metalloprotease motif underlined

*Clostridium perfringens* (double mutant with removed signal and other
sequences from immature protein, with N-term Met, C-term linker/tag)

SEQ ID NO: 40

MVLELEMRGDSISEAKKRKVWNFQDWQITGLSARAGDKITVYVDVAEGDPTPTLLYKQSLTQHGGATSFQLKP
GKNEITIPEINYESNGIPKDVIQGGDLFFTNYKSDSQKRAPKVRIEGASKYPVFILGKSDENEVMKELEAYVE
KIKAEPKTTPNIFAVSSNKSLEFVQATYALDWYKKNNKTPKYTAEQWDQYIADAMGFWGFDNSKDVNSDFNFR
IMPMVKNLSGGAFMNAGNGVIGIRPGNQDAILAANKGWGVA<u>AALGHN</u>FDTGGRTIVEVTNNMMPLFFESKYKT
KTRITDQNIWENNTYPKVGLDDYSNNELYNKADSTHLAQLAPLWQLYLYDNTEYGKFERQFRERDFGNKNRED
IYKSWVVAASDAMELDLTEFFARHGIRVDDKVKEDLAKYPKPDKKIYYLNDLAMNYKGDGFTENAKVSVSTSG
SNGNIKLSFSVDDENKDNILGYEIRRDGKYVGFTSNDSFVDTKSNLDEDGVYVVTPYDRKLNTLNPIEVNGSG
HHHHHH

Disrupted metalloprotease motif underlined

HELGH (metalloprotease motif)

SEQ ID NO: 41

HEIGH (metalloprotease motif)

SEQ ID NO: 42

GVAHELGHNF (metalloprotease motif)

SEQ ID NO: 43

HALGH (disrupted metalloprotease motif)

SEQ ID NO: 44

AELGH (disrupted metalloprotease motif)

SEQ ID NO: 45

AALGH (disrupted metalloprotease motif)

SEQ ID NO: 46

GKPRPYSPRPTSHPRPIRV
(glycodrosocin peptide with O-gly site on the T)

SEQ ID NO: 47

YIYGSFK (Non-O-glycosylated peptide)

SEQ ID NO: 48

KKLVFFA (Non-O-glycosylated peptide)

SEQ ID NO: 49

FLPLILGKLVKGLL (Non-O-glycosylated peptide)

SEQ ID NO: 50

---

SEQUENCE LISTING

```
Sequence total quantity: 78
SEQ ID NO: 1            moltype = AA  length = 361
FEATURE                 Location/Qualifiers
source                  1..361
                        mol_type = protein
                        organism = Akkermansia muciniphila
SEQUENCE: 1
EVTVPDALKD RIALKKTARQ LNIVYFLGSD TEPVPDYERR LSELLLYLQQ FYGKEMQRHG   60
YGARSFGLDI KSPGRVNIIE YKAKNPAAHY PYENGGGWKA AQELDEFFKA HPDRKKSQHT  120
LIIMPTWNDE KNGPDNPGGV PFYGMGRNCF ALDYPAFDIK HLGQKTREGR LLTKWYGGMA  180
HELGHGLNLP HNHQTASDGK KYGTALMGSG NYTFGTSPTF LTPASCALLD ACEVFSVTPS  240
QQFYEGKPEV EVGDVAISFK GDQILVSGNY KSPQTVKALN VYIQDPPYAV NQDYDAVSFS  300
RRLGKKSGKF SMKIDKKELE GLNNNEFRIS LMFILANGLH MQKHFTFHWD ALQDYRDGSK  360
S                                                                 361

SEQ ID NO: 2            moltype = AA  length = 371
FEATURE                 Location/Qualifiers
REGION                  1..371
```

```
                        note = LS (N terminal methionine and a C-terminal linker +
                              His6 tag)
        source          1..371
                        mol_type = protein
                        organism = synthetic construct
SEQUENCE: 2
MEVTVPDALK DRIALKKTAR QLNIVYFLGS DTEPVPDYER RLSELLLYLQ QFYGKEMQRH   60
GYGARSFGLD IKSPGRVNII EYKAKNPAAH YPYENGGGWK AAQELDEFFK AHPDRKKSQH  120
TLIIMPTWND EKNGPDNPGG VPFYGMGRNC FALDYPAFDI KHLGQKTREG RLLTKWYGGM  180
AHELGHGLNL PHNHQTASDG KKYGTALMGS GNYTFGTSPT FLTPASCALL DACEVFSVTP  240
SQQFYEGKPE VEVGDVAISF KGDQILVSGN YKSPQTVKAL NVYIQDPPYA VNQDYDAVSF  300
SRRLGKKSGK FSMKIDKKEL EGLNNNEFRI SLMFILANGL HMQKHFTFHW DALQDYRDGS  360
KSGSGHHHHH H                                                      371

SEQ ID NO: 3            moltype = DNA  length = 1116
FEATURE                 Location/Qualifiers
misc_feature            1..1116
                        note = Nucleotide sequence of LS
source                  1..1116
                        mol_type = other DNA
                        organism = synthetic construct
SEQUENCE: 3
atggaagtca ctgtgccgga cgccctgaaa gatcgcatcg cgctgaagaa aaccgctcgt    60
cagctgaata tcgtctactt cctgggttct gataccgaac cggttccgga ctacgagcgc   120
cgtctgagcg agctgctgtt gtatctgcag caattctatg gtaaagaaat gcagcgccat   180
ggctatggcg cacgcagctt tggtctggac attaagtcac cgggtcgtgt gaacattatc   240
gagtacaaag cgaagaaccc ggcagcgcat taccgtatg agaatggtgg cggctggaaa   300
gctgcacaag aactggacga atttttcaag gcccatccag accgcaagaa aagccagcac   360
accctgatca tcatgcctac ctggaatgat gagaaaaatg gtcctgacaa tccgggtggc   420
gttccgttct atggtatggg tcgtaattgt tttgcgttcg actacccggc gtttgatatc   480
aagcacctgg gtcagaaaac gcgtgagggt cgtctgctga cgaaatggta cggtggcatg   540
gcgcacgaac tgggccacgg cctgaatctg ccgcacaatc accagaccgc gagcgatggc   600
aagaaatatg gcaccgccct gatgggtagc ggcaactaca cgttcggtac cagcccgacg   660
ttcctgaccc cggcgagctg tgcgctgctg gatgcctgcg aagtgttcag cgttacccg    720
agccaacagt tttatgaggg taagccagaa gtcgaggttg gtgatgttgc aatttccttc   780
aagggtgatc aaatcttggt cagcggtaac tacaagagcc cgcaaaccgt gaaagctctg   840
aacgtttaca ttcaggatcc gccgtacgcc gtgaaccaag actacgatgc agtgagcttt   900
agccgtcgtc tgggcaaaaa gtccggtaag tttagcatga agattgacaa aaagaaactg   960
gaaggcctga ataacaacga attccgtatt tccttgatgt tcattctggc aaacggctta  1020
cacatgcaga agcactttac gtttcactgg gatgcgctgc aagactaccg tgacggtagc  1080
aaatctggtt cgggtcatca tcaccaccat cactga                            1116

SEQ ID NO: 4            moltype = AA  length = 385
FEATURE                 Location/Qualifiers
source                  1..385
                        mol_type = protein
                        organism = Akkermansia muciniphila
SEQUENCE: 4
MLKRLLSAFF SLFFLGAASG TSFAEVTVPD ALKDRIALKK TARQLNIVYF LGSDTEPVPD   60
YERRLSELLL YLQQFYGKEM QRHGYGARSF GLDIKSPGRV NIIEYKAKNP AAHYPYENGG  120
GWKAAQELDE FFKAHPDRKK SQHTLIIMPT WNDEKNGPDN PGGVPFYGMG RNCFALDYPA  180
FDIKHLGQKT REGRLLTKWY GGMAHELGHG LNLPHNHQTA SDGKKYGTAL MGSGNYTFGT  240
SPTFLTPASC ALLDACEVFS VTPSQQFYEG KPEVEVGDVA ISFKGDQILV SGNYKSPQTV  300
KALNVYIQDP PYAVNQDYDA VSFSRRLGKK SGKFSMKIDK KELEGLNNNE FRISLMFILA  360
NGLHMQKHFT FHWDALQDYR DGSKS                                       385

SEQ ID NO: 5            moltype = AA  length = 361
FEATURE                 Location/Qualifiers
REGION                  1..361
                        note = Polypeptide capable of binding to O-glycans but
                              lacks or hasreduced O-glycoprotein-specific endoprotease
                              activity
source                  1..361
                        mol_type = protein
                        organism = synthetic construct
SEQUENCE: 5
EVTVPDALKD RIALKKTARQ LNIVYFLGSD TEPVPDYERR LSELLLYLQQ FYGKEMQRHG   60
YGARSFGLDI KSPGRVNIIE YKAKNPAAHY PYENGGGWKA AQELDEFFKA HPDRKKSQHT  120
LIIMPTWNDE KNGPDNPGGV PFYGMGRNCF ALDYPAFDIK HLGQKTREGR LLTKWYGGMA  180
HALGHGLNLP HNHQTASDGK KYGTALMGSG NYTFGTSPTF LTPASCALLD ACEVFSVTPS  240
QQFYEGKPEV EVGDVAISFK GDQILVSGNY KSPQTVKALN VYIQDPPYAV NQDYDAVSFS  300
RRLGKKSGKF SMKIDKKELE GLNNNEFRIS LMFILANGLH MQKHFTFHWD ALQDYRDGSK  360
S                                                                 361

SEQ ID NO: 6            moltype = AA  length = 371
FEATURE                 Location/Qualifiers
REGION                  1..371
                        note = LS E206A (N-terminal methionine and a C-terminal
                              linker + His6tag)
```

```
source                  1..371
                        mol_type = protein
                        organism = synthetic construct
SEQUENCE: 6
MEVTVPDALK DRIALKKTAR QLNIVYFLGS DTEPVPDYER RLSELLLYLQ QFYGKEMQRH    60
GYGARSFGLD IKSPGRVNII EYKAKNPAAH YPYENGGGWK AAQELDEFFK AHPDRKKSQH   120
TLIIMPTWND EKNGPDNPGG VPFYGMGRNC FALDYPAFDI KHLGQKTREG RLLTKWYGGM   180
AHALGHGLNL PHNHQTASDG KKYGTALMGS GNYTFGTSPT FLTPASCALL DACEVFSVTP   240
SQQFYEGKPE VEVGDVAISF KGDQILVSGN YKSPQTVKAL NVYIQDPPYA VNQDYDAVSF   300
SRRLGKKSGK FSMKIDKKEL EGLNNNEFRI SLMFILANGL HMQKHFTFHW DALQDYRDGS   360
KSGSGHHHHH H                                                       371

SEQ ID NO: 7            moltype = DNA  length = 1116
FEATURE                 Location/Qualifiers
misc_feature            1..1116
                        note = Nucleotide sequence encoding LS E206A
source                  1..1116
                        mol_type = other DNA
                        organism = synthetic construct
SEQUENCE: 7
atggaagtca ctgtgccgga cgccctgaaa gatcgcatcg cgctgaagaa aaccgctcgt    60
cagctgaata tcgtctactt cctgggttct gataccgaac cggttccgga ctacgagcgc   120
cgtctgagcg agctgctgtt gtatctgcag caattctatg gtaaagaaat gcagcgccat   180
ggctatggcg cacgcagctt tggtctggac attaagtcac cgggtcgtgt gaacattatc   240
gagtacaaag cgaagaaccc ggcagcgcat tacccgtatg agaatggtgg cggctggaaa   300
gctgcacaag aactggacga attttttcaag gcccatccgg accgcaagaa aagccagcac   360
accctgatca tcatgcctac ctggaatgat gagaaaaatg gtcctgacaa tccgggtggc   420
gttccgttct atggtatggg tcgtaattgt tttgcgttgg actacccggc gtttgatatc   480
aagcacctgg gtcagaaaac gcgtgagggt cgtctgctga caaatggta cggtggcatg   540
gcgcacgcgc tgggccacgg cctgaatctg ccgcacaatc accagaccgc gagcgatggc   600
aagaaatatg gcaccgccct gatgggtagc ggcaactaca cgttcggtac cagcccgacg   660
ttcctgaccc cggcgagctg tgcgctgctg gatgcctgcg aagtgttcag cgttaccccg   720
agccaacagt tttatgaggg taagccagaa gtcgaggttg gtgatgttgc aatttccttc   780
aagggtgatc aaatcttggt cagcggtaac tacaagagcc cgcaaaccgt gaaagctctg   840
aacgtttaca ttcaggatcc gccgtacgcc gtgaaccaag actacgatgc agtgagcttt   900
agccgtcgtc tgggcaaaaa gtccggtaag tttagcatga agattgacaa aaaagaactg   960
gaaggcctga taacaacga attccgtatt tccttgatgt tcattctggc aaacggctta  1020
cacatgcaga agcactttac gtttcactgg gatgcgctgc aagactaccg tgacggtagc  1080
aaaatctggt cgggtcatca tcaccaccat cactga                            1116

SEQ ID NO: 8            moltype = AA  length = 10
FEATURE                 Location/Qualifiers
REGION                  1..10
                        note = Metalloprotease domain motif
source                  1..10
                        mol_type = protein
                        organism = synthetic construct
SEQUENCE: 8
GMAHELGHGL                                                          10

SEQ ID NO: 9            moltype = AA  length = 595
FEATURE                 Location/Qualifiers
source                  1..595
                        mol_type = protein
                        organism = Akkermansia muciniphila
SEQUENCE: 9
MKNLLFALLT GSFCCCYAQQ KAAPVPEPEV VATPPADAGR GLIRVDSREI RHYSGTRKEP    60
DYLVSRDNGK TWEMKAAPAG YPPNYGGIPK ESPAIVRNPL TREFIRVQPI GGFVFLSRGG   120
LDGKWLAVTN DGKLEEDWKD PEKRKNLKKL GGIMRTPVFV NKGRRVIVPF HNMGGGTKFH   180
ISDDGGLTWH VSRNGVTSPR HEARPPHQGV RWFNNAVEAT VLEMKDGTLW ALARTSQDQA   240
WQAFSKDYGE TWSKPEPSRF FGTLTMNTLG RLDDGTIVSL WTNTMALPEN ATAGNGTWED   300
VFTNRDSHHI AMSGDEGKTW YGFREIILDE HRNHPGYATL DGPEDRGKHQ SEMVQLDKNR   360
ILISLGQHKN HRRLVIVDRR WVGAKTRATQ TGKDLDSQWT IHTYIPQKKG HCSYNRKPSA   420
ELVQDPSGGT KKVLQIKRLD DPELVNEKSN VDYRNGGATW NFPNGTTGLV KFRFRVVDGE   480
QADDSGLQVS LTDRLFNACD STTKDYALFT FPIRLKPAPH LLLGMKKVPF TPGAWHEISL   540
LWQGGQAVVS LDGKKAGTLK MANKSPNGAS YIHFISTGSQ PDAGILLDTV NARVK        595

SEQ ID NO: 10           moltype = AA  length = 577
FEATURE                 Location/Qualifiers
source                  1..577
                        mol_type = protein
                        organism = Akkermansia muciniphila
SEQUENCE: 10
QQKAAPVPEP EVVATPPADA GRGLIRVDSR EIRHYSGTRK EPDYLVSRDN GKTWEMKAAP    60
AGYPPNYGGI PKESPAIVRN PLTREFIRVQ PIGGFVFLSR GGLDGKWLAV TNDGKLEEDW   120
KDPEKRKNLK KLGGIMRTPV FVNKGRRVIV PFHNMGGGTK FHISDDGGLT WHVSRNGVTS   180
PRHEARPPHQ GVRWFNNAVE ATVLEMKDGT LWALARTSQD QAWQAFSKDY GETWSKPEPS   240
RFFGTLTMNT LGRLDDGTIV SLWTNTMALP ENATAGNGTW EDVFTNRDSH HIAMSGDEGK   300
TWYGFREIIL DEHRNHPGYA TLDGPEDRGK HQSEMVQLDK NRILISLGQH KNHRRLVIVD   360
```

```
RRWVGAKTRA TQTGKDLDSQ WTIHTYIPQK KGHCSYNRKP SAELVQDPSG GTKKVLQIKR    420
LDDPELVNEK SNVDYRNGGA TWNFPNGTTG LVKFRFRVVD GEQADDSGLQ VSLTDRLFNA    480
CDSTTKDYAL FTFPIRLKPA PHLLLGMKKV PFTPGAWHEI SLLWQGGQAV VSLDGKKAGT    540
LKMANKSPNG ASYIHFISTG SQPDAGILLD TVNARVK                             577

SEQ ID NO: 11           moltype = AA   length = 589
FEATURE                 Location/Qualifiers
REGION                  1..589
                        note = Am1757 (N-terminal methionine and a C-terminal
                        linker + His6 tag)
source                  1..589
                        mol_type = protein
                        organism = synthetic construct
SEQUENCE: 11
MQQKAAPVPE PEVVATPPAD AGRGLIRVDS REIRHYSGTR KEPDYLVSRD NGKTWEMKAA    60
PAGYPPNYGG IPKESPAIVR NPLTREFIRV QPIGGFVFLS RGGLDGKWLA VTNDGKLEED    120
WKDPEKRKNL KKLGGIMRTP VFVNKGRRVI VPFHNMGGGT KFHISDDGGL TWHVSRNGVT    180
SPRHEARPPH QGVRWFNNAV EATVLEMKDG TLWALARTSQ DQAWQAFSKD YGETWSKPEP    240
SRFFGTLTMN TLGRLDDGTI VSLWTNTMAL PENATAGNGT WEDVFTNRDS HHIAMSGDEG    300
KTWYGFREII LDEHRNHPGY ATLDGPEDRG KHQSEMVQLD KNRILISLGQ HKNHRRLVIV    360
DRRWVGAKTR ATQTGKDLDS QWTIHTYIPQ KKGHCSYNRK PSAELVQDPS GGTKKVLQIK    420
RLDDPELVNE KSNVDYRNGG ATWNFPNGTT GLVKFRFRVV DGEQADDSGL QVSLTDRLFN    480
ACDSTTKDYA LFTFPIRLKP APHLLLGMKK VPFTPGAWHE ISLLWQGGQA VVSLDGKKAG    540
TLKMANKSPN GASYIHFIST GSQPDAGILL DTVNARVKGS GLEHHHHHH              589

SEQ ID NO: 12           moltype = AA   length = 419
FEATURE                 Location/Qualifiers
source                  1..419
                        mol_type = protein
                        organism = Akkermansia muciniphila
SEQUENCE: 12
MTWLLCGRGK WNKVKRMMNS VFKCLMSAVC AVALPAFGQE EKTGFPTDRA VTVFSAGEGN    60
PYASIRIPAL LSIGKGQLLA FAEGRYKNTD QGENDIIMSV SKNGGKTWSR PRAIAKAHGA    120
TFNNPCPVYD AKTRTVTVVF QRYPAGVKER QPNIPDGWDD EKCIRNFMIQ SRNGGSSWTK    180
PQEITKTTKR PSGVDIMASG PNAGTQLKSG AHKGRLVIPM NEGPFGKWVI SCIYSDDGGK    240
SWKLGQPTAN MKGMVNETSI AETDNGGVVM VARHWGAGNC RRIAWSQDGG ETWGQVEDAP    300
ELFCDSTQNS LMTYSLSDQP AYGGKSRILF SGPSAGRRIK GQVAMSYDNG KTWPVKKLLG    360
EGGFAYSSLA MVEPGIVGVL YEENQEHIKK LKFVPITMEW LTDGEDTGLA PGKKAPVLK     419

SEQ ID NO: 13           moltype = AA   length = 381
FEATURE                 Location/Qualifiers
source                  1..381
                        mol_type = protein
                        organism = Akkermansia muciniphila
SEQUENCE: 13
QEEKTGFPTD RAVTVFSAGE GNPYASIRIP ALLSIGKGQL LAFAEGRYKN TDQGENDIIM    60
SVSKNGGKTW SRPRAIAKAH GATFNNPCPV YDAKTRTVTV VFQRYPAGVK ERQPNIPDGW    120
DDEKCIRNFM IQSRNGGSSW TKPQEITKTT KRPSGVDIMA SGPNAGTQLK SGAHKGRLVI    180
PMNEGPFGKW VISCIYSDDG GKSWKLGQPT ANMKGMVNET SIAETDNGGV VMVARHWGAG    240
NCRRIAWSQD GGETWGQVED APELFCDSTQ NSLMTYSLSD QPAYGGKSRI LFSGPSAGRR    300
IKGQVAMSYD NGKTWPVKKL LGEGGFAYSS LAMVEPGIVG VLYEENQEHI KKLKFVPITM    360
EWLTDGEDTG LAPGKKAPVL K                                              381

SEQ ID NO: 14           moltype = AA   length = 393
FEATURE                 Location/Qualifiers
REGION                  1..393
                        note = Am0707 (including N-terminal methionine and a
                        C-terminal linker +His6 tag)
source                  1..393
                        mol_type = protein
                        organism = synthetic construct
SEQUENCE: 14
MQEEKTGFPT DRAVTVFSAG EGNPYASIRI PALLSIGKGQ LLAFAEGRYK NTDQGENDII    60
MSVSKNGGKT WSRPRAIAKA HGATFNNPCP VYDAKTRTVT VVFQRYPAGV KERQPNIPDG    120
WDDEKCIRNF MIQSRNGGSS WTKPQEITKT KRPSGVDIM ASGPNAGTQL KSGAHKGRLV    180
IPMNEGPFGK WVISCIYSDD GGKSWKLGQP TANMKGMVNE TSIAETDNGG VVMVARHWGA    240
GNCRRIAWSQ DGGETWGQVE DAPELFCDST QNSLMTYSLS DQPAYGGKSR ILFSGPSAGR    300
RIKGQVAMSY DNGKTWPVKK LLGEGGFAYS SLAMVEPGIV GVLYEENQEH IKKLKFVPIT    360
MEWLTDGEDT GLAPGKKAPV LKGSGLEHHH HHH                                 393

SEQ ID NO: 15           moltype = AA   length = 2133
FEATURE                 Location/Qualifiers
source                  1..2133
                        mol_type = protein
                        organism = Streptococcus oralis
SEQUENCE: 15
MDKRFFEKRC KFSIRKFTLG VASVMIGATF FAASPVLADQ ARVGSTDNLP SELADLDKKA    60
SDEGHDFDKE AAAQNPGSAE TTEGPQTEEE LLAQEKEKSE KPSNLPKELE DKLEKAEDNG    120
REVDKDQLAQ DTGKLVPEDV AKTTNGELNY GATVKIKTPS GEGSGIVVAK DLVLTVSHNF    180
```

```
IKDSQEGNIR KVVDNDQGDG DIYSISYPGL PDVKFSKKDI IHWDREGYLK GFKNDLALVR    240
LRTVLENTPV EVTKKPVVKK IGDKLHVFGY PEGKLNPIVN TTVDFAEPYG EGVQGIGYQG    300
GKPGASGGGI FDTEGKLVGV HQNGVVGKRS GGILFSPAQL KWIQDHMQGI SSVKPADLEE    360
KEKPAEEKPK EDKPAAAKPE TPKAVTPEWQ TVANKEQQGT VTIREEKGVR YNQLSSTAQN    420
DNDGKPALFE KQGLTVDANG NATVDLTFKD DSEKGKSRFG VFLKFKDTKN NVFVGYDQGG    480
WFWEYKTPGN STWYKGNRVA APEPGSVNRL SITLKSDGQL NASNNDVNLF DTVTLPGAVN    540
ENLKNEKKIL LKAGTYSNDR TVVSVKTDNQ EGVKADDTPA QKETGPAVDD SKVTYDTIQS    600
KVLKAVIDQA FPRVKEYTLN GHTLPGQVQQ FNQVFINNHR ITPEVTYKKI NETTAEYLMK    660
LRDDAHLINA EMTVRLQVVD NQLHFDVTKI VNHNQVTPGQ KIDDERKLLS TISFLGNALV    720
SVSSDQAGAK FDGATMSNNT HVSGDDHIDV TNPMKDLAKG YMYGFVSTDK LAAGVWSNSQ    780
NSYGGGSNDW TRLTAYKETV GNANYVGIHS SEWQWEKAYK GIVFPEYTKE LPSAKVVITE    840
DANADNKVDW QDGAIAYRSI MNNPQGWEKV KDITAYRIAM NFGSQAQNPF LMTLDGIKKI    900
NLHTDGLGQG VLLKGYGSEG HDSGHLNYAD IGKRIGGVED FKTLIEKAKK YGAHLGIHVN    960
ASETYPESKY FNENILRKNP DGSYSYGWNW LDQGINIDAA YDLAHGRLAR WEDLKKKLGE   1020
GLDFIYVDVW GNGQSGDNGA WATHVLAKEI NKQGWRFAIE WGHGGEYDST FQHWAADLTY   1080
GGYTNKGINS AITRFIRNHQ KDSWVGDYRS YGGAANYPLL GGYSMKDFEG WQGRSDYNGY   1140
VTNLFAHDVM TKYFQHFTVS KWENGTPVTM TDNGSTYKWT PEMKVELVDA AGNKVVVTRK   1200
SNDVNSPQYR ERTVTLNGRV IQDGSAYLTP WNWDANGKKL PTEKEKMYYF NTQAGATTWT   1260
LPSDWANSKV YLYKLTDQGK TEEQELTVTD GKITLDLLAN QPYVLYRSKQ TNPEMSWSEG   1320
MHIYDQGFNS GTLKHWTISG DASKAEIVKS QGANEMLRIQ GNKSKVSLTQ KLTGLKPNTK   1380
YAVYVGVDNR SNAKASITVN TGEKEVTTYT NKSLALNYIK AYAHNNRREN ATVDDTSYFQ   1440
NMYAFFTTGS DVSNVTLTLS REAGDEATYF DEIRTFENNS SMYGDKHDTG QGTFKQDFEN   1500
VAQGIFPFVV GGVEGVEDNR THLSEKHDPY TQRGWNGKKV DDVIEGNWSL KTNGLVSRRN   1560
LVYQTIPQNF RFEAGKTYRV TFEYEAGSDN TYAFVVGKGE FQSGRRGTQA SNLEMHELPN   1620
TWTDSKKAKK VTFLVTGAET GDTWVGIYST GNASNTRGDA GGNANFRGYN DFMMDNLQIE   1680
EITLTGKMLT ENALKNYLPT VAMTNYTKES MDALKEAVRN LSQADDDISV EEARAEIAKI   1740
EALKNALVQK KTALVAEDFE SLDAPAQPGE GLENAFDGNV SSLWHTSWNG GDVGKPATMV   1800
LKEPTEITGL RYVPRASDSN GNLRDVKLVV TDESGKEHTF NVTDWPNNNK PKDIDFGKTI   1860
KAKKKIVLTGT KTYGDGGDKY QSAAELIFTR PQVAETPLDL SGYEAALAKA QKLTDKDNQE   1920
EVASVQASMK YATDNHLLTE RMVAYFADYL NQLKDSATKP DAPTSSKGEE QPPVLDVPEF   1980
KGGVNATEAA VHEVPEFKGG VNAVQALVHE LPEYKGGANA VLAAANEVPE YKGGANAVEA   2040
LVNEKPAYTG VLATAGDQAA PTVEKPEYPL TPSPVADTKT PGAKDEEKLP ATGEHSSEVA   2100
LFLASVSIAL SAAVLATKRK EEGSGLEHHH HHH                                2133

SEQ ID NO: 16          moltype = DNA   length = 22
FEATURE                Location/Qualifiers
misc_feature           1..22
                       note = E206A forward primer
source                 1..22
                       mol_type = other DNA
                       organism = synthetic construct
SEQUENCE: 16
atggcgcacg cgctgggcca cg                                              22

SEQ ID NO: 17          moltype = DNA   length = 19
FEATURE                Location/Qualifiers
misc_feature           1..19
                       note = E206A reverse primer
source                 1..19
                       mol_type = other DNA
                       organism = synthetic construct
SEQUENCE: 17
gccaccgtac catttcgtc                                                  19

SEQ ID NO: 18          moltype = AA    length = 166
FEATURE                Location/Qualifiers
REGION                 1..166
                       note = EPO
source                 1..166
                       mol_type = protein
                       organism = synthetic construct
SEQUENCE: 18
APPRLICDSR VLERYLLEAK EAEDITTGCA EHCSLDENIT VPDTKVDFYA WKRMEVGQQA    60
VEVWQGLALL SEAVLRGQAL LVNSSQPWEP LQLHVDKAVS GLRSLTTLLR ALGAQKEAIS   120
PPDAASAAPL RTITADTFRK LFRVYSNFLR GKLKLYTGEA CRTGDR                  166

SEQ ID NO: 19          moltype =       length =
SEQUENCE: 19
000

SEQ ID NO: 20          moltype = AA    length = 361
FEATURE                Location/Qualifiers
REGION                 1..361
                       note = Polypeptide capable of binding to O-glycans but
                         lacks or hasreduced O-glycoprotein-specific endoprotease
                         activity
source                 1..361
                       mol_type = protein
                       organism = synthetic construct
```

```
SEQUENCE: 20
EVTVPDALKD RIALKKTARQ LNIVYFLGSD TEPVPDYERR LSELLLYLQQ FYGKEMQRHG    60
YGARSFGLDI KSPGRVNIIE YKAKNPAAHY PYENGGGWKA AQELDEFFKA HPDRKKSQHT   120
LIIMPTWNDE KNGPDNPGGV PFYGMGRNCF ALDYPAFDIK HLGQKTREGR LLTKWYGGMA   180
AALGHGLNLP HNHQTASDGK KYGTALMGSG NYTFGTSPTF LTPASCALLD ACEVFSVTPS   240
QQFYEGKPEV EVGDVAISFK GDQILVSGNY KSPQTVKALN VYIQDPPYAV NQDYDAVSFS   300
RRLGKKSGKF SMKIDKKELE GLNNNEFRIS LMFILANGLH MQKHFTFHWD ALQDYRDGSK   360
S                                                                  361

SEQ ID NO: 21           moltype = AA  length = 371
FEATURE                 Location/Qualifiers
REGION                  1..371
                        note = LS HE206AA or LS H205A/E206A (including N-terminal
                         methionine andC-terminal linker)
source                  1..371
                        mol_type = protein
                        organism = synthetic construct
SEQUENCE: 21
MEVTVPDALK DRIALKKTAR QLNIVYFLGS DTEPVPDYER RLSELLLYLQ QFYGKEMQRH    60
GYGARSFGLD IKSPGRVNII EYKAKNPAAH YPYENGGGWK AAQELDEFFK AHPDRKKSQH   120
TLIIMPTWND EKNGPDNPGG VPFYGMGRNC FALDYPAFDI KHLGQKTREG RLLTKWYGGM   180
AALGHGLNLP HNHQTASDG KKYGTALMGS GNYTFGTSPT FLTPASCALL DACEVFSVTP    240
SQQFYEGKPE VEVGDVAISF KGDQILVSGN YKSPQTVKAL NVYIQDPPYA VNQDYDAVSF   300
SRRLGKKSGK FSMKIDKKEL EGLNNNEFRI SLMFILANGL HMQKHFTFHW DALQDYRDGS   360
KSGSGHHHHH H                                                       371

SEQ ID NO: 22           moltype = DNA  length = 1116
FEATURE                 Location/Qualifiers
misc_feature            1..1116
                        note = Nucleotide sequence encoding LS HE206AA or LS
                         H205A/E206A
source                  1..1116
                        mol_type = other DNA
                        organism = synthetic construct
SEQUENCE: 22
atggaagtca ctgtgccgga cgccctgaaa gatcgcatcg cgctgaagaa aaccgctcgt    60
cagctgaata tcgtctactt cctgggttct gataccgaac cggttccgga ctacgagcgc   120
cgtctgagcg agctgctgtt gtatctgcag caattctatg gtaaagaaat gcagcgccat   180
ggctatggcg cacgcagctt tggtctggac attaagtcac cgggtcgtgt gaacattgag   240
gagtacaaag cgaagaaccc ggcagcgcat tacccgtatg agaatggtgg cggctggaaa   300
gctgcacaag aactggacga attttttcaag gcccatccag accgcaagaa aagccagcac   360
accctgatca tcatgcctac ctggaatgat gagaaaaatg gtcctgacaa tccgggtggc   420
gttccgttct atggtatggg tcgtaattgt tttgcgttgg actacccggc gtttgatatc   480
aagcacctgg gtcagaaaac gcgtgagggt cgtctgctga cgaaatggta cggtggcatg   540
gcggccgcgc tgggccacgg cctgaatctg ccgcacaatc accagaccgc gagcgatggc   600
aagaaatatg gcaccgccct gatgggtagc ggcaactaca cgttcggtac cagccccgacg   660
ttcctgaccc cggcgagctg tgcgctgctg gatgcctgcg aagtgttcag cgttacccgc   720
agccaacagt tttatgaggg taagccagaa gtcgaggttg gtgatgttgc aatttccttc   780
aagggtgatc aaatcttggt cagcggtaac tacaagagcc cgcaaaccgt gaaagtctcg   840
aacgtttaca ttcaggatcc gccgtacgcc gtgaaccaag actacgatgc agtgagcttt   900
agccgtcgtc tgggcaaaaa gtccggtaag tttagcatga agattgcaaa aaagaactg   960
gaaggcctga taacaacga attccgtatt tccttgatgt tcattctggc aaacggctta   1020
cacatgcaga agcactttac gttcactgg gatgcgctgc aagactaccg tgacggtagc   1080
aaatctggtt cgggtcatca tcaccaccat cactga                             1116

SEQ ID NO: 23           moltype = AA  length = 10
FEATURE                 Location/Qualifiers
REGION                  1..10
                        note = disrupted metalloprotease motif
source                  1..10
                        mol_type = protein
                        organism = synthetic construct
SEQUENCE: 23
GMAHALGHGL                                                          10

SEQ ID NO: 24           moltype = AA  length = 10
FEATURE                 Location/Qualifiers
REGION                  1..10
                        note = disrupted metalloprotease motif
source                  1..10
                        mol_type = protein
                        organism = synthetic construct
SEQUENCE: 24
GMAAELGHGL                                                          10

SEQ ID NO: 25           moltype = AA  length = 10
FEATURE                 Location/Qualifiers
REGION                  1..10
                        note = disrupted metalloprotease motif
```

```
source                  1..10
                        mol_type = protein
                        organism = synthetic construct
SEQUENCE: 25
GMAAALGHGL                                                  10

SEQ ID NO: 26           moltype = AA  length = 882
FEATURE                 Location/Qualifiers
source                  1..882
                        mol_type = protein
                        organism = Pseudomonas aeruginosa
SEQUENCE: 26
ATQEEILDAA LVSGDSSQLT DSHLVALRLQ QQVERIRQTR TQLLDGLYQN LSQAYDPGAA  60
SMWVLPANPD NTLPFLIGDK GRVLASLSLE AGGRGLAYGT NVLTQLSGTN AAHAPLLKRA  120
VQWLVNGDPG AATAKDFKVS VVGVDKTAAL NGLKSAGLQP ADAACNALTD ASCASTSKLL  180
VLGNGASAAS LSATVRARLQ AGLPILFVHT NGWNQSSTGQ QILAGLGLQE GPYGGNYWDK  240
DRVPSSRTRT RSVELGGAYG QDPALVQQIV DGSWRTDYDW SKCTSYVGRT TCDDVPGLSD  300
FSKRVDVLKG ALDAYNQKAQ NLFALPGTTS LRLWLLWADA VRQNIRYPMD KAADTARFQE  360
TFVADAIVGY VREAGAAQKE LGSYAGQRQQ SMPVSGSEET LTLTLPSAQG FTAIGRMAAP  420
GKRLSIRIED AGQASLAVGL NTQRIGSTRL WNTRQYDRPR FLKSPDIKLQ ANQSVALVSP  480
YGGLLQLVYS GATPGQTVTV KVTGAASQPF LDIQPGEDSS QAIADFIQAL DADKADWLEI  540
RSGSVEVHAK VEKVRGSIDK DYGGDVQRFI RELNEVFIDD AYTLAGFAIP NQAKTPAIQQ  600
ECAARGWDCD SETLHKLPGT QHINVDQYAQ CGGGCSGNPY DQTWGLNPRG WGESHELGHN  660
LQVNRLKVYG GRSGEISNQI FPLHKDWRVL REFGQNLDDT RVNYRNAYNL IVAGRAEADP  720
LAGVYKRLWE DPGTYALNGE RMAFYTQWVH YWADLKNDPL QGWDIWTLLY LHQRQVDKSD  780
WDANKAALGY GTYAQRPGNS GDASSTDGND NLLLGLSWLT QRDQRPTFAL WGIRTSAAAQ  840
AQVAAYGFAE QPAFFYANNR TNEYSTVKLL DMSQGSPAWP FP                    882

SEQ ID NO: 27           moltype = AA  length = 536
FEATURE                 Location/Qualifiers
source                  1..536
                        mol_type = protein
                        organism = Bacteroides thetaiotaomicron
SEQUENCE: 27
DKWEKEFRIR SYEPYSNIAE WADKLMTKKY SDLDNPTGIS VKAGDDIIVL VGDTYGQNIS  60
MQCIWETGTE YKQTASSGDV YMLNPGVNKL TMKGEGQLFV MYNTELTSNT AKPIKIHIPL  120
GSGTVNGFFD LKEHKTDEKY AELLKKSTHK YFCIRGEKIM FYFHRNKLLE YVPNNILSAI  180
HLWDNIVGWQ QELMGIDDVR PSQVNNHLFA ISPEGSYMWA SDYQIGFVYT YLGNILLEDN  240
VMAAEDNAWG PAHEIGHVHQ AAINWASSTE SSNNLFSNFI IYKLGKYKSR GNGLGSVATA  300
RYANGQAWYN MGDATHQNED TETHMRMNWQ LWIYYHRCEY KTDFWQTLFK LMREVNMTEG  360
EDPGKKQLEF AKMASKAANQ NLTDFFEMWG FFEPVNTTIE QYGTYKYYVS DAMIREAKEY  420
MAQFPAPKHA FQYIEDRKKS EFPSNDYRYS AVGDVGYYTQ FKENQKITKA ITAELAGRKV  480
SIQNGDEAVA FELRENDENG KLLYFSTFTT FEIPSSILMV NAKLYAVQAD GKRILL      536

SEQ ID NO: 28           moltype = AA  length = 507
FEATURE                 Location/Qualifiers
source                  1..507
                        mol_type = protein
                        organism = Clostridium perfringens
SEQUENCE: 28
VLELEMRGDS ISEAKKRKVW NFQDWQITGL SARAGDKITV YVDVAEGDPT PTLLYKQSLT  60
QHGGATSFQL KPGKNEITIP EINYESNGIP KDVIQGGDLF FTNYKSDSQK RAPKVRIEGA  120
SKYPVFILGK SDENEVMKEL EAYVEKIKAE PKTTPNIFAV SSNKSLEFVQ ATYALDWYKK  180
NNKTPKYTAE QWDQYIADAM GFWGFDNSKD VNSDFNFRIM PMVKNLSGGA FMNAGNGVIG  240
IRPGNQDAIL AANKGWGVAH ELGHNFDTGG RTIVEVTNNM MPLFFESKYK TKTRITDQNI  300
WENNTYPKVG LDDYSNNELY NKADSTHLAQ LAPLWQLYLY DNTFYGKFER QFRERDFGNK  360
NREDIYKSWV VAASDAMELD LTEFFARHGI RVDDKVKEDL AKYPKPDKKI YYLNDLAMNY  420
KGDGFTENAK VSVSTSGSNG NIKLSFSVDD ENKDNILGYE IRRDGKYVGF TSNDSFVDTK  480
SNLDEDGVYV VTPYDRKLNT LNPIEVN                                     507

SEQ ID NO: 29           moltype = AA  length = 892
FEATURE                 Location/Qualifiers
REGION                  1..892
                        note = polypeptide having O-glycoprotein-specific
                         endoprotease activity(including N-terminal methionine and
                         a C-terminal linker + His6tag)
source                  1..892
                        mol_type = protein
                        organism = synthetic construct
SEQUENCE: 29
MATQEEILDA ALVSGDSSQL TDSHLVALRL QQQVERIRQT RTQLLDGLYQ NLSQAYDPGA  60
ASMWVLPANP DNTLPFLIGD KGRVLASLSL EAGGRGLAYG TNVLTQLSGT NAAHAPLLKR  120
AVQWLVNGDP GAATAKDFKV SVVGVDKTAA LNGLKSAGLQ PADAACNALT DASCASTSKL  180
LVLGNGASAA SLSATVRARL QAGLPILFVH TNGWNQSSTG QQILAGLGLQ EGPYGGNYWD  240
KDRVPSSRTR TRSVELGGAY GQDPALVQQI VDGSWRTDYD WSKCTSYVGR TTCDDVPGLS  300
DFSKRVDVLK GALDAYNQKA QNLFALPGTT SLRLWLLWAD AVRQNIRYPM DKAADTARFQ  360
ETFVADAIVG YVREAGAAQK ELGSYAGQRQ QSMPVSGSEE TLTLTLPSAQ GFTAIGRMAA  420
PGKRLSIRIE DAGQASLAVG LNTQRIGSTR LWNTRQYDRP RFLKSPDIKL QANQSVALVS  480
PYGGLLQLVY SGATPGQTVT VKVTGAASQP FLDIQPGEDS SQAIADFIQA LDADKADWLE  540
```

```
IRSGSVEVHA KVEKVRGSID KDYGGDVQRF IRELNEVFID DAYTLAGFAI PNQAKTPAIQ    600
QECAARGWDC DSETLHKLPG TQHINVDQYA QCGGGCSGNP YDQTWGLNPR GWGESHELGH    660
NLQVNRLKVY GGRSGEISNQ IFPLHKDWRV LREFGQNLDD TRVNYRNAYN LIVAGRAEAD    720
PLAGVYKRLW EDPGTYALNG ERMAFYTQWV HYWADLKNDP LQGWDIWTLL YLHQRQVDKS    780
DWDANKAALG YGTYAQRPGN SGDASSTDGN DNLLLGLSWL TQRDQRPTFA LWGIRTSAAA    840
QAQVAAYGFA EQPAFFYANN RTNEYSTVKL LDMSQGSPAW PFPGSGHHHH HH           892

SEQ ID NO: 30          moltype = AA   length = 546
FEATURE                Location/Qualifiers
REGION                 1..546
                       note = polypeptide having O-glycoprotein-specific
                        endoprotease activity(including N-terminal methionine and
                        a C-terminal linker + His6tag)
source                 1..546
                       mol_type = protein
                       organism = synthetic construct
SEQUENCE: 30
MDKWEKEFRI RSYEPYSNIA EWADKLMTKK YSDLDNPTGI SVKAGDDIIV LVGDTYGQNI     60
SMQCIWETGT EYKQTASSGD VYMLNPGVNK LTMKGEGQLF VMYNTELTSN TAKPIKIHIP    120
LGSGTVNGFF DLKEHKTDEK YAELLKKSTH KYFCIRGEKI MFYFHRNKLL EYVPNNILSA    180
IHLWDNIVGW QQELMGIDDV RPSQVNNHLF AISPEGSYMW ASDYQIGFVY TYLGNILLED    240
NVMAAEDNAW GPAHEIGHVH QAAINWASST ESSNNLFSNF IIYKLGKYKS RGNGLGSVAT    300
ARYANGQAWY NMGDATHQNE DTETHMRMNW QLWIYYHRCE YKTDFWQTLF KLMREVNMTE    360
GEDPGKKQLE FAKMASKAAN QNLTDFFEMW GFFEPVNTTI EQYGTYKYYV SDAMIREAKE    420
YMAQFPAPKH AFQYIEDRKK SEFPSNDYRY SAVGDVGYYT QFKENQKITK AITAELAGRK    480
VSIQNGDEAV AFELRENDEN GKLLYFSTFT TFEIPSSILM VNAKLYAVQA DGKRILLSG    540
HHHHHH                                                              546

SEQ ID NO: 31          moltype = AA   length = 517
FEATURE                Location/Qualifiers
REGION                 1..517
                       note = polypeptide having O-glycoprotein-specific
                        endoprotease activity(including N-terminal methionine and
                        a C-terminal linker + His6tag)
source                 1..517
                       mol_type = protein
                       organism = synthetic construct
SEQUENCE: 31
MVLELEMRGD SISEAKKRKV WNFQDWQITG LSARAGDKIT VYVDVAEGDP TPTLLYKQSL     60
TQHGGATSFQ LKPGKNEITI PEINYESNGI PKDVIQGGDL FFTNYKSDSQ KRAPKVRIEG    120
ASKYPVFILG KSDENEVMKE LEAYVEKIKA EPKTTPNIFA VSSNKSLEFV QATYALDWYK    180
KNNKTPKYTA EQWDQYIADA MGFWGFDNSK DVNSDFNFRI MPMVKNLSGG APMNAGNGVI    240
GIRPGNQDAI LAANKGWGVA HELGHNFDTG GRTIVEVTNN MMPLFFESKY KTKTRITDQN    300
IWENNTYPKV GLDDYSNNEL YNKADSTHLA QLAPLWQLYL YDNTFYGKFE RQFRERDFGN    360
KNREDIYKSW VVAASDAMEL DLTEFFARHG IRVDDKVKED LAKYPKPDKK IYYLNDLAMN    420
YKGDGFTENA KVSVSTSGSN GNIKLSFSVD DENKDNILGY EIRRDGKYVG FTSNDSFVDT    480
KSNLDEDGVY VVTPYDRKLN TLNPIEVNGS GHHHHHH                             517

SEQ ID NO: 32          moltype = AA   length = 923
FEATURE                Location/Qualifiers
source                 1..923
                       mol_type = protein
                       organism = Pseudomonas aeruginosa
SEQUENCE: 32
MSLSTTAFPS LQGENMSRSP IPRHRALLAG FCLAGALSAQ AATQEEILDA ALVSGDSSQL     60
TDSHLVALRL QQQVERIRQT RTQLLDGLYQ NLSQAYDPGA ASMWVLPANP DNTLPFLIGD    120
KGRVLASLSL EAGGRGLAYG TNVLTQLSGT NAAHAPLLKR AVQWLVNGDP GAATAKDFKV    180
SVVGVDKTAA LNGLKSAGLQ PADAACNALT DASCASTSKL LVLGNGASAA SLSATVRARL    240
QAGLPILFVH TNGWNQSSTG QQILAGLGLQ EGPYGGWNPG KDRVPSSRTR TRSVELGGAY    300
GQDPALVQQI VDGSWRTDYD WSKCTSYVGR TTCDDVPGLS DFSKRVDVLK GALDAYNQKA    360
QNLFALPGTT SLRLWLLWAD AVRQNIRYPM DKAADTARFQ ETFVADAIVG YVREAGAAQK    420
ELGSYAGQRQ QSMPVSGSEE TLTLTLPSAQ GFTAIGRMAA PGKRLSIRIE DAGQASLAVG    480
LNTQRIGSTR LWNTRQYDRP RFLKSPDIKL QANQSVLRVS YYGGLLQLVY SGATPGGVAT    540
VKVTGAASQP FLDIQPGEDS SQAIADFIQA LDADKADWLE IRSGSVEVHA KVEKVRGSID    600
KDYGGDVQRF IRELNEVFID DAYTLAGFAI PNQAKTPAIQ QECAARGWDC DSETLHKLPG    660
TQHINVDQYA QCGGGCSGNP YDQTWGLNPR GWGESHELGH NLQVNRLKVY GGRSGEISNQ    720
IFPLHKDWRV LREFGQNLDD TRVNYRNAYN LIVAGRAEAD PLAGVYKRLW EDPGTYALNG    780
ERMAFYTQWV HYWADLKNDP LQGWDIWTLL YLHQRQVDKS DWDANKAALG YGTYAQRPGN    840
SGDASSTDGN DNLLLGLSWL TQRDQRPTFA LWGIRTSAAA QAQVAAYGFA EQPAFFYANN    900
RTNEYSTVKL LDMSQGSPAW PFP                                            923

SEQ ID NO: 33          moltype = AA   length = 857
FEATURE                Location/Qualifiers
source                 1..857
                       mol_type = protein
                       organism = Bacteroides thetaiotaomicron
SEQUENCE: 33
MTIKRFITNL LALFTLFTVS LACKDTEKSI INSSFSISEE YLIQNLDKSS TSVQIPINTS     60
MELAQWSVSY EANWLQCSKQ KTAAEGTFLR ITVNENTGET KRTANIKVTS TTATYTITVN    120
```

-continued

```
QYAKGEVIVE GDIKVTPTGG KASEHQEGQD IENTYDGKFS TDGAAPFHTP WGQSAKFPVT  180
LEYYFKGDTE IDYLIYYTRS GNGNFGKVKV YTTTNPDRSD YTLQGEYDFK EQNAPSKVSF  240
SEGIKATGIK FEVLSGLGDF VSCDEMEFYK TNTDKTLDKQ LLTVFTDITC TEIKNNVTNE  300
QIQALPDYFV RIAEAVRDNT YDKWEKEFRI RSYEPYSNIA EWADKLMTKK YSDLDNPTGI  360
SVKAGDDIIV LVGDTYGQNI SMQCIWETGT EYKQTASSGD VYMLNPGVNK LTMKGEGQLF  420
VMYNTELTSN TAKPIKIHIP LGSGTVNGFF DLKEHKTDEK YAELLKKSTH KYFCIRGEKI  480
MFYFHRNKLL EYVPNNILSA IHLWDNIVGW QQELMGIDDV RPSQVNNHLF AISPEGSYMW  540
ASDYQIGFVY TYLGNILLED NVMAAEDNAW GPAHEIGHVH QAAINWASST ESSNNLFSNF  600
IIYKLGKYKS RGNGLGSVAT ARYANGQAWY NMGDATHQNE DTETHMRMNW QLWIYYHRCE  660
YKTDFWQTLF KLMREVNMTE GEDPGKKQLE FAKMASKAAN QNLTDFFEMW GFFEPVNTTI  720
EQYGTYKYYV SDAMIREAKE YMAQFPAPKH AFQYIEDRKK SEFPSNDYRY SAVGDVGYYT  780
QFKENQKITK AITAELAGRK VSIQNGDEAV AFELRENDEN GKLLYFSTFT TFEIPSSILM  840
VNAKLYAVQA DGKRILL                                                857

SEQ ID NO: 34          moltype = AA  length = 1687
FEATURE                Location/Qualifiers
source                 1..1687
                       mol_type = protein
                       organism = Clostridium perfringens
SEQUENCE: 34
MNKRKIAAII LATMITNLSA TTIDVLAQEL NTKNNSKVEV SHDDESHQAR VSKFDLYNSD  60
KLDAYNQEFQ VSRSNIKSIN NNGGKYNSST IDKAIDGNLE THWETGKPND ANFTNEVVVT  120
FNEITNIDRI VYSARRDSAR GKGFAKEFEI YASLKDEGDD FNLVSSGEYT ESTRDLVEIK  180
FNPTDFKRLK FKFKKADQNW ASAAEFMFYK EDKLNEKFNG LFTDSSMNKV SEEFNTLEKL  240
NAFENELKDH PIYDLYKEGL NNARAILTET SENPTKATLG QITYNLNDDY NNQYRMPYKN  300
IKAIKNNGRH YAAQNIEKAI DNDVNTYWET GTLNSSSFNN EVEVEFNDLV TLDRIVYGSR  360
QSDLKGFAEE VYIYASRTSK GDTYKLVATG AHEATKGLVE AKFEPTEFKR VKFKFKKSKQ  420
NSATLNELMF YKPDEVYSSI PKLFTDGTMS ELSEEFNSLE KINAFKEKAK NHPLYNDFNE  480
TIELAESLIS NPRKEDVLEL EMRGDSISEA KKRKVWNFQD WQITGLSARA GDKITVYVDV  540
AEGDPTPTLL YKQSLTQHGG ATSFQLKPGK NEITIPEINY ESNGIPKDVI QGGDLFFTNY  600
KSDSQKRAPK VRIEGASKYP VFILGKSDEN EVMKELEAYV EKIKAEPKTT PNIFAVSSNK  660
SLEFVQATYA LDWYKKNNKT PKYTAEQWDQ YIADAMGFWG FDNSKDVNSD FNFRIMPMVK  720
NLSGGAFMNA GNGVIGIRPG NQDAILAANK GWGVAHELGH NFDTGGRTIV EVTNNMMPLF  780
FESKYKTKTR ITDQNIWENN TYPKVGLDDY SNNELYNKAD STHLAQLAPL WQLYLYDNTF  840
YGKFERQFRE RDFGNKNRED IYKSWVVAAS DAMELDLTEF FARHGIRVDD KVKEDLAKYP  900
KPDKKIYYLN DLAMNYKGDG FTENAKVSVS TSGSNGNIKL SFSVDDENKD NILGYEIRRD  960
GKYVGFTSND SFVDTKSNLD EDGVYVVTPY DRKLNTLNPI EVNALQPTLS VNPVITLALG  1020
EEFNEEEYIV AKDIKGNSLS ESVKVKSSNV NTSKVGEYEV LYSLEDSKGN EYTKTSKVNV  1080
VSRKEYMSDL TPKQSSNGWG TVRKDKSISG GVIGLTRDGD FVDYNKGLGL HSNAEYVYDL  1140
EGKKDYDYFES YVGVDKAMSS RPASSVIFKV LVDGEEKFNS GVMRSTTPQK YVKVDVKNAK  1200
ELKLIVNDAG DGDSSDHASF GDAKLATLSS KPIIKGENLA YSMDEKVDLM KGITATDIED  1260
GNITSKVQIK SSDFVEGKSG IFTVVYSVTD SDGLTSECSR TIAVTDKETQ LSDLNWKSAT  1320
IGSGSVRKDR AVSGNQIRLL NEDNSVETFA KGIGTHSYSE IVYNSEGYDI FDTWVGIDRH  1380
VADKKVSSVK FKVYVDGELK AETDVMRIDT PKKRLVVDVR NSKEIKLVVD VADNGNNWDH  1440
ADWADAKFRN LAEYDASELN KAIEEAKKLD LNNYTEESSE ALKNAISKGE EALLSKDKET  1500
INSALEELNK EMNSLVKVDL NAVINIPDKY LLKSIQNQLN KTGDITLGDM YSLTTLTLSG  1560
VEDLTGLENA KNLETLNMDY NEVKDLRPLS KLKKLNTLNA QEQFIAAGEL KPSNGKVIGD  1620
SKVYNREGKN VAKTIRVVDK NGNTILEQDA KDEFTINTKD LSSGLYGVHV LFEDEGFSGV  1680
MFYLFNV                                                           1687

SEQ ID NO: 35          moltype = AA  length = 882
FEATURE                Location/Qualifiers
REGION                 1..882
                       note = Polypeptide capable of binding to O-glycans but lack
                        or hasreduced O-glycoprotein-specific endoprotease
                        activity -Pseudomonas aeruginosa PAO1 (double mutant with
                        removed signalsequence)
source                 1..882
                       mol_type = protein
                       organism = synthetic construct
SEQUENCE: 35
ATQEEILDAA LVSGDSSQLT DSHLVALRLQ QQVERIRQTR TQLLDGLYQN LSQAYDPGAA  60
SMWVLPANPD NTLPFLIGDK GRVLASLSLE AGGRGLAYGT NVLTQLSGTN AAHAPLLKRA  120
VQWLVNGDPG AATAKDFKVS VVGVDKTAAL NGLKSAGLQP ADAACNALTD ASCASTSKLL  180
VLGNGASAAS LSATVRARLQ AGLPILFVHT NGWNQSSTGQ QILAGLGLQE GPYGGNYWDK  240
DRVPSSRTRT RSVELGGAYG QDPALVQQIV DGSWRTDYDW SKCTSYVGRT TCDDVPGLSD  300
FSKRVDVLKG ALDAYNQKAQ NLFALPGTTS LRLWLLWADA VRQNIRYPMD KAADTARFQE  360
TFVADAIVGY VREAGAAQKE LGSYAGQRQQ SMPVSGSEET LTLTLPSAQG FTAIGRMAAP  420
GKRLSIRIED AGQASLAVGL NTQRIGSTRL WNTRQYDRPR FLKSPDIKLQ ANQSVALVSP  480
YGGLLQLVYS GATPGQTVTV KVTGAASQPF LDIQPGEDSS QAIADFIQAL DADKADWLEI  540
RSGSVEVHAK VEKVRGSIDK DYGGDVQRFI RELNEVFIDD AYTLAGFAIP NQAKTPAIQQ  600
ECAARGWDCD SETLHKLPGT QHINVDQYAQ CGGGCSGNPY DQTWGLNPRG WGESAALGHN  660
LQVNRLKVYG GRSGEISNQI FPLHKDWRVL REFGQNLDDT RVNYRNAYNL IVAGRAEADP  720
LAGVYKRLWE DPGTYALNGE RMAFYTQWVH YWADLKNDPL QGWDIWTLLY LHQRQVDKSD  780
WDANKAALGY GTYAQRPGNS GDASSTDGND NLLLGLSWLT QRDQRPTFAL WGIRTSAAAQ  840
AQVAAYGFAE QPAFFYANNR TNEYSTVKLL DMSQGSPAWP FP                    882

SEQ ID NO: 36          moltype = AA  length = 536
FEATURE                Location/Qualifiers
```

| | | |
|---|---|---|
| REGION | 1..536 | |
| | note = Polypeptide capable of binding to O-glycans but lack or hasreduced O-glycoprotein-specific endoprotease activity -Bacteroides thetaiotaomicron VPI-5482 (double mutant with removedsignal and other immature sequences) | |
| source | 1..536 | |
| | mol_type = protein | |
| | organism = synthetic construct | |
| SEQUENCE: 36 | | |
| DKWEKEFRIR | SYEPYSNIAE WADKLMTKKY SDLDNPTGIS VKAGDDIIVL VGDTYGQNIS | 60 |
| MQCIWETGTE | YKQTASSGDV YMLNPGVNKL TMKGEGQLFV MYNTELTSNT AKPIKIHIPL | 120 |
| GSGTVNGFFD | LKEHKTDEKY AELLKKSTHK YFCIRGEKIM FYFHRNKLLE YVPNNILSAI | 180 |
| HLWDNIVGWQ | QELMGIDDVR PSQVNNHLFA ISPEGSYMWA SDYQIGFVYT YLGNILLEDN | 240 |
| VMAAEDNAWG | PAAAIGHVHQ AAINWASSTE SSNNLFSNFI IYKLGKYKSR GNGLGSVATA | 300 |
| RYANGQAWYN | MGDATHQNED TETHMRMNWQ LWIYYHRCEY KTDFWQTLFK LMREVNMTEG | 360 |
| EDPGKKQLEF | AKMASKAANQ NLTDFFEMWG FFEPVNTTIE QYGTYKYYVS DAMIREAKEY | 420 |
| MAQFPAPKHA | FQYIEDRKKS EFPSNDYRYS AVGDVGYYTQ FKENQKITKA ITAELAGRKV | 480 |
| SIQNGDEAVA | FELRENDENG KLLYFSTFTT FEIPSSILMV NAKLYAVQAD GKRILL | 536 |

| | | |
|---|---|---|
| SEQ ID NO: 37 | moltype = AA   length = 507 | |
| FEATURE | Location/Qualifiers | |
| REGION | 1..507 | |
| | note = Polypeptide capable of binding to O-glycans but lack or hasreduced O-glycoprotein-specific endoprotease activity -Clostridium perfringens (double mutant with removed signal andother immature sequences) | |
| source | 1..507 | |
| | mol_type = protein | |
| | organism = synthetic construct | |
| SEQUENCE: 37 | | |
| VLELEMRGDS | ISEAKKRKVW NFQDWQITGL SARAGDKITV YVDVAEGDPT PTLLYKQSLT | 60 |
| QHGGATSFQL | KPGKNEITIP EINYESNGIP KDVIQGGDLF FTNYKSDSQK RAPKVRIEGA | 120 |
| SKYPVFILGK | SDENEVMKEL EAYVEKIKAE PKTTPNIFAV SSNKSLEFVQ ATYALDWYKK | 180 |
| NNKTPKYTAE | QWDQYIADAM GFWGFDNSKD VNSDFNFRIM PMVKNLSGGA FMNAGNGVIG | 240 |
| IRPGNQDAIL | AANKGWGVAA ALGHNFDTGG RTIVEVTNNM MPLFFESKYK TKTRITDQNI | 300 |
| WENNTYPKVG | LDDYSNNELY NKADSTHLAQ LAPLWQLYLY DNTFYGKFER QFRERDFGNK | 360 |
| NREDIYKSWV | VAASDAMELD LTEFFARHGI RVDDKVKEDL AKYPKPDKKI YYLNDLAMNY | 420 |
| KGDGFTENAK | VSVSTSGSNG NIKLSFSVDD ENKDNILGYE IRRDGKYVGF TSNDSFVDTK | 480 |
| SNLDEDGVYV | VTPYDRKLNT LNPIEVN | 507 |

| | | |
|---|---|---|
| SEQ ID NO: 38 | moltype = AA   length = 892 | |
| FEATURE | Location/Qualifiers | |
| REGION | 1..892 | |
| | note = Polypeptide capable of binding to O-glycans but lack or hasreduced O-glycoprotein-specific endoprotease activity -Pseudomonas aeruginosa PAO1 (double mutant with removed signalsequence, with N-term Met, C-term linker/tag) | |
| source | 1..892 | |
| | mol_type = protein | |
| | organism = synthetic construct | |
| SEQUENCE: 38 | | |
| MATQEEILDA | ALVSGDSSQL TDSHLVALRL QQQVERIRQT RTQLLDGLYQ NLSQAYDPGA | 60 |
| ASMWVLPANP | DNTLPFLIGD KGRVLASLSL EAGGRGLAYG TNVLTQLSGT NAAHAPLLKR | 120 |
| AVQWLVNGDP | GAATAKDFKV SVVGVDKTAA LNGLKSAGLQ PADAACNALT DASCASTSKL | 180 |
| LVLGNGASAA | SLSATVRARL QAGLPILFVH TNGWNQSSTG QQILAGLGLQ EGPYGGNYWD | 240 |
| KDRVPSSRTR | TRSVELGGAY GQDPALVQQI VDGSWRTDYD WSKCTSYVGR TTCDDVPGLS | 300 |
| DFSKRVDVLK | GALDAYNQKA QNLFALPGTT SLRLWLLWAD AVRQNIRYPM DKAADTARFQ | 360 |
| ETFVADAIVG | YVREAGAAQK ELGSYAGQRQ QSMPVSGSEE TLTLTLPSAQ GFTAIGRMAA | 420 |
| PGKRLSIRIE | DAGQASLAVG LNTQRIGSTR LWNTRQYDRP RFLKSPDIKL QANQSVALVS | 480 |
| PYGGLLQLVY | SGATPGQTVT VKVTGAASQP FLDIQPGEDS SQAIADFIQA LDADKADWLE | 540 |
| IRSGSVEVHA | KVEKVRGSID KDYGGDVQRF IRELNEVFID DAYTLAGFAI PNQAKTPAIQ | 600 |
| QECAARGWDC | DSETLHKLPG TQHINVDQYA QCGGGCSGNP YDQTWGLNPR GWGESAALGH | 660 |
| NLQVNRLKVY | GGRSGEISNQ IFPLHKDWRV LREFGQNLDD TRVNYRNAYN LIVAGRAEAD | 720 |
| PLAGVYKRLW | EDPGTYALNG ERMAFYTQWV HYWADLKNDP LQGWDIWTLL YLHQRQVDKS | 780 |
| DWDANKAALG | YGTYAQRPGN SGDASSTDGN DNLLLGLSWL TQRDQRPTFA LWGIRTSAAA | 840 |
| QAQVAAYGFA | EQPAFFYANN RTNEYSTVKL LDMSQGSPAW PFPGSGHHHH HH | 892 |

| | | |
|---|---|---|
| SEQ ID NO: 39 | moltype = AA   length = 546 | |
| FEATURE | Location/Qualifiers | |
| REGION | 1..546 | |
| | note = Polypeptide capable of binding to O-glycans but lack or hasreduced O-glycoprotein-specific endoprotease activity -Bacteroides thetaiotaomicron VPI-5482 (double mutant with removedsignal and other sequences from immature protein, with N-term | |
| source | 1..546 | |
| | mol_type = protein | |
| | organism = synthetic construct | |
| SEQUENCE: 39 | | |

```
MDKWEKEFRI RSYEPYSNIA EWADKLMTKK YSDLDNPTGI SVKAGDDIIV LVGDTYGQNI  60
SMQCIWETGT EYKQTASSGD VYMLNPGVNK LTMKGEGQLF VMYNTELTSN TAKPIKIHIP  120
LGSGTVNGFF DLKEHKTDEK YAELLKKSTH KYFCIRGEKI MFYFHRNKLL EYVPNNILSA  180
IHLWDNIVGW QQELMGIDDV RPSQVNNHLF AISPEGSYMW ASDYQIGFVY TYLGNILLED  240
NVMAAEDNAW GPAAAIGHVH QAAINWASST ESSNNLFSNF IIYKLGKYKS RGNGLGSVAT  300
ARYANGQAWY NMGDATHQNE DTETHMRMNW QLWIYYHRCE YKTDFWQTLF KLMREVNMTE  360
GEDPGKKQLE FAKMASKAAN QNLTDFFEMW GFFEPVNTTI EQYGTYKYYV SDAMIREAKE  420
YMAQFPAPKH AFQYIEDRKK SEFPSNDYRY SAVGDVGYYT QFKENQKITK AITAELAGRK  480
VSIQNGDEAV AFELRENDEN GKLLYFSTFT TFEIPSSILM VNAKLYAVQA DGKRILLGSG  540
HHHHHH                                                            546

SEQ ID NO: 40          moltype = AA  length = 517
FEATURE                Location/Qualifiers
REGION                 1..517
                       note = Polypeptide capable of binding to O-glycans but lack
                        or hasreduced O-glycoprotein-specific endoprotease
                        activity -Clostridium perfringens (double mutant with
                        removed signal andother sequences from immature protein,
                        with N-term Met, C-term
source                 1..517
                       mol_type = protein
                       organism = synthetic construct
SEQUENCE: 40
MVLELEMRGD SISEAKKRKV WNFQDWQITG LSARAGDKIT VYVDVAEGDP TPTLLYKQSL  60
TQHGGATSFQ LKPGKNEITI PEINYESNGI PKDVIQGGDL FFTNYKSDSQ KRAPKVRIEG  120
ASKYPVFILG KSDENEVMKE LEAYVEKIKA EPKTTPNIFA VSSNKSLEFV QATYALDWYK  180
KNNKTPKYTA EQWDQYIADA MGFWGFDNSK DVNSDFNFRI MPMVKNLSGG AFMNAGNGVI  240
GIRPGNQDAI LAANKGWGVA AALGHNFDTG GRTIVEVTNN MMPLFFESKY KTKTRITDQN  300
IWENNTYPKV GLDDYSNNEL YNKADSTHLA QLAPLWQLYL YDNTFYGKFE RQFRERDFGN  360
KNREDIYKSW VVAASDAMEL DLTEFFARHG IRVDDKVKED LAKYPKPDKK IYYLNDLAMN  420
YKGDGFTENA KVSVSTSGSN GNIKLSFSVD DENKDNILGY EIRRDGKYVG FTSNDSFVDT  480
KSNLDEDGVY VVTPYDRKLN TLNPIEVNGS GHHHHHH                          517

SEQ ID NO: 41          moltype = AA  length = 5
FEATURE                Location/Qualifiers
REGION                 1..5
                       note = Metalloprotease motif
source                 1..5
                       mol_type = protein
                       organism = synthetic construct
SEQUENCE: 41
HELGH                                                             5

SEQ ID NO: 42          moltype = AA  length = 5
FEATURE                Location/Qualifiers
REGION                 1..5
                       note = Metalloprotease motif
source                 1..5
                       mol_type = protein
                       organism = synthetic construct
SEQUENCE: 42
HEIGH                                                             5

SEQ ID NO: 43          moltype = AA  length = 10
FEATURE                Location/Qualifiers
REGION                 1..10
                       note = Metalloprotease motif
source                 1..10
                       mol_type = protein
                       organism = synthetic construct
SEQUENCE: 43
GVAHELGHNF                                                        10

SEQ ID NO: 44          moltype = AA  length = 5
FEATURE                Location/Qualifiers
REGION                 1..5
                       note = disrupted metalloprotease motif
source                 1..5
                       mol_type = protein
                       organism = synthetic construct
SEQUENCE: 44
HALGH                                                             5

SEQ ID NO: 45          moltype = AA  length = 5
FEATURE                Location/Qualifiers
REGION                 1..5
                       note = disrupted metalloprotease motif
source                 1..5
                       mol_type = protein
```

```
SEQUENCE: 45
AELGH                                                               5

SEQ ID NO: 46              moltype = AA  length = 5
FEATURE                    Location/Qualifiers
REGION                     1..5
                           note = disrupted metalloprotease motif
source                     1..5
                           mol_type = protein
                           organism = synthetic construct
SEQUENCE: 46
AALGH                                                               5

SEQ ID NO: 47              moltype = AA  length = 19
FEATURE                    Location/Qualifiers
REGION                     1..19
                           note = glycodrosocin peptide with O-gly site on the T
source                     1..19
                           mol_type = protein
                           organism = synthetic construct
SEQUENCE: 47
GKPRPYSPRP TSHPRPIRV                                               19

SEQ ID NO: 48              moltype = AA  length = 7
FEATURE                    Location/Qualifiers
REGION                     1..7
                           note = Non-O-glycosylated peptide
source                     1..7
                           mol_type = protein
                           organism = synthetic construct
SEQUENCE: 48
YIYGSFK                                                             7

SEQ ID NO: 49              moltype = AA  length = 7
FEATURE                    Location/Qualifiers
REGION                     1..7
                           note = Non-O-glycosylated peptide
source                     1..7
                           mol_type = protein
                           organism = synthetic construct
SEQUENCE: 49
KKLVFFA                                                             7

SEQ ID NO: 50              moltype = AA  length = 14
FEATURE                    Location/Qualifiers
REGION                     1..14
                           note = Non-O-glycosylated peptide
source                     1..14
                           mol_type = protein
                           organism = synthetic construct
SEQUENCE: 50
FLPLILGKLV KGLL                                                    14

SEQ ID NO: 51              moltype = AA  length = 467
FEATURE                    Location/Qualifiers
REGION                     1..467
                           note = synthetic sequence
source                     1..467
                           mol_type = protein
                           organism = synthetic construct
SEQUENCE: 51
LPAQVAFTPY APEPGSTCRL REYYDQTAQM CCSKCSPGQH AKVFCTKTSD TVCDSCEDST    60
YTQLWNWVPE CLSCGSRCSS DQVETQACTR EQNRICTCRP GWYCALSKQE GCRLCAPLRK   120
CRPGFGVARP GTETSDVVCK PCAPGTFSNT TSSTDICRPH QICNVVAIPG NASMDAVCTS   180
TSPTRSMAPG AVHLPQPVST RSQHTQPTPE PSTAPSTSFL LPMGPSPPAE GSTGDEPKSC   240
DKTHTCPPCP APELLGGPSV FLFPPKPKDT LMISRTPEVT CVVVDVSHED PEVKFNWYVD   300
GVEVHNAKTK PREEQYNSTY RVVSVLTVLH QDWLNGKEYK CKVSNKALPA PIEKTISKAK   360
GQPREPQVYT LPPSREEMTK NQVSLTCLVK GFYPSDIAVE WESNGQPENN YKTTPPVLDS   420
DGSFFLYSKL TVDKSRWQQG NVFSCSVMHE ALHNHYTQKS LSLSPGK                467

SEQ ID NO: 52              moltype = AA  length = 40
FEATURE                    Location/Qualifiers
REGION                     1..40
                           note = synthetic sequence
CARBOHYD                   1
                           note = The amino acid at postion 1 is attached to
                           N-Acetylglucosamineand galactose
source                     1..40
```

```
                         mol_type = protein
                         organism = synthetic construct
SEQUENCE: 52
SAAPLRTITA DTFRKLFRVY SNFLRGKLKL YTGEACRTGD                           40

SEQ ID NO: 53            moltype = AA   length = 40
FEATURE                  Location/Qualifiers
REGION                   1..40
                         note = synthetic sequence
CARBOHYD                 1
                         note = The amino acid at postition 1 is attached to
                         N-Acetylglucosamine
source                   1..40
                         mol_type = protein
                         organism = synthetic construct
SEQUENCE: 53
SAAPLRTITA DTFRKLFRVY SNFLRGKLKL YTGEACRTGD                           40

SEQ ID NO: 54            moltype = AA   length = 125
FEATURE                  Location/Qualifiers
REGION                   1..125
                         note = synthetic sequence
source                   1..125
                         mol_type = protein
                         organism = synthetic construct
SEQUENCE: 54
APPRLICDSR VLERYLLEAK EAEDITTGCA EHCSLDENIT VPDTKVDFYA WKRMEVGQQA     60
VEVWQGLALL SEAVLRGQAL LVNSSQPWEP LQLHVDKAVS GLRSLTTLLR ALGAQKEAIS    120
PPDAA                                                                125

SEQ ID NO: 55            moltype = AA   length = 165
FEATURE                  Location/Qualifiers
REGION                   1..165
                         note = synthetic sequence
CARBOHYD                 126
                         note = The amino acid at position 126 is attached to
                         N-Acetylglucosamineand galactose
source                   1..165
                         mol_type = protein
                         organism = synthetic construct
SEQUENCE: 55
APPRLICDSR VLERYLLEAK EAEDITTGCA EHCSLDENIT VPDTKVDFYA WKRMEVGQQA     60
VEVWQGLALL SEAVLRGQAL LVNSSQPWEP LQLHVDKAVS GLRSLTTLLR ALGAQKEAIS    120
PPDAASAAPL RTITADTFRK LFRVYSNFLR GKLKLYTGEA CRTGD                    165

SEQ ID NO: 56            moltype =    length =
SEQUENCE: 56
000

SEQ ID NO: 57            moltype =    length =
SEQUENCE: 57
000

SEQ ID NO: 58            moltype = AA   length = 353
FEATURE                  Location/Qualifiers
REGION                   1..353
                         note = synthetic sequence
source                   1..353
                         mol_type = protein
                         organism = synthetic construct
SEQUENCE: 58
ASPTSPKVFP LSLCSTQPDG NVVIACLVQG FFPQEPLSVT WSESGQGVTA RNFPPSQDAS     60
GDLYTTSSQL TLPATQCLAG KSVTCHVKHY TNPSQDVTVP CPVPSTPPTP SPSTPPTPSP    120
SCCHPRLSLH RPALEDLLLG SEANLTCTLT GLRDASGVTF TWTPSSGKSA VQGPPERDLC    180
GCYSVSSVLP GCAEPWNHGK TFTCTAAYPE SKTPLTATLS KSGNTFRPEV HLLPPPSEEL    240
ALNELVTLTC LARGFSPKDV LVRWLQGSQE LPREKYLTWA SRQEPSQGTT TFAVTSILRV    300
AAEDWKKGDT FSCMVGHEAL PLAFTQKTID RLAGKPTHVN VSVVMAEVDG TCY           353

SEQ ID NO: 59            moltype =    length =
SEQUENCE: 59
000

SEQ ID NO: 60            moltype =    length =
SEQUENCE: 60
000

SEQ ID NO: 61            moltype = AA   length = 5
FEATURE                  Location/Qualifiers
REGION                   1..5
```

```
SEQ ID NO: 61                          moltype = AA  length = 5
FEATURE                                Location/Qualifiers
REGION                                 1..5
                                       note = synthetic sequence
source                                 1..5
                                       mol_type = protein
                                       organism = synthetic construct
SEQUENCE: 61
GSGLE                                                                   5

SEQ ID NO: 62                          moltype = AA  length = 6
FEATURE                                Location/Qualifiers
REGION                                 1..6
                                       note = synthetic sequence
source                                 1..6
                                       mol_type = protein
                                       organism = synthetic construct
SEQUENCE: 62
HHHHHH                                                                  6

SEQ ID NO: 63                          moltype =     length =
SEQUENCE: 63
000

SEQ ID NO: 64                          moltype =     length =
SEQUENCE: 64
000

SEQ ID NO: 65                          moltype =     length =
SEQUENCE: 65
000

SEQ ID NO: 66                          moltype =     length =
SEQUENCE: 66
000

SEQ ID NO: 67                          moltype = AA  length = 5
FEATURE                                Location/Qualifiers
REGION                                 1..5
                                       note = synthetic sequence
source                                 1..5
                                       mol_type = protein
                                       organism = synthetic construct
SEQUENCE: 67
YTQKS                                                                   5

SEQ ID NO: 68                          moltype = AA  length = 6
FEATURE                                Location/Qualifiers
REGION                                 1..6
                                       note = synthetic sequence
source                                 1..6
                                       mol_type = protein
                                       organism = synthetic construct
SEQUENCE: 68
TSPTRS                                                                  6

SEQ ID NO: 69                          moltype = AA  length = 12
FEATURE                                Location/Qualifiers
REGION                                 1..12
                                       note = synthetic sequence
source                                 1..12
                                       mol_type = protein
                                       organism = synthetic construct
SEQUENCE: 69
PSTSFLLPMG PS                                                          12

SEQ ID NO: 70                          moltype = AA  length = 23
FEATURE                                Location/Qualifiers
REGION                                 1..23
                                       note = synthetic sequence
source                                 1..23
                                       mol_type = protein
                                       organism = synthetic construct
SEQUENCE: 70
PTRSMAPGAV HLPQPVSTRS QHT                                              23

SEQ ID NO: 71                          moltype = AA  length = 17
FEATURE                                Location/Qualifiers
REGION                                 1..17
                                       note = synthetic sequence
source                                 1..17
                                       mol_type = protein
```

```
                         organism = synthetic construct
SEQUENCE: 71
PTRSMAPGAV HLPQPVS                                                  17

SEQ ID NO: 72            moltype = AA  length = 11
FEATURE                  Location/Qualifiers
REGION                   1..11
                         note = synthetic sequence
source                   1..11
                         mol_type = protein
                         organism = synthetic construct
SEQUENCE: 72
STSFLLPMGP S                                                        11

SEQ ID NO: 73            moltype = AA  length = 16
FEATURE                  Location/Qualifiers
REGION                   1..16
                         note = synthetic sequence
source                   1..16
                         mol_type = protein
                         organism = synthetic construct
SEQUENCE: 73
RSMAPGAVHL PQPVST                                                   16

SEQ ID NO: 74            moltype = AA  length = 8
FEATURE                  Location/Qualifiers
REGION                   1..8
                         note = synthetic sequence
source                   1..8
                         mol_type = protein
                         organism = synthetic construct
SEQUENCE: 74
LPAQVAFT                                                             8

SEQ ID NO: 75            moltype = AA  length = 18
FEATURE                  Location/Qualifiers
REGION                   1..18
                         note = synthetic sequence
source                   1..18
                         mol_type = protein
                         organism = synthetic construct
SEQUENCE: 75
PSTSFLLPMG PSPPAEGS                                                 18

SEQ ID NO: 76            moltype = AA  length = 19
FEATURE                  Location/Qualifiers
REGION                   1..19
                         note = synthetic sequence
source                   1..19
                         mol_type = protein
                         organism = synthetic construct
SEQUENCE: 76
PSTSFLLPMG PSPPAEGST                                                19

SEQ ID NO: 77            moltype = AA  length = 18
FEATURE                  Location/Qualifiers
REGION                   1..18
                         note = synthetic sequence
source                   1..18
                         mol_type = protein
                         organism = synthetic construct
SEQUENCE: 77
PTRSMAPGAV HLPQPVST                                                 18

SEQ ID NO: 78            moltype = AA  length = 20
FEATURE                  Location/Qualifiers
REGION                   1..20
                         note = synthetic sequence
source                   1..20
                         mol_type = protein
                         organism = synthetic construct
SEQUENCE: 78
PTPEPSTAPS TSFLLPMGPS                                               20
```

The invention claimed is:
1. A method of binding to an O-glycan, O-glycopeptide and/or O-glycoprotein, wherein the method comprises:
contacting a sample comprising the O-glycan, O-glycopeptide and/or O-glycoprotein with a polypeptide which is capable of binding to an O-glycan or O-glycoprotein and which lacks or has reduced endoprotease activity specific for O-glycosylated proteins, wherein the polypeptide comprises:
(a) the amino acid sequence of SEQ ID NO: 5 or SEQ ID NO: 20;
(b) an amino acid sequence which is at least 95% identical to the amino acid sequence of SEQ ID NO: 5 or SEQ ID NO: 20; or
(c) an amino acid sequence which is a fragment of the sequence of SEQ ID NO: 5 or SEQ ID NO: 20 or a fragment of an amino acid which is at least 95% identical to the amino acid sequence of SEQ ID NO: 5 or SEQ ID NO: 20; and
determining whether or not an O-glycan, O-glycopeptide and/or O-glycoprotein has been bound and/or separating the O-glycan and any linked glycoprotein, the O-glycopeptide or O-glycoprotein from the resulting mixture,
wherein the method is for the purpose of isolating an O-glycan or linked glycoprotein, O-glycopeptide or O-glycoprotein from the sample.

2. The method of claim 1, wherein the polypeptide comprising the amino acid sequence which is at least 95% identical to the amino acid sequence of SEQ ID NO: 5 or SEQ ID NO: 20, or the fragment thereof, does not comprise the metalloprotease motif HEbbH.

3. The method of claim 1, wherein the polypeptide comprising the amino acid sequence which is at least 95% identical to the amino acid sequence of SEQ ID NO: 5 or SEQ ID NO: 20, or the fragment thereof, comprises a disrupted version of the metalloprotease motif HEbbH, such that:
(a) H in the first position is replaced with the amino acid A or G; and/or
(b) E in the second position is replaced with an uncharged amino acid; and/or
(c) H in the fifth position is replaced with the amino acid A or G;
wherein b in said motif is an uncharged amino acid.

4. The method according to claim 1, wherein the polypeptide includes an additional methionine at the N terminus and/or a His tag at the C terminus, which tag may be joined to the C terminus by a linker, optionally wherein said polypeptide comprises the amino acid sequence of SEQ ID NO: 6 or SEQ ID NO: 21.

5. The method according to claim 1, wherein the polypeptide is provided in solution, lyophilised, or immobilised, optionally wherein the polypeptide is provided together with the sialidase, Am1757 (SEQ ID NO: 11).

6. The method according claim 1, wherein said determining and/or separating is carried out by affinity chromatography, SDS-PAGE, HPLC, lectin blotting, ELISA or mass spectrometry.

7. The method according to claim 1, which additionally comprises a step of eluting bound O-glycan, O-glycopeptide, or O-glycoprotein from the polypeptide with a buffer comprising:

(a) high molar concentration urea, wherein the high molar concentration of urea is at least 5M;
(b) high concentration detergent, wherein the high concentration of detergent is at least 1%; or
(c) a polypeptide having endoprotease activity specific for O-glycosylated proteins which comprises:
(i) the amino acid sequence of SEQ ID NO: 1,
(ii) an amino acid sequence which is at least 95% identical to the amino acid sequence of SEQ ID NO: 1,
(iii) an amino acid sequence which is a fragment of the sequence of SEQ ID NO: 1 or a fragment of an amino acid sequence which is at least 95% identical to the amino acid sequence of SEQ ID NO: 1, and/or
(iv) an additional methionine at the N terminus and/or a His tag at the C terminus, which tag may be joined to the C terminus by a linker, optionally wherein said polypeptide comprises the amino acid sequence of SEQ ID NO: 2,
wherein, the amino acid sequence which is at least 95% identical to the amino acid sequence of SEQ ID NO: 1, or the fragment thereof, comprises:
(v) the motif HEbbH, wherein b is an uncharged amino acid, optionally A, C, F, G, I, L, M, N, P, Q, S, T, V or W, and optionally wherein said motif is present in said polypeptide at positions corresponding to positions 181 to 185 of SEQ ID NO: 1,
(vi) the motif HEbbH, wherein the motif is selected from the group consisting of HEIGH (SEQ ID NO: 42) or HELGH (SEQ ID NO: 41),
(vii) the motif abxHEbbHbc, wherein, a is amino acid V, T or G; b is an uncharged amino acid, optionally A, C, F, G, I, L, M, N, P, Q, S, T, V or W; x is any amino acid; and c is a hydrophobic amino acid, optionally A, C, F, I, L, M, P, V, W or Y; and/or
(viii) the motif abxHEbbHbc, wherein the motif comprises the sequence GMAHELGHGL (SEQ ID NO: 8) or GVAHELGHNF (SEQ ID NO: 43).

8. The method according to claim 3, wherein E in the second position is replaced with an uncharged amino acid selected from A, C, F, G, I, L, M, N, P, Q, S, T, V, or W.

9. The method according to claim 3, wherein E in the second position is replaced with the amino acid A or G.

10. The method according to claim 3, wherein b in said motif is replaced with an uncharged amino acid selected from A, C, F, G, I, L, M, N, P, Q, S, T, V, or W.

11. The method according to claim 1, wherein the polypeptide includes an additional methionine at the N terminus and/or a His tag at the C terminus, which tag may be joined to the C terminus by a linker, wherein said polypeptide consists of the amino acid sequence of SEQ ID NO: 6 or SEQ ID NO: 21.

12. The method according to claim 1, wherein the polypeptide is provided in solution, lyophilised, or immobilised, optionally wherein the polypeptide is provided together with a mixture of sialidases, Am1757 (SEQ ID NO: 11) and Am0707 (SEQ ID NO: 14).

13. The method according to claim 7, wherein the polypeptide of (c)(iv) consists of the amino acid sequence of SEQ ID NO: 2.

* * * * *